US009587946B2

(12) United States Patent
Uetake

(10) Patent No.: US 9,587,946 B2
(45) Date of Patent: Mar. 7, 2017

(54) NAVIGATION SYSTEM, TERMINAL APPARATUS, NAVIGATION SERVER, NAVIGATION APPARATUS, NAVIGATION METHOD, AND COMPUTER PROGRAM PRODUCT

(75) Inventor: Kosuke Uetake, Tokyo (JP)

(73) Assignee: NAVITIME JAPAN CO., LTD., Tokyo (JP)

(*) Notice: Subject to any disclaimer, the term of this patent is extended or adjusted under 35 U.S.C. 154(b) by 50 days.

(21) Appl. No.: 13/703,795

(22) PCT Filed: Jun. 16, 2010

(86) PCT No.: PCT/JP2010/060235
§ 371 (c)(1),
(2), (4) Date: Dec. 12, 2012

(87) PCT Pub. No.: WO2011/158352
PCT Pub. Date: Dec. 22, 2011

(65) Prior Publication Data
US 2013/0090849 A1 Apr. 11, 2013

(51) Int. Cl.
*G01C 21/00* (2006.01)
*B61L 15/00* (2006.01)
(Continued)

(52) U.S. Cl.
CPC .......... *G01C 21/00* (2013.01); *B61L 15/0045* (2013.01); *G01C 21/20* (2013.01); *G06K 9/00476* (2013.01)

(58) Field of Classification Search
CPC .... G01C 21/00; G01C 21/36; G01C 21/3647; G01C 21/3614; G01C 21/3602; G01C 21/3679
See application file for complete search history.

(56) References Cited

U.S. PATENT DOCUMENTS 5,396,431 A * 3/1995 Shimizu et al. ............... 701/454
5,613,216 A * 3/1997 Galler .......................... 455/66.1
(Continued)

FOREIGN PATENT DOCUMENTS

JP 4 151373 5/1992
JP 2003-35555 A 2/2003
(Continued)

OTHER PUBLICATIONS

International Search Report Issued Sep. 21, 2010 in PCT/JP10/60235 Filed Jun. 16, 2010.
(Continued)

*Primary Examiner* — Adam Tissot
*Assistant Examiner* — Tommy Worden
(74) *Attorney, Agent, or Firm* — McDermott Will & Emery LLP

(57) ABSTRACT

A navigation device presenting guide information based on a photographed image of a boarding guide display item, such as a station name signboard, a roll sign, or a route map, that can be photographed in a station yard. The device acquires a photographed image of a boarding guide display item by controlling the photographing unit, identifies display content from the photographed image of the boarding guide display item of a transportation device acquired and specifying a route, station name, and traveling direction of a current position based on the identified display content and traffic network data stored in the storage unit, extracts station names present in the traveling direction from the traffic network data based on the route, station name, and traveling direction of the current position, and generates guide information including at least part of the extracted station names, and outputs at least part of the generated guide information.

27 Claims, 15 Drawing Sheets

(51) Int. Cl.
*G01C 21/20* (2006.01)
*G06K 9/00* (2006.01)

(56) References Cited

U.S. PATENT DOCUMENTS

| | | | |
|---|---|---|---|
| 6,216,065 B1* | 4/2001 | Hall et al. ..................... 701/16 |
| 6,522,889 B1* | 2/2003 | Aarnio ................. G06F 17/289 |
| | | | 348/207.1 |
| 6,657,666 B1* | 12/2003 | Imagawa .......... H04N 1/00323 |
| | | | 348/116 |
| 6,972,757 B2* | 12/2005 | Arikawa ............... G06T 3/0087 |
| | | | 345/419 |
| 7,447,362 B2* | 11/2008 | Lev ................................. 382/200 |
| 7,477,780 B2* | 1/2009 | Boncyk et al. ............... 382/165 |
| 7,512,483 B2* | 3/2009 | Matsuoka et al. ........... 701/431 |
| 8,406,531 B2* | 3/2013 | Ramanujapuram G06F 17/30244 |
| | | | 382/201 |
| 2002/0018047 A1* | 2/2002 | Okada .................... B60Q 9/005 |
| | | | 345/156 |
| 2003/0222796 A1 | 12/2003 | Nagasaki |
| 2004/0070602 A1* | 4/2004 | Kobuya et al. ............... 345/738 |
| 2005/0162523 A1* | 7/2005 | Darrell ............. G06F 17/30864 |
| | | | 348/211.2 |
| 2008/0056535 A1* | 3/2008 | Bergmann et al. ........... 382/103 |
| 2008/0075378 A1* | 3/2008 | Kim et al. ..................... 382/252 |
| 2008/0077324 A1* | 3/2008 | Hatano et al. ................ 701/212 |
| 2008/0177471 A1* | 7/2008 | Deurwaarder ..... G01C 21/3655 |
| | | | 701/414 |
| 2009/0048820 A1* | 2/2009 | Buccella ............... G06F 17/289 |
| | | | 704/2 |
| 2009/0063047 A1* | 3/2009 | Ono ........................ G01C 21/20 |
| | | | 701/431 |
| 2009/0083232 A1* | 3/2009 | Ives ..................... G06F 17/3064 |
| 2009/0106126 A1* | 4/2009 | Asano et al. .................... 705/26 |
| 2009/0119007 A1* | 5/2009 | Murayama ............ G01C 21/26 |
| | | | 701/532 |
| 2009/0119008 A1* | 5/2009 | Kobuya et al. ............... 701/208 |
| 2009/0171572 A1* | 7/2009 | Alteresco ............... G08G 1/005 |
| | | | 701/533 |
| 2009/0207044 A1* | 8/2009 | Tomita et al. ................ 340/932.2 |
| 2009/0251333 A1* | 10/2009 | Itani et al. .................... 340/932.2 |
| 2009/0285492 A1* | 11/2009 | Ramanujapuram G06F 17/30244 |
| | | | 382/209 |
| 2009/0316951 A1* | 12/2009 | Soderstrom ....... G06F 17/30241 |
| | | | 382/103 |
| 2010/0036248 A1* | 2/2010 | Chouno ................. A61B 6/563 |
| | | | 600/443 |
| 2010/0054527 A1* | 3/2010 | Kirmse et al. ................ 382/100 |
| 2010/0125407 A1* | 5/2010 | Cho .................... G01C 21/3602 |
| | | | 701/533 |
| 2010/0168997 A1* | 7/2010 | Sakamoto ..................... 701/200 |
| 2010/0241975 A1* | 9/2010 | Kinugawa et al. ........... 715/764 |
| 2010/0268450 A1* | 10/2010 | Evanitsky .......... G01C 21/3423 |
| | | | 701/533 |
| 2010/0274469 A1* | 10/2010 | Takahata et al. ............. 701/200 |
| 2010/0305844 A1* | 12/2010 | Choi et al. .................... 701/201 |
| 2012/0130762 A1* | 5/2012 | Gale et al. .................... 705/7.13 |
| 2012/0203460 A1* | 8/2012 | Cho et al. ..................... 701/538 |
| 2013/0010103 A1* | 1/2013 | Ihara et al. ................... 348/116 |
| 2013/0063646 A1* | 3/2013 | Ueno et al. ................ 348/333.1 |
| 2013/0090849 A1* | 4/2013 | Uetake ......................... 701/522 |
| 2013/0103306 A1* | 4/2013 | Uetake ......................... 701/425 |
| 2013/0113936 A1* | 5/2013 | Cohen et al. ................. 348/148 |
| 2013/0169678 A1* | 7/2013 | Ueno et al. ................... 345/629 |
| 2013/0335411 A1* | 12/2013 | Kirmse et al. ................ 345/419 |
| 2014/0067956 A1* | 3/2014 | Tsunoda et al. .............. 709/204 |

FOREIGN PATENT DOCUMENTS

| | | | |
|---|---|---|---|
| JP | 2003-35555 A5 | | 2/2003 |
| JP | 2004151373 A | * | 5/2004 |
| JP | 2004 326473 | | 11/2004 |
| JP | 2005-037181 A | | 2/2005 |
| JP | 2006 276940 | | 10/2006 |
| JP | 2007-58296 | | 3/2007 |
| JP | 2008-157820 A | | 7/2008 |
| JP | 2008 180527 | | 8/2008 |
| JP | 2008209164 A | * | 9/2008 |
| JP | 2008 273516 | | 11/2008 |
| JP | 2009 126222 | | 6/2009 |
| JP | 2009 130697 | | 6/2009 |
| JP | 2009130697 A | * | 6/2009 |
| JP | 2009-205485 | | 9/2009 |

OTHER PUBLICATIONS

U.S. Appl. No. 13/703,468, filed Dec. 11, 2012, Uetake.
Extended European Search Report issued on Sep. 1, 2014, in Patent Application No. 10853233.4.
Japanese Office Action issued Mar. 18, 2014, in Japan Patent Application No. 2012-520210 (with English translation).
Japanese Office Action issued Nov. 25, 2014, in Japan Patent Application No. 2012-520210 (with English translation).
Notice of Rejection Japanese Patent Application No. 2015-133180 dated May 24, 2016 with full English translation.

* cited by examiner

FIG.6
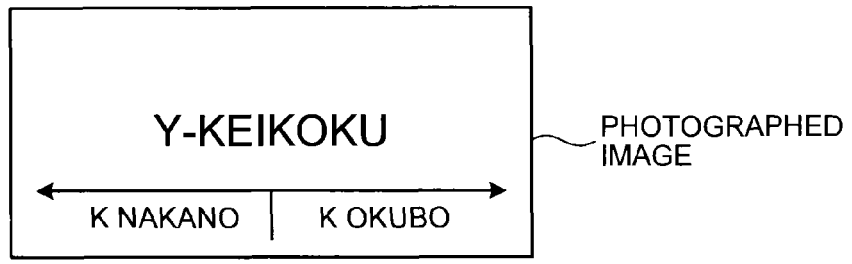
(a)
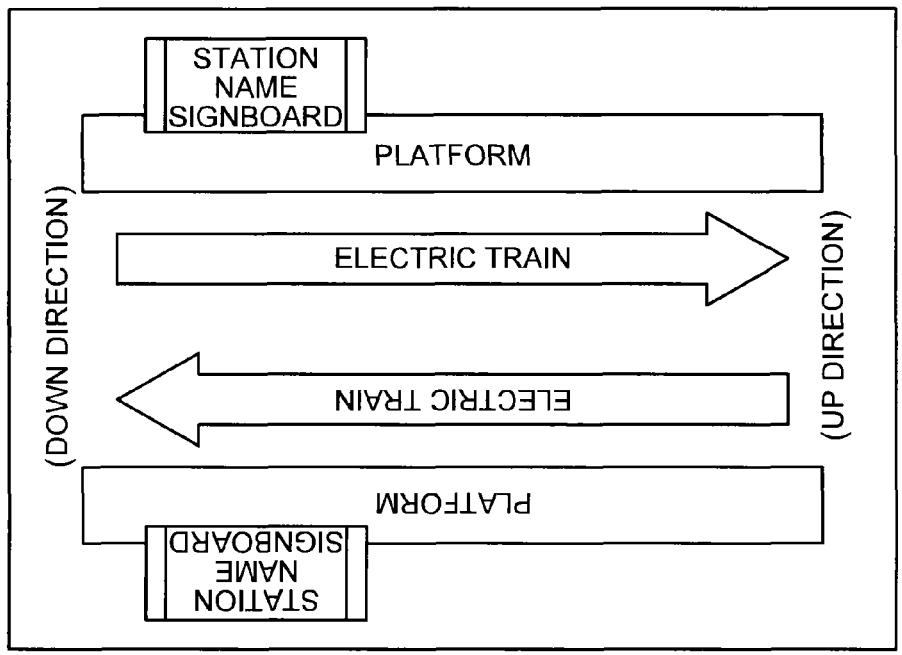
(b)
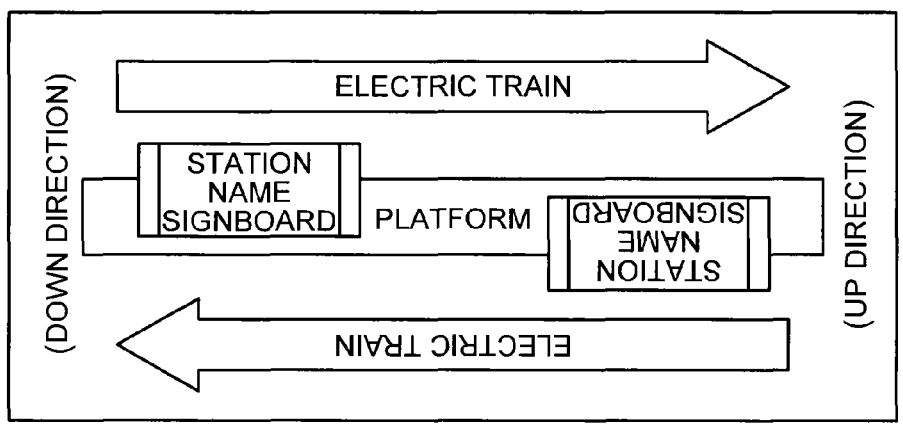
(c)

FIG.12
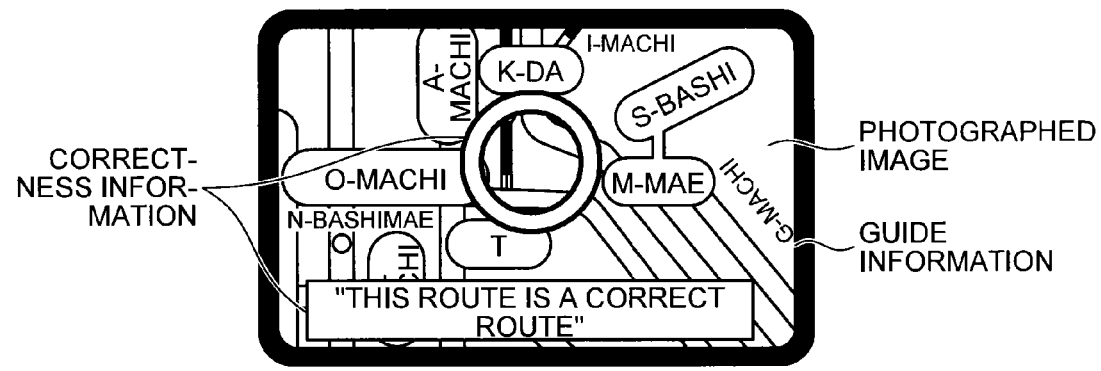
(a)
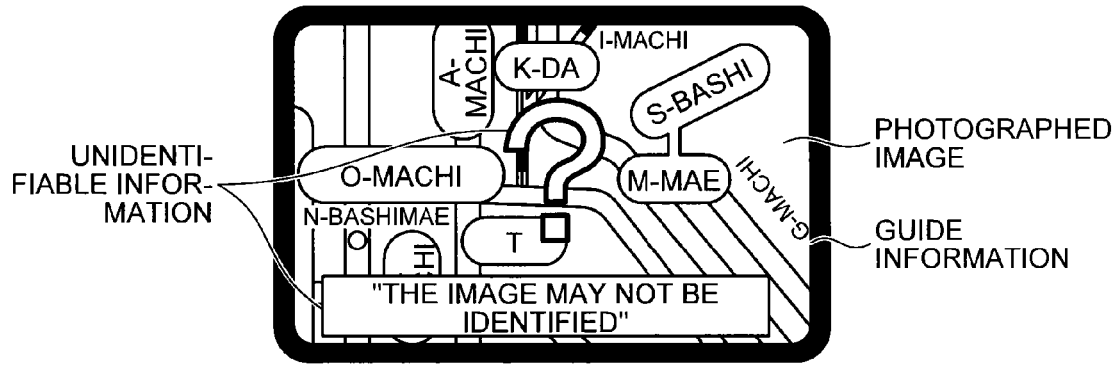
(b)
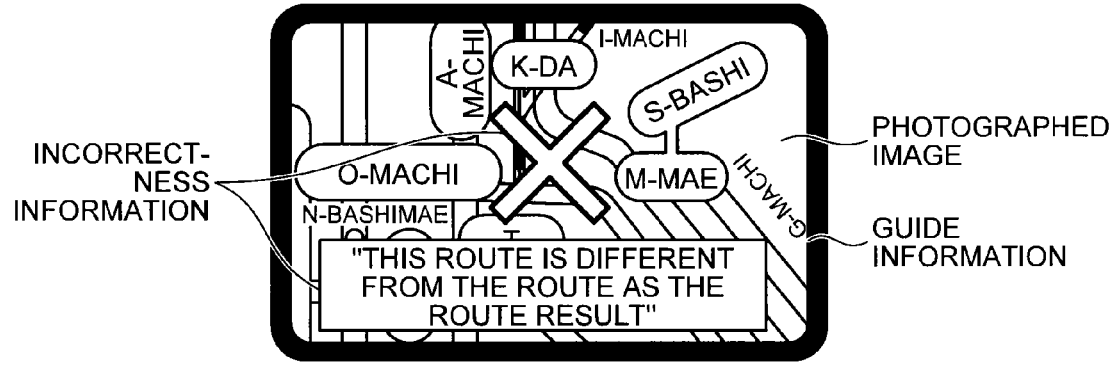
(c)
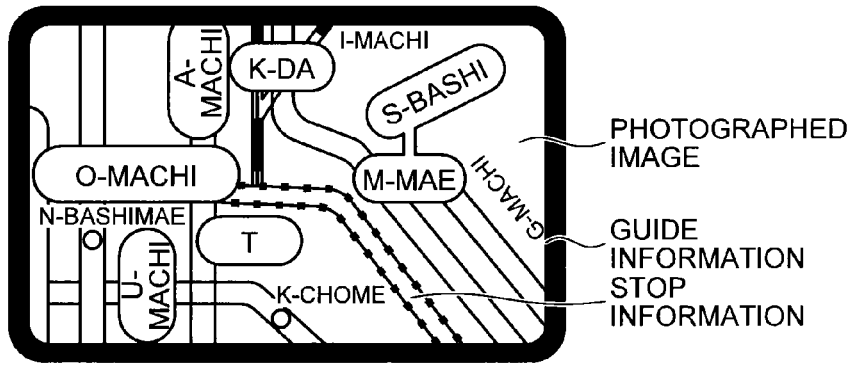
(d)

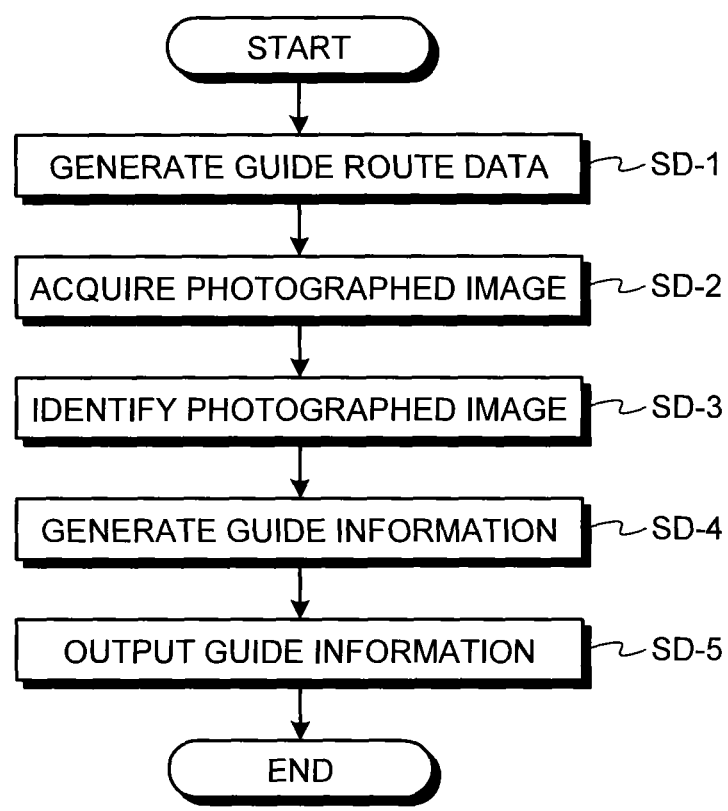

NAVIGATION SYSTEM, TERMINAL APPARATUS, NAVIGATION SERVER, NAVIGATION APPARATUS, NAVIGATION METHOD, AND COMPUTER PROGRAM PRODUCT

TECHNICAL FIELD

The present invention relates to a navigation system, a terminal apparatus, a navigation server, a navigation apparatus, a navigation method, and a computer program product.

BACKGROUND ART

Conventionally, a technology for performing a data search based on a photographed image is disclosed.

For example, in a data registering mode in which data is registered in a mobile terminal using a camera and a computer apparatus disclosed in Patent Literature 1, a technology for searching for information of peripheral facilities of a station based on an image of a corresponding station name signboard that is photographed by a mobile terminal provided with a camera is disclosed.

Patent Document 1: JP-A-2004-326473

DISCLOSURE OF INVENTION

Problem to be Solved by the Invention

However, in the conventional technology (Patent Literature 1 and the like), for example, when a user gets on an electric train at a station, there is a problem in that a situation occurs in which the user is in doubt about whether a ticket gate is right, a route is right, the user should get on an electric train disposed in front of the user, or the like, for example, before the user enters the ticket gate or when the user arrives at a platform. For example, in the data registration mode in which data is registered in a mobile terminal using a camera and a computer apparatus disclosed in Patent Literature 1, although a station name signboard is photographed, there is a problem in that no information of a user's route toward a destination can be acquired only by identifying a current station.

In addition, in the conventional technology, even a route search has been performed in advance, there is a problem in that a situation occurs in which a user may not identify the tie-up between a place at which the user is currently present and a route search result so as to be bewildered. Furthermore, in the conventional technology, although when information on whether a station at which the user is currently present is right and the like may be identified by measuring the current position, there is a problem in that no information on whether a platform at which the user is present is right, whether there is no mistake getting on an electric train disposed in front of the user, and the like can be acquired.

The present invention is contrived in view of the problems, and an object thereof is to provide a navigation system, a terminal apparatus, a navigation server, a navigation apparatus, a navigation method, and a computer program product capable of presenting guide information that is effective for a user based on a photographed image of a boarding guide display item (for example, a station name signboard, a roll sign, or a route map) that can be photographed in a station yard.

Means for Solving Problem

In order to attain this object, a navigation system according to one aspect of the present invention is a navigation system comprising a navigation server and a terminal apparatus that are connected to each other in a communicable manner, wherein the navigation server includes a control unit, and a storage unit, and the terminal apparatus includes a photographing unit, an output unit, and a control unit, the storage unit of the navigation server includes a traffic network data storage unit that stores traffic network data including station name information that represents station names of each route of means of transportation, the control unit of the navigation server includes a display content receiving unit that receives a display content of a photographed image of a boarding guide display item of the means of transportation that is transmitted from the terminal apparatus, an image identifying unit that specifies the route, the station name, and a traveling direction of a current position based on the display content received by the display content receiving unit and the traffic network data stored in the traffic network data storage unit, a guide information generating unit that extracts the station names present in the traveling direction from the traffic network data based on the route, the station name, and the traveling direction of the current position that are specified by the image identifying unit and generates guide information that includes at least a part of the extracted station names, and a guide information transmitting unit that transmits the guide information generated by the guide information generating unit to the terminal apparatus, the control unit of the terminal apparatus includes a photographed image acquiring unit that acquires the photographed image of the boarding guide display item by controlling the photographing unit, a display content extracting unit that extracts the display content from the photographed image acquired by the photographed image acquiring unit, a display content transmitting unit that transmits the display content extracted by the display content extracting unit to the navigation server, a guide information receiving unit that receives the guide information transmitted from the navigation server, and a guide information output unit that outputs at least a part of the guide information received by the guide information receiving unit through the output unit.

A navigation system according to another aspect of the present invention is the navigation, wherein the traffic network data storage unit further stores station code information that represents station codes unique to the station names of each route of the means of transportation in association with the station name information, and the image identifying unit specifies the route, the station name, and the traveling direction of the current position based on the traffic network data that includes the station code information corresponding to the station code included in the display content.

The navigation system according to still another aspect of the present invention is the navigation system, wherein the image identifying unit specifies at least one of the route, the station name, and the traveling direction of the current position by specifying at least one of the route, the station name, the traveling direction, and an operation type of the means of transportation based on at least one of characters, an arrangement of a character string, a color scheme, and symbols included in the display content.

The navigation system according to still another aspect of the present invention is the navigation system, wherein the storage unit further includes a character string arrangement information storage unit that stores character string arrangement information relating to an arrangement of a character string that includes character information of characters of the boarding guide display item and at least one of the route, the station name, the traveling direction, and the operation type of the means of transportation in association with each other, and the image identifying unit specifies at least one of the route, the station name, and the traveling direction of the current position by extracting the character string arrangement information corresponding to at least one of the characters and the arrangement of the character string included in the display content from the character string arrangement information storage unit and specifying at least one of the route, the station name, the traveling direction, and the operation type of the means of transportation based on the extracted character string arrangement information.

The navigation system according to still another aspect of the present invention is the navigation system, wherein the storage unit further includes a color scheme information storage unit that stores color scheme information relating to a color scheme that includes a combination of colors of the boarding guide display item or arrangement positions of the colors and at least one of the route, the station name, the traveling direction, and the operation type of the means of transportation in association with each other, and the image identifying unit specifies at least one of the route, the station name, and the traveling direction of the current position by extracting the color scheme information corresponding to the color scheme included in the display content from the color scheme information storage unit and specifying at least one of the route, the station name, the traveling direction, and the operation type of the means of transportation based on the extracted color scheme information.

The navigation system according to still another aspect of the present invention is the navigation system, wherein the storage unit further includes a symbol information storage unit that stores symbol information relating to symbols used in the boarding guide display item and at least one of the route, the station name, the traveling direction, and the operation type of the means of transportation in association with each other, and the image identifying unit specifies at least one of the route, the station name, and the traveling direction of the current position by extracting the symbol information corresponding to the symbol included in the display content from the symbol information storage unit and specifying at least one of the route, the station name, the traveling direction, and the operation type of the means of transportation based on the extracted symbol information.

The navigation system according to still another aspect of the present invention is the navigation system, wherein the storage unit further includes a platform information storage unit that stores platform information including position information of the boarding guide display item disposed at a platform of the station of the means of transportation and at least one of the route, the station name, and the traveling direction of the current position in association with each other, the control unit of the terminal apparatus further includes a current position information acquiring unit that acquires current position information of a user using the terminal apparatus and transmits the current position information to the navigation server, and the image identifying unit specifies at least one of the route, the station name, and the traveling direction of the current position by searching for the platform information of the position information corresponding to the current position information from the platform information storage unit based on the current position information that is transmitted from the terminal apparatus by the current position information acquiring unit.

The navigation system according to still another aspect of the present invention is the navigation system, wherein the guide information generating unit extracts the station names of stops present in the traveling direction from the traffic network data based on the route, the station name, and the traveling direction of the current position specified by the image identifying unit and generates the guide information that includes at least a part of the extracted station names.

The navigation system according to still another aspect of the present invention is the navigation system, wherein the guide information generating unit further generates the guide information that includes at least a part of the photographed image.

The navigation system according to still another aspect of the present invention is the navigation system, wherein the control unit of the navigation server includes a guide information generating unit that searches for a guide route formed from a point of departure to a destination that satisfies a route search condition, which is transmitted from the terminal apparatus, at least including the point of departure and the destination using the traffic network data stored in the traffic network data storage unit and generates guide route data, and the guide information generating unit compares the stop information generated by the guide information generating unit with the guide route data generated by the guide route searching unit, extracts the station names up to the stop that corresponds to a transit station or a destination station from the stop information, and generates the guide information that includes the stop information including the extracted station name.

The navigation system according to still another aspect of the present invention is the navigation system, wherein the guide information output unit outputs the station name of the transit station or the destination station included in the stop information that is included in the guide information being highlighted.

The navigation system according to still another aspect of the present invention is the navigation system, wherein the guide information generating unit compares the stop information generated by the guide information generating unit with the guide route data generated by the guide route searching unit and, when the station name of the stop that corresponds to the transit station or the destination station is not present in the stop information, generates the guide information that includes improper information that represents that the photographed boarding guide display item does not coincide with the guide route.

The navigation system according to still another aspect of the present invention is the navigation system, wherein the guide information generating unit compares the station name corresponding to the current position specified by the image identifying unit and the stop information generated by the guide information generating unit with the guide route data generated by the guide route searching unit and, when the station name corresponds to the departure station and the station name of the stop that corresponds to the transit station or the destination station is present in the stop information, generates the guide information that includes proper information that represents that the photographed boarding guide display item coincides with the guide route.

The navigation system according to still another aspect of the present invention is the navigation system, wherein the storage unit of the navigation server further includes a traffic information storage unit that stores traffic information of the means of transportation, and the guide information generating unit extracts the traffic information that corresponds to the route specified by the image identifying unit from the traffic information storage unit and generates the guide information that includes the extracted traffic information.

The navigation system according to still another aspect of the present invention is the navigation system, wherein the guide information generating unit, when the image identifying unit is incapable of identifying the photographed image, generates the guide information that includes unidentifiable information that represents that the image identifying unit is incapable of identifying the photographed image.

The navigation system according to still another aspect of the present invention is the navigation system, wherein the output unit includes a display unit, and the guide information output unit, when a scrolling operation is performed using the display unit through the input unit, scrolls the guide information displayed on the display unit in accordance with the scrolling operation.

The navigation system according to still another aspect of the present invention is the navigation system, wherein the input unit is a touch panel.

The navigation system according to still another aspect of the present invention is the navigation system, wherein the photographed image includes a still image and a moving image.

The terminal apparatus according to still another aspect of the present invention is a terminal apparatus that is connected to a navigation server in a communicable manner, comprising a photographing unit, an output unit, and a control unit, wherein the control unit includes a photographed image acquiring unit that acquires a photographed image of a boarding guide display item of means of transportation by controlling the photographing unit, a display content extracting unit that extracts a display content from the photographed image acquired by the photographed image acquiring unit, a display content transmitting unit that transmits the display content extracted by the display content extracting unit to the navigation server, a guide information receiving unit that receives guide information transmitted from the navigation server, and a guide information output unit that outputs at least a part of the guide information received by the guide information receiving unit through the output unit, and wherein, in the navigation server, a route, a station name, and a traveling direction of a current position are specified based on the display content of the photographed image of the boarding guide display item and traffic network data including at least station names of each route of the means of transportation, which are transmitted from the terminal apparatus, the station names present in the traveling direction are extracted from the traffic network data based on the route, the station name, and the traveling direction of the current position that are specified, and the guide information is generated so as to include at least a part of the extracted station names.

The navigation server according to still another aspect of the present invention is a navigation server that is connected to a terminal apparatus in a communicable manner comprising a control unit, and a storage unit, wherein the storage unit includes a traffic network data storage unit that stores traffic network data including station name information that represents station names of each route of means of transportation, and the control unit includes a display content receiving unit that receives a display content of a photographed image of a boarding guide display item of the means of transportation that is transmitted from the terminal apparatus, an image identifying unit that specifies the route, the station name, and a traveling direction of a current position based on the display content received by the display content receiving unit and the traffic network data stored in the traffic network data storage unit, a guide information generating unit that extracts the station names present in the traveling direction from the traffic network data based on the route, the station name, and the traveling direction of the current position that are specified by the image identifying unit and generates guide information that includes at least a part of the extracted station names, and a guide information transmitting unit that transmits the guide information generated by the guide information generating unit to the terminal apparatus.

The navigation server according to still another aspect of the present invention is a navigation server that is connected to a terminal apparatus that includes at least an output unit in a communicable manner comprising a control unit, and a storage unit, wherein the storage unit includes a traffic network data storage unit that stores traffic network data including station name information that represents station names of each route of means of transportation, and the control unit includes an image identifying unit that identifies a display content from a photographed image of a boarding guide display item of the means of transportation that is transmitted from the terminal apparatus and specifies a route, a station name, and a traveling direction of a current position based on the identified display content and the traffic network data stored in the traffic network data storage unit, a guide information generating unit that extracts the station names present in the traveling direction from the traffic network data based on the route, the station name, and the traveling direction of the current position that are specified by the image identifying unit and generates guide information that includes at least a part of the extracted station names, a display screen generating unit that generates a display screen that is based on the guide information generated by the guide information generating unit, and an output controlling unit that transmits output control information that includes a display screen generated by the display screen generating unit to the terminal apparatus and outputs the output control information through the output unit of the terminal apparatus.

The navigation apparatus according to still another aspect of the present invention is a navigation apparatus comprising a photographing unit, an output unit, a control unit, and a storage unit, wherein the storage unit includes a traffic network data storage unit that stores traffic network data including station name information that represents station names of each route of means of transportation, the control unit includes a photographed image acquiring unit that acquires a photographed image of a boarding guide display item by controlling the photographing unit, an image identifying unit that identifies a display content from the photographed image of the boarding guide display item of the means of transportation acquired by the photographed image acquiring unit and specifies a route, a station name, and a traveling direction of a current position based on the identified display content and the traffic network data stored in the traffic network data storage unit, a guide information generating unit that extracts the station names present in the traveling direction from the traffic network data based on the route, the station name, and the traveling direction of the current position that are specified by the image identifying unit and generates guide information that includes at least a part of the extracted station names, and a guide information output unit that outputs at least a part of the guide information generated by the guide information generating unit through the output unit.

The navigation method according to still another aspect of the present invention is a navigation method that is performed in a navigation system that connects a navigation server including a control unit and a storage unit and a terminal apparatus including a photographing unit, an output unit, and a control unit to each other in a communicable manner, wherein the storage unit of the navigation server includes a traffic network data storage unit that stores traffic network data including station name information that represents station names of each route of means of transportation, the method comprising a photographed image acquiring step of acquiring the photographed image of the boarding guide display item by controlling the photographing unit that is performed by the control unit of the terminal apparatus, a display content extracting step of extracting the display content from the photographed image acquired at the photographed image acquiring step that is performed by the control unit of the terminal apparatus, a display content transmitting step of transmitting the display content extracted at the display content extracting step to the navigation server that is performed by the control unit of the terminal apparatus, a display content receiving step of receiving a display content of a photographed image of a boarding guide display item of the means of transportation that is transmitted at the display content transmitting step from the terminal apparatus that is performed by the control unit of the navigation server, an image identifying step of specifying the route, the station name, and a traveling direction of a current position based on the display content received at the display content receiving step and the traffic network data stored in the traffic network data storage unit that is performed by the control unit of the navigation server, a guide information generating step of extracting the station names present in the traveling direction from the traffic network data based on the route, the station name, and the traveling direction of the current position that are specified at the image identifying step and generating guide information that includes at least a part of the extracted station names that is performed by the control unit of the navigation server, a guide information transmitting step of transmitting the guide information generated at the guide information generating step to the terminal apparatus that is performed by the control unit of the navigation server, a guide information receiving step of receiving the guide information transmitted at the guide information transmitting step from the navigation server that is performed by the control unit of the terminal apparatus, a guide information output step of outputting at least a part of the guide information received at the guide information receiving step through the output unit that is performed by the control unit of the terminal apparatus.

The navigation method according to still another aspect of the present invention is a navigation method executed by a terminal apparatus that is connected to a navigation server in a communicable manner, including a photographing unit, an output unit, and a control unit, the method executed by the control unit comprising a photographed image acquiring step of acquiring a photographed image of a boarding guide display item of means of transportation by controlling the photographing unit, a display content extracting step of extracting a display content from the photographed image acquired at the photographed image acquiring step, a display content transmitting step of transmitting the display content extracted at the display content extracting step to the navigation server, a guide information receiving step of receiving guide information transmitted from the navigation server, and a guide information output step of outputting at least a part of the guide information received at the guide information receiving step through the output unit, and wherein, in the navigation server, a route, a station name, and a traveling direction of a current position are specified based on the display content of the photographed image of the boarding guide display item and traffic network data including at least station names of each route of the means of transportation, which are transmitted from the terminal apparatus, the station names present in the traveling direction are extracted from the traffic network data based on the route, the station name, and the traveling direction of the current position that are specified, and the guide information is generated so as to include at least a part of the extracted station names.

The navigation method according to still another aspect of the present invention is a navigation method executed by a navigation server that is connected to a terminal apparatus in a communicable manner including a control unit, and a storage unit, wherein the storage unit includes a traffic network data storage unit that stores traffic network data including station name information that represents station names of each route of means of transportation, the method executed by the control unit comprising a display content receiving step of receiving a display content of a photographed image of a boarding guide display item of the means of transportation that is transmitted from the terminal apparatus, an image identifying step of specifying the route, the station name, and a traveling direction of a current position based on the display content received at the display content receiving step and the traffic network data stored in the traffic network data storage unit, a guide information generating step of extracting the station names present in the traveling direction from the traffic network data based on the route, the station name, and the traveling direction of the current position that are specified at the image identifying step and generating guide information that includes at least a part of the extracted station names, and a guide information transmitting step of transmitting the guide information generated at the guide information generating step to the terminal apparatus.

The navigation method according to still another aspect of the present invention is a navigation method executed by a navigation server that is connected to a terminal apparatus that includes at least an output unit in a communicable manner including a control unit, and a storage unit, wherein the storage unit includes a traffic network data storage unit that stores traffic network data including station name information that represents station names of each route of means of transportation, the method executed by the control unit comprising an image identifying step of identifying a display content from a photographed image of a boarding guide display item of the means of transportation that is transmitted from the terminal apparatus and specifying a route, a station name, and a traveling direction of a current position based on the identified display content and the traffic network data stored in the traffic network data storage unit, a guide information generating step of extracting the station names present in the traveling direction from the traffic network data based on the route, the station name, and the traveling direction of the current position that are specified at the image identifying step and generating guide information that includes at least a part of the extracted station names, a display screen generating step of generating a display screen that is based on the guide information generated at the guide information generating step, and an output controlling step of transmitting output control information that includes a display screen generated at the display screen generating step to the terminal apparatus and outputting the output control information through the output unit of the terminal apparatus.

The navigation method according to still another aspect of the present invention is a navigation method executed by a navigation apparatus including a photographing unit, an output unit, a control unit, and a storage unit, wherein the storage unit includes a traffic network data storage unit that stores traffic network data including station name information that represents station names of each route of means of transportation, the method executed by the control unit comprising a photographed image acquiring step of acquiring a photographed image of a boarding guide display item by controlling the photographing unit, an image identifying step of identifying a display content from the photographed image of the boarding guide display item of the means of transportation acquired at the photographed image acquiring step and specifying a route, a station name, and a traveling direction of a current position based on the identified display content and the traffic network data stored in the traffic network data storage unit, a guide information generating step of extracting the station names present in the traveling direction from the traffic network data based on the route, the station name, and the traveling direction of the current position that are specified at the image identifying step and generating guide information that includes at least a part of the extracted station names, and a guide information output step of outputting at least a part of the guide information generated at the guide information generating step through the output unit.

The computer program product according to still another aspect of the present invention is a computer program product having a non-transitory computer readable mediums including programmed instructions for a navigation method executed by a terminal apparatus that is connected to a navigation server in a communicable manner, including a photographing unit, an output unit, and a control unit, wherein the instructions, when executed by the control unit, cause the control unit to execute a photographed image acquiring step of acquiring a photographed image of a boarding guide display item of means of transportation by controlling the photographing unit, a display content extracting step of extracting a display content from the photographed image acquired at the photographed image acquiring step, a display content transmitting step of transmitting the display content extracted at the display content extracting step to the navigation server, a guide information receiving step of receiving guide information transmitted from the navigation server, and a guide information output step of outputting at least a part of the guide information received at the guide information receiving step through the output unit, and wherein, in the navigation server, a route, a station name, and a traveling direction of a current position are specified based on the display content of the photographed image of the boarding guide display item and traffic network data including at least station names of each route of the means of transportation, which are transmitted from the terminal apparatus, the station names present in the traveling direction are extracted from the traffic network data based on the route, the station name, and the traveling direction of the current position that are specified, and the guide information is generated so as to include at least a part of the extracted station names.

The computer program product according to still another aspect of the present invention is a computer program product having a non-transitory computer readable mediums including programmed instructions for a navigation method executed by a navigation server that is connected to a terminal apparatus in a communicable manner including a control unit, and a storage unit, wherein the storage unit includes a traffic network data storage unit that stores traffic network data including station name information that represents station names of each route of means of transportation, wherein the instructions, when executed by the control unit, cause the control unit to execute a display content receiving step of receiving a display content of a photographed image of a boarding guide display item of the means of transportation that is transmitted from the terminal apparatus, an image identifying step of specifying the route, the station name, and a traveling direction of a current position based on the display content received at the display content receiving step and the traffic network data stored in the traffic network data storage unit, a guide information generating step of extracting the station names present in the traveling direction from the traffic network data based on the route, the station name, and the traveling direction of the current position that are specified at the image identifying step and generating guide information that includes at least a part of the extracted station names, and a guide information transmitting step of transmitting the guide information generated at the guide information generating step to the terminal apparatus.

The computer program product according to still another aspect of the present invention is a computer program product having a non-transitory computer readable mediums including programmed instructions for a navigation method executed by a navigation server that is connected to a terminal apparatus that includes at least an output unit in a communicable manner including a control unit, and a storage unit, wherein the storage unit includes a traffic network data storage unit that stores traffic network data including station name information that represents station names of each route of means of transportation, wherein the instructions, when executed by the control unit, cause the control unit to execute an image identifying step of identifying a display content from a photographed image of a boarding guide display item of the means of transportation that is transmitted from the terminal apparatus and specifying a route, a station name, and a traveling direction of a current position based on the identified display content and the traffic network data stored in the traffic network data storage unit, a guide information generating step of extracting the station names present in the traveling direction from the traffic network data based on the route, the station name, and the traveling direction of the current position that are specified at the image identifying step and generating guide information that includes at least a part of the extracted station names, a display screen generating step of generating a display screen that is based on the guide information generated at the guide information generating step, and an output controlling step of transmitting output control information that includes a display screen generated at the display screen generating step to the terminal apparatus and outputting the output control information through the output unit of the terminal apparatus.

The computer program product according to still another aspect of the present invention is a computer program product having a non-transitory computer readable mediums including programmed instructions for a navigation method executed by a navigation apparatus including a photographing unit, an output unit, a control unit, and a storage unit, wherein the storage unit includes a traffic network data storage unit that stores traffic network data including station name information that represents station names of each route of means of transportation, wherein the instructions, when executed by the control unit, cause the control unit to execute a photographed image acquiring step of acquiring a photographed image of a boarding guide display item by controlling the photographing unit, an image identifying step of identifying a display content from the photographed image of the boarding guide display item of the means of transportation acquired at the photographed image acquiring step and specifying a route, a station name, and a traveling direction of a current position based on the identified display content and the traffic network data stored in the traffic network data storage unit, a guide information generating step of extracting the station names present in the traveling direction from the traffic network data based on the route, the station name, and the traveling direction of the current position that are specified at the image identifying step and generating guide information that includes at least a part of the extracted station names, and a guide information output step of outputting at least a part of the guide information generated at the guide information generating step through the output unit.

Effect of the Invention

According to the present invention, because the present invention stores in the storage unit traffic network data including station name information that represents station names of each route of means of transportation, receives a display content of a photographed image of a boarding guide display item of the means of transportation that is transmitted from the terminal apparatus, specifies the route, the station name, and a traveling direction of a current position based on the display content received and the traffic network data stored in the storage unit, extracts the station names present in the traveling direction from the traffic network data based on the route, the station name, and the traveling direction of the current position that are specified and generates guide information that includes at least a part of the extracted station names, transmits the guide information generated to the terminal apparatus, acquires the photographed image of the boarding guide display item by controlling the photographing unit, extracts the display content from the photographed image acquired, transmits the display content extracted to the navigation server, receives the guide information transmitted from the navigation server, and outputs at least a part of the guide information received through the output unit, effective guide information can be presented to a user based on the display content (for example, characters of station names and the like, a color scheme representing a route and the like, symbols representing the traveling direction and the like) identified from the photographed image of the boarding guide display item that can be photographed inside a station and the traffic network data. Therefore, according to the present invention, there is an advantage that, for example, when a user takes an electric train at a station, for example, before entering a ticket gate or after arriving at a platform, guide information from which whether the entering of the ticket gate is correct, whether the route is correct, whether an electric train disposed in front of him may be taken, and the like can be determined, for example, guide information on which user's traveling direction toward the destination is reflected can be presented.

According to the present invention, because the present invention further stores in the storage unit station code information that represents station codes unique to the station names of each route of the means of transportation in association with the station name information, and specifies the route, the station name, and the traveling direction of the current position based on the traffic network data that includes the station code information corresponding to the station code included in the display content, for example, there is an advantage that the route, the station name, and the traveling direction of the current position can be specified more accurately based on the display content such as a station code that is used in the boarding guide display item.

According to the present invention, because the present invention specifies at least one of the route, the station name, and the traveling direction of the current position by specifying at least one of the route, the station name, the traveling direction, and an operation type of the means of transportation based on at least one of characters, an arrangement of a character string, a color scheme, and symbols included in the display content, there is an advantage that the route, the station name, and the traveling direction of the current position can be specified more accurately based on at least one of characters, the arrangement of a character string, a color scheme, and symbols that are included in the display content.

According to the present invention, because the present invention stores character string arrangement information relating to an arrangement of a character string that includes character information of characters of the boarding guide display item and at least one of the route, the station name, the traveling direction, and the operation type of the means of transportation in association with each other in the storage unit, and specifies at least one of the route, the station name, and the traveling direction of the current position by extracting the character string arrangement information corresponding to at least one of the characters and the arrangement of the character string included in the display content from the storage unit and specifying at least one of the route, the station name, the traveling direction, and the operation type of the means of transportation based on the extracted character string arrangement information, there is an advantage that the route, the station name, and the traveling direction of the current position can be specified further more accurately based on specified character string arrangement information after specifying the character string arrangement information that corresponds to at least one of characters and the arrangement of a character string included in the display content.

According to the present invention, because the present invention stores in the storage unit color scheme information relating to a color scheme that includes a combination of colors of the boarding guide display item or arrangement positions of the colors and at least one of the route, the station name, the traveling direction, and the operation type of the means of transportation in association with each other, and specifies at least one of the route, the station name, and the traveling direction of the current position by extracting the color scheme information corresponding to the color scheme included in the display content from the storage unit and specifying at least one of the route, the station name, the traveling direction, and the operation type of the means of transportation based on the extracted color scheme information, there is an advantage that the route, the station name, and the traveling direction of the current position can be specified further more accurately based on specified color scheme information after specifying the color scheme information that corresponds to a color scheme included in the display content.

According to the present invention, because the present invention stores in the storage unit symbol information relating to symbols used in the boarding guide display item and at least one of the route, the station name, the traveling direction, and the operation type of the means of transportation in association with each other, and specifies at least one of the route, the station name, and the traveling direction of the current position by extracting the symbol information corresponding to the symbol included in the display content from the storage unit and specifying at least one of the route, the station name, the traveling direction, and the operation type of the means of transportation based on the extracted symbol information, there is an advantage that the route, the station name, and the traveling direction of the current position can be specified further more accurately based on specified symbol information after specifying the symbol information that corresponds to a symbol included in the display content.

According to the present invention, because the present invention stores in the storage unit platform information including position information of the boarding guide display item disposed at a platform of the station of the means of transportation and at least one of the route, the station name, and the traveling direction of the current position in association with each other, acquires current position information of a user using the terminal apparatus and transmits the current position information to the navigation server, and specifies at least one of the route, the station name, and the traveling direction of the current position by searching for the platform information of the position information corresponding to the current position information from the storage unit based on the current position information that is transmitted from the terminal apparatus by the current position information acquiring unit, there is an advantage that the route, the station name, and the traveling direction of the current position can be specified more accurately even when the traveling direction may not be specified based on the display content of the boarding guide display item (for example, when station names and arrow symbols are present in two directions).

According to the present invention, because the present invention extracts the station names of stops present in the traveling direction from the traffic network data based on the route, the station name, and the traveling direction of the current position specified and generates the guide information that includes at least a part of the extracted station names, there is an advantage that a list of stops that are present in the traveling direction can be presented. Therefore, according to the present invention, there is an advantage that guide information from which whether the route is correct, whether an electric train disposed in front of him may be taken, and the like can be determined can be presented, for example, when a user takes an electric train at a station, after arriving at a platform.

According to the present invention, because the present invention further generates the guide information that includes at least a part of the photographed image, for example, the stop information representing a list of stops and the like can be presented together with the photographed image of the boarding guide display item such as a station name signboard that is photographed by the user. Therefore, according to the present invention, there is an advantage that guide information, from which whether the station at which the user is currently located is correct, whether the platform at which the user is currently located is correct, whether there is a mistake in taking an electric train disposed in front of him, and the like can be determined, can be presented to the user in a clear manner.

According to the present invention, because the present invention searches for a guide route formed from a point of departure to a destination that satisfies a route search condition, which is transmitted from the terminal apparatus, at least including the point of departure and the destination using the traffic network data stored in the storage unit and generates guide route data, and compares the stop information generated with the guide route data generated, extracts the station names up to the stop that corresponds to a transit station or a destination station from the stop information, and generates the guide information that includes the stop information including the extracted station name, there is an advantage that only station names up to a transit station or a destination station at which the user gets off a train can be presented based on a list of stops that are present in the traveling direction. Therefore, according to the present invention, there is an advantage that the link between the place at which the user is currently located and a route search result can be easily recognized by the user.

According to the present invention, because the present invention outputs the station name of the transit station or the destination station included in the stop information that is included in the guide information being highlighted, there is an advantage that station names up to a transit station or a destination station at which the user gets off a train can be presented more clearly based on a list of stops that are present in the traveling direction.

According to the present invention, because the present invention compares the stop information generated with the guide route data generated and, when the station name of the stop that corresponds to the transit station or the destination station is not present in the stop information, generates the guide information that includes improper information that represents that the photographed boarding guide display item does not coincide with the guide route, for example, there is an advantage that a screen, on which a symbol such as an X mark and a text indicating that the photographed boarding guide display item does not coincide with the guide route are displayed, and the like can be output as the improper information. Therefore, according to the present invention, there is an advantage that the link between the place at which the user is currently located and a route search result can be more clearly recognized by the user.

According to the present invention, because the present invention compares the station name corresponding to the current position specified and the stop information generated with the guide route data generated and, when the station name corresponds to the departure station and the station name of the stop that corresponds to the transit station or the destination station is present in the stop information, generates the guide information that includes proper information that represents that the photographed boarding guide display item coincides with the guide route, for example, there is an advantage that a screen, on which a symbol such as a white circle and a text that indicates that the photographed boarding guide display item coincides with the guide route are displayed, and the like can be output as the proper information. Therefore, according to the present invention, there is an advantage that the link between the place at which the user is currently located and a route search result can be more clearly recognized by the user.

According to the present invention, because the present invention stores traffic information of the means of transportation, and extracts the traffic information that corresponds to the route specified from the storage unit and generates the guide information that includes the extracted traffic information, for example, when there is a delay or the like in a route to be taken by the user, there is an advantage that guide information that displays a route on which a delay occurs can be generated by referring to the traffic information. Therefore, according to the present invention, there is an advantage that guide information from which whether there is a mistake in taking an electric train disposed in front of the user can be determined can be presented to the user more clearly.

According to the present invention, because the present invention, when the present invention is incapable of identifying the photographed image, generates the guide information that includes unidentifiable information that represents that the present invention is incapable of identifying the photographed image, there is an advantage that the user can directly take another display guide target item that can be identified in a speedy manner.

According to the present invention, because the output unit includes a display unit, and the present invention, when a scrolling operation is performed using the display unit through the input unit, scrolls the guide information displayed on the display unit in accordance with the scrolling operation, even when the whole guide information may not be displayed on the display unit (for example, when the whole list of stops present in the traveling direction, whole route map, or the like may not be displayed), by a user performing a scrolling operation, there is an advantage that the list of stops, the route map, or the like that is not displayed on the display unit is scrolled, whereby the user can check the station name or the like.

According to the present invention, because the input unit is a touch panel, there is an advantage that a scrolling operation or the like can be performed for the guide information displayed on the display unit by a user through an intuitive operation.

According to the present invention, because the photographed image includes a still image and a moving image, there is an advantage that guide information that is effective to the user can be more accurately generated in real time, for example, based on a photographed image including a plurality of display guide display items photographed by the user.

Here, advantages of the navigation system of the present invention are explained above as one example, the terminal apparatus, the navigation server, the navigation apparatus, the navigation method, and the computer program product have these advantages as well.

BRIEF DESCRIPTION OF DRAWINGS

FIG. 6 is a diagram that illustrates another example of an image determining method according to this embodiment when the boarding guide display item is a station name signboard.

FIG. 12 is a diagram for explaining an example of the guide information when the boarding guide display item according to this embodiment is a route map.

FIG. 16 is a flowchart for illustrating an example of the process of the navigation apparatus according to the third embodiment.

BEST MODE(S) FOR CARRYING OUT THE INVENTION

The following describes an embodiment of a navigation system, a terminal apparatus, a navigation server, a navigation apparatus, a navigation method, and a program according to the present invention in detail with reference to the drawings below. The present invention is not limited to the embodiments.

Hereinafter, configurations and processes according to the present invention will be explained in detail in order of a first embodiment (navigation system), a second embodiment (navigation server (server-leading type)), and a third embodiment (navigation apparatus (standalone type)).

First Embodiment

Firstly, the first embodiment (navigation system) of the present invention will be explained with reference to FIGS. 1 to 12.

Configuration of Navigation System

Figure 1:
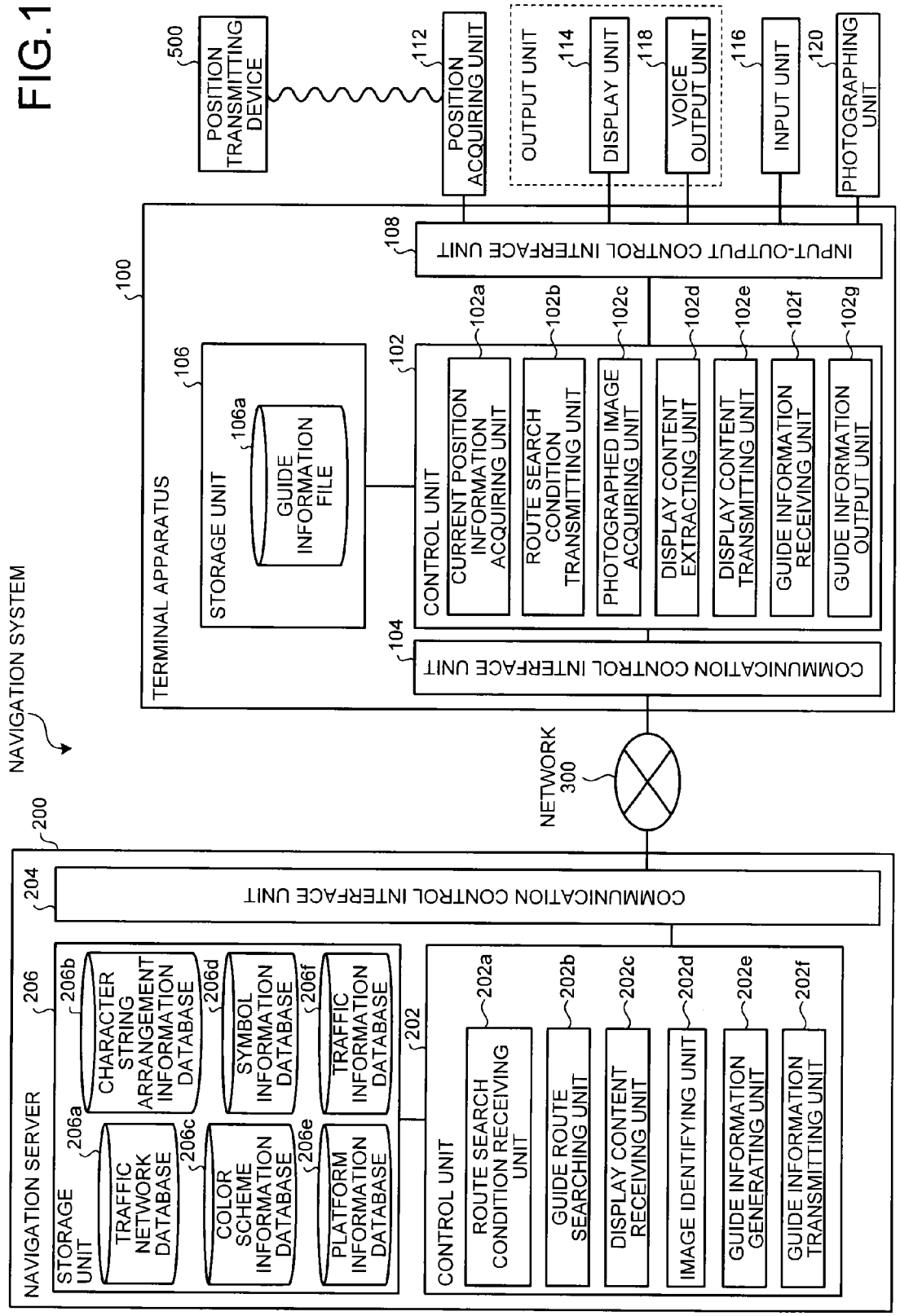
FIG. 1 is a block diagram of an example of a configuration of a navigation system according to first embodiment.

Here, an example of structure of the navigation system is explained below with reference to FIG. 1. FIG. 1 is a block diagram for illustrating an example of the configuration of the navigation system according to the first embodiment and conceptually illustrates only a part of the configuration that relates to the present invention.

As illustrated in FIG. 1, a navigation server 200 conceptually at least includes a control unit 202 and a storage unit 206, and a terminal apparatus 100 at least includes a position acquiring unit 112, an output unit (a display unit 114 and a voice output unit 118), an input unit 116, a photographing unit 120, a control unit 102, and a storage unit 106 in the navigation system according to the first embodiment.

Configuration of Navigation Server 200

In FIG. 1, the navigation server 200 has functions of receiving a display content (for example, characters, arrangement of character strings, color schemes, symbols) of a photographed image of a boarding guide display item of the means of transportation that is transmitted from the terminal apparatus 100, specifying the route, the station name, and a traveling direction of a current position based on the display content received and the traffic network data stored in the storage unit 206, extracting the station names present in the traveling direction from the traffic network data based on the route, the station name, and the traveling direction of the current position that are specified and generating guide information that includes at least a part of the extracted station names, and transmitting the guide information generated to the terminal apparatus 100. The navigation server 200 is connected to the terminal apparatus 100 through a network 300 via a communication control interface unit 204, and includes the control unit 202 and the storage unit 206. The control unit 202 is a control unit that controls various processing. The communication control interface unit 204 is an interface connected to a communication device (not shown) such as a router connected to a communication line, a phone line and the like, and has a function of performing communication control between the navigation server 200 and the network 300. That is to say, the communication control interface unit 204 may have a function to communicate data to the terminal apparatus 100, or the like via the communication line. The storage unit 206 is a storage unit that is a fixed disk device such as Hard Disk Drive (HDD), Solid State Drive (SSD) and the like, and stores various databases and tables (for example, a traffic network database 206a, a character string arrangement information database 206b, a color scheme information database 206c, a symbol information database 206d, a platform information database 206e, a traffic information database 206f, and the like).

Out of the constituent elements of the storage unit 206, the traffic network database 206a is a traffic network data storage unit that stores traffic network data including at least station name information that represents station names on each route of means of transportation. Here, the station name information stored in the traffic network database 206a may be character data that represents station names for each route such as station S-YA in line Y, station M-MAE in line F, and station A in line M. In addition, the traffic network database 206a may store station code information that represents unique station codes in the station names for each route of means of transportation in association with the station name information. Here, the station code information that is stored in the traffic network database 206a, for example, may be symbol data such as a station code "F14" that represents K-DO station, a station code "F15" that represents M-MAE station, and a station code "F16" that represents S-YA station in the case of line F. These station name information and the station code information are stored in advance in association with each node of the traffic network data of the traffic network database 206a, and the control unit 202 of the navigation server 200 may download latest data from an external system or the like through the network 300 on a regular basis (for example, every five minutes) and update the station name information and the station code information that are stored in the traffic network database 206a.

In addition, the traffic network data that is stored in the traffic network database 206a may include route network data, road network data, and an in-facility network data. Such data is stored in the traffic network database 206a in advance, and the control unit 202 of the navigation server 200 may download latest data from an external apparatus or the like through the network 300 on a regular basis and update the traffic network data that is stored in the traffic network database 206a.

Here, the route network data that is stored in the traffic network database 206a is network data that defines route networks of means of transportation (for example, public means of transportation) such as railroads (for example, railroad trains, electric trains, and subways), airplanes, buses (for example, road surface buses and express buses), and ships (for example, ferries) and is network data that is represented by a combination of node data of nodes (for example, a station, a stop, a depot, a stand, an airport, a port, and a terminal that are stop places of the means of transportation) that are nodal points in the representation of a route network and link data of links of a rail route, an airway route, a sea route, a bus route, and the like that connect nodes. Here, the railroad is means of transportation that transports passengers, goods, and the like by traveling with being guided by a fixed-type guiding path (a rail or a guide rail) or the like that is disposed on a route and, for example, may be an electric train, a municipal streetcar, a ropeway, a monorail, a cable car, or a linear motor car. In addition, the node data may include information such as of a node number (for example, a node ID), the name of a node (for example, the name of a stop, the name of a depot, the name of a stand, the name of an airport, the name of a port, and the name of a terminal that are names of stop places of the means of transportation) and specific positional coordinates of the longitude, latitude, and altitude). In addition, the link data may include information of a link number (for example, a link ID), a start node ID, an end node ID, a type, a link length (for example, a distance), the attributes of the inside of a link such as a raised, a tunnel, or a bridge, and a name (for example, a route name). In this embodiment, the node data may at least include station name information that represents station names of each route and station code information that represents station codes unique to each station name for each route of means of transportation that is associated with the station name information.

In addition, the route network data may include time table data of means of transportation. Here, the time table data is information that represents time tables of each means of transportation such as a railroad, an airplane, a bus, or a ship. The time table data may be information that includes destination information of means of transportation (for example, final destination information) and operation types (for example, a limited express, an express, a semi-express, a rapid-service, a rapid-service express, a commuter limited express, a commuter rapid-service, a commuter express, a section express, a section semi-express, a section rapid-service, a local, and an ordinary). In addition, the time table data may be information that further includes attribute information of departure time and arrival time (for example, predicted departure time, going-through time, and arrival time) of means of transportation at each one of nodes (in other words, the stop places of the means of transportation) on a route, the names of routes of means of transportation, the names of nodes (in other words, the stop places of the means of transportation) on a route of the means of transportation, and the like. Furthermore, the time table data may include attribute information (for example, information of operation types and destinations) of the means of transportation that is associated with each interval (for example, one or a plurality of links) that combines nodes on the route of the means of transportation.

Furthermore, the route network data may include fare data of means of transportation. Here, the fare data, for example, may be information that represents a fare and the like that occur when each one of the means of transportation such as a railroad, an airplane, a bus, or a ship is used. In addition, the route network data may include boarding position data. Here, the boarding position data, for example, may be information that represents a boarding position (for example, a car that is close to the ticket gate, a car located at a position that is convenient for a transfer, a car that has a low congestion rate, and a car dedicated to women) of means of transportation in which a plurality of cars are connected such as an electric train, a municipal streetcar, a monorail, a cable car, or a linear motor car. Furthermore, the route network data may include operating information of each one of means of transportation such as railroad operating information, airplane operating information, ship operating information, and bus operating information. Such operating information of each one of the means of transportation is stored in the traffic network database 206a in advance, and the control unit 202 of the navigation server 200 may download latest data from an external system or the like through the network 300 on a regular basis and update the operating information of each one of the means of transportation that is stored in the traffic network database 206a.

In addition, the road network data that is stored in the traffic network database 206a is network data that defines a road network and, for example, is network data that is represented by a combination of node data of nodes that are nodal points in the representation of a road network such as intersections and link data of links that are road sections located between the nodes. Here, the node data may include information of a node number (for example, an node ID), the name of a node, position coordinates such as the longitude, latitude, and altitude, a node type, the number of connected links, connected node numbers, and the name of an intersection. In addition, the link data may include information of a link number (for example, a link ID), a start node ID, an end node ID, the type of a road, a route number of a national road, a prefectural road, a municipal road, or the like, important route information, attribute information of an administrative district in which a link is located, a link length (for example, a distance), a road service status, a traffic regulation section under abnormal weather, vehicle weight restriction, vehicle height restriction, a road width, a road width type, lane information (for example, vehicle traffic zone information relating to the number of lanes, a dedicated traffic zone, a traffic zone giving priority to route buses or the like, vehicle traffic division, and traffic division for each traveling direction), the speed limit, attributes of the inside of the link such as a raised, a tunnel, or a bridge, and the names. Furthermore, the road network data may include fare data. Here, the fare data may be information that represents the cost of fuel consumed when traveling is made using a vehicle, an auto bicycle, or the like, the toll of a toll road such as a national expressway, a vehicle-dedicated road, or the like. In addition, the road network data may store positional information such as the longitude, latitude, and altitude of a facility that is present on a route when traveling is made using a vehicle, an auto bicycle, or a bicycle, on foot, or the like.

Furthermore, the road network data may include road traffic information. Here, the road traffic information may include traffic jam information such as a traffic jam occurring place, a traffic jam distance, or a transition time (in other words, a traveling time) between two places on a road. In addition, the road traffic information may include traffic obstacle information or traffic regulation information. Here, the traffic regulation information is data that defines a variety of traffic regulations, and, for example, may include information of traffic regulations under abnormal weather such as precipitation regulations, snow and freeze regulations, ultra wave regulations, wind-speed regulations, and visibility regulations, vehicular traffic regulations such as height regulations and weight regulations, regulation due to construction that are accompanied with construction, an operation of a road, and construction near a road, regulations of a traffic zone that is allowed for traffic in accordance with a time zone and a vehicle type, vehicle traffic prohibition due to destruction of a road and the like, entry prohibition of general vehicles due to a community zone that is installed so as to acquire the security of traffic, entry prohibition of general cars due to a road being connected to a private land. The road traffic information is stored in the traffic network database 206a in advance, and the control unit 202 of the navigation server 200 may download latest data from an external system (for example, Vehicle Information and Communication System (VICS) (registered trademark), Advanced Traffic Information Service (ATIS), and Japanese Road Traffic Information Center (JARTIC)) through the network 300 on a regular basis (for example, for every five minutes) and update the road traffic information that is stored in the traffic network database 206a.

In addition, the in-facility network data that is stored in the traffic network database 206a is network data that defines a route network inside the facility. Here, the in-facility network data that is stored in the traffic network database 206a, for example, is network data that is represented by a combination of node data of nodes that are nodal points connecting passages such as doorways of a store, a company, an office, and a restroom disposed inside a structure, gates of an elevator and an escalator, a doorway of stairs, a boarding gate of an airplane, a boarding position of an electric train or the like on a platform of a station, and a ticket gate of a station, and link data of links that are a passage, stairs, a moving walkway, an escalator, and an elevator that are connected between nodes.

Here, the node data may include information of node numbers (for example, node IDs), the names of nodes (names of doorways and names of gates), position coordinates such as the longitude, latitude, and altitude, node types (for example, a doorway, a gate, the corner of a passage, and a branching point of a passage), the number of connected links, and connected node numbers. In addition, the link data may include information of a link number (for example, a link ID), a start node ID, an end node ID, a link length, a width, a link type (for example, a passage, stairs, a slope, an escalator, an elevator, or a walkway that connects nodes), and barrier free design. Here, a facility may be an indoor structure such as a station, an office building, a hotel, a department store, a supermarket, a museum, an art gallery, a school, an aquarium, an underground passage, a multi-story parking lot, an underground parking lot, or an underground shopping center. In addition, the facility may be an outdoor structure such as a bus terminal, a park, an amusement park, a camping place, a passageway, an outdoor parking lot, and a zoo.

In addition, the character string arrangement information database 206b is a character string arrangement information storage unit that stores character string arrangement information relating to the arrangement of a character string including character information of characters of the boarding guide display item in association with at least one of a route, a station name, a traveling direction, and the operation type of means of transportation. Here, for example, the character information included in the character string arrangement information stored in the character string arrangement information database 206b may be character data such as characters that represent a station name, a station code, a route name, a destination, an operation type, and the like. In addition, the character string arrangement information stored in the character string arrangement information database 206b may be coordinate data that represents the arrangement of a character string from which the type of a boarding guide display item (for example, a station name signboard, a roll sign, or a route map) can be determined. In addition, the character string arrangement information stored in the character string arrangement information database 206b may be coordinate data that represents the arrangement of a character string from which at least one of a route, a station name, and a traveling direction of the current position and the operation type of transportation can be specified.

For example, when the boarding guide display item is a station name signboard that is disposed at a final station of a route, and two station names (for example, U-DA and F-SHIMA) are displayed in the station name signboard, the character string arrangement information that is stored in the character string arrangement information database 206b may be coordinate data that represents the arrangement of a character string from which a route (for example, line H), a station name (for example, U-DA), and a traveling direction (for example, the direction of F-SHIMA) of the current position can be specified by the control unit 202 of the navigation server 200 based on the arrangement (for example, an arrangement of F-SHIMA at a position located on the left side and U-DA at the center position in the station name signboard) of character strings of two station names that are displayed in the station name signboard. In addition, for example, when the boarding guide display item is a station name signboard that is disposed at a station (for example, S-YA at which routes such as line T, line D, line Y, line S, line G, line F, and line I intersect each other) at which a plurality of routes intersect, and three station names (for example, E-SU, S-YA, and H-JUKU) are displayed in the station name signboard, the character string arrangement information may be coordinate data that represents the arrangement of a character string from which a route (for example, line Y) and a station name (for example, S-YA) of the current position can be specified by the control unit 202 of the navigation server 200 based on the arrangement (for example, an arrangement of E-SU at a position located on the left side, S-YA at the center position, and H-JUKU at a position located on the right side of the station name signboard) of character strings of three station names that are displayed in the station name signboard. Furthermore, for example, when the boarding guide display item is a station name signboard that is disposed at a station at which a plurality of operation types (for example, express, rapid-service, and local) are available, and a plurality of station names are displayed in the station name signboard, the character string arrangement information may be coordinate data that represents the arrangement of a character string from which an operation type (for example, express) can be specified by the control unit 202 of the navigation server 200 by extracting a station name of the next stop based on the arrangement of the station name located at the center position and station names located at both ends in the name station signboard.

The character string arrangement information is extracted from a display guide target (for example, a station name signboard, a roll sign, or a route) and is stored in the character string arrangement information database 206b in advance, and the control unit 202 of the navigation server 200 may download latest data from an external apparatus (for example, an image database that provides image data of a display guide target) or the like through the network 300 on a regular basis and update the character string arrangement information that is stored in the character string arrangement information database 206b. In addition, the character string arrangement information database 206b may store the character string arrangement information in association with the image data of the display guide target corresponding to the extracted character string arrangement information.

The color scheme information database 206c is a color scheme information storage unit that stores color scheme information relating to a color scheme that includes a combination of colors or the arrangement positions of colors of a boarding guide display item and at least one of a route, a station name, a traveling direction, and an operation type of means of transportation in association with each other. Here, the color scheme information that is stored in the color scheme information database 206c may be color scheme data that represents a color scheme from which the type (for example, a station name signboard, a roll sign, or a route map) of a boarding guide display item can be determined. In addition, the color scheme information that is stored in the color scheme information database 206c may be data of a combination of colors or a combination of colors and the arrangement pattern of the colors. Accordingly, in this embodiment, the control unit 202 can identify a route and the like based on a difference in the arrangement of colors even in the case of the same color combination by referring to the color scheme information that is stored in the color scheme information database 206c. In addition, the color scheme information that is stored in the color scheme information database 206c may be color scheme data that represents a color scheme from which at least one of a route, a station name, and a traveling direction of the current position and an operation type of means of transportation can be specified.

For example, when the boarding guide display item is a station name signboard, the color scheme information that is stored in the color scheme information database 206c may be color scheme data that represents a color scheme of "yellow green" representing a route of line Y, "light brown" representing a route of line F, "red" representing a route of line M, and the like. In addition, for example, when the boarding guide display item is a station name signboard, the color scheme information that is stored in the color scheme information database 206c may be color scheme data that represents a tint of a character color representing a specific traveling direction, a tint of a band color, and the like. Furthermore, for example, when the boarding guide display item is a route map, the color scheme information that is stored in the color scheme information database 206c may be color scheme data that represents a color scheme of red representing the current station on the route map, unique colors representing routes on the route map, and the like. In addition, for example, when the boarding guide display item is a roll sign, the color scheme information that is stored in the color scheme information database 206c may be color scheme data of red representing express, blue representing semi-express, black representing local, and the like.

The color scheme information is extracted from display guide targets (for example, a station name signboard, a roll sign, a route map, and the like) and is stored in the color scheme information database 206c in advance, and the control unit 202 of the navigation server 200 may download latest data from an external apparatus (for example, an image database that provides image data of the display guide target) or the like through the network 300 on a regular basis and update the color scheme information that is stored in the color scheme information database 206c. In addition, the color scheme information database 206c may store the color scheme information in association with the image data of a display guide target that corresponds to the extracted color scheme information.

In addition, the symbol information database 206d is a symbol information storage unit that stores symbol information relating to symbols used in a boarding guide display item and at least one of a route, a station name, a traveling direction, and an operation type of means of transportation in association with each other. Here, the symbol information that is stored in the symbol information database 206d may be symbol data that represents symbols from which the type (for example, a station name signboard, a roll sign, or a route map) of a boarding guide display item can be determined. In addition, the symbol information that is stored in the symbol information database 206d may be symbol data that represents a symbol from which at least one of a route, a station name, and a traveling direction of the current position and an operation type of means of transportation can be specified.

For example, when the boarding guide display item is a station name signboard, the symbol information that is stored in the symbol information database 206d may be symbol data that represents an arrow symbol representing a specific travel direction, a white circle, a triangular mark, a rectangular mark, "next", and the like. In addition, for example, when the boarding guide display item is a station name signboard, the symbol information that is stored in the symbol information database 206d may be symbol data that represents symbols including an icon symbol that represents a specific route such as an icon symbol "Mountain" that represents a route of line Y. Furthermore, for example, when the boarding guide display item is a route map, the symbol information that is stored in the symbol information database 206d may be symbol data that represents a symbol such as an arrow symbol representing the current station on the route map. In addition, for example, when the boarding guide display item is a roll sign, the symbol information that is stored in the symbol information database 206d may be symbol data that represents symbols including an icon symbol representing a specific operation type such as an icon symbol "express" representing that the operation type is express.

The symbol information is extracted from display guide targets (for example, a station name signboard, a roll sign, and a route map) and is stored in the symbol information database 206d in advance, and the control unit 202 of the navigation server 200 may download latest data from an external apparatus (for example, an image database that provides image data of the display guide target) or the like through the network 300 on a regular basis and update the symbol information stored in the symbol information database 206d. In addition, the symbol information database 206d may store the symbol information in association with the image data of a display guide target that corresponds to the extracted symbol information.

The platform information database 206e is a platform information storage unit that stores platform information including the position information of a boarding guide display item that is disposed at a platform of a station of means of transportation and at least one of a route, a station name, and a traveling direction of the current position in association with each other. Here, the platform information stored in the platform information database 206e may include coordinate data that represents unique position information of boarding guide display items such as a station name signboard disposed at a specific station and the like. For example, the platform information stored in the platform information database 206e may be coordinate data from which a traveling direction that is determined based on the type (for example, an up platform or a down platform) of a platform can be determined by specifying a user's accurate position on the platform by searching for platform information that corresponds to position information of a user photographed the boarding guide display item using the control unit 202 of the navigation server 200. The platform information includes position information acquired simultaneously when the display guide target is photographed and is stored in the platform information database 206e in advance, and the platform information stored in the platform information database 206e may be updated based on the position information of a display guide target transmitted when the user searches the platform information database 206e. In addition, for example, the platform information database 206e may store the platform information in association with the image data of the display guide target that corresponds to the acquired position information.

In addition, in this embodiment, the character string arrangement information, the color scheme information, the symbol information, and the platform information may be stored in the mutually-different databases (the character string arrangement information database 206b to the platform information database 206e and the like) as described above, or such information may be stored in a boarding guide information database (not illustrated in the figure) for each type of extracted boarding guide display items. Here, the boarding guide information database may further include a station name signboard database, a roll sign database, a route map database, and the like that are divided based on the types of boarding guide display items. Furthermore, the storage unit 206 may further include a database that only stores information (for example, image data, character string arrangement information, color scheme information, or symbol information) of boarding guide display items using an arrangement of a character string, a color scheme, or a symbol that are exceptional and not patterned.

For example, the station name signboard database may store a variety of pieces of pattern data from which a station, a route, and the like corresponding to a current position can be specified for a photographed image of the boarding guide display item that is determined as a station name signboard by the control unit 202 of the navigation server 200 in advance based on character data of a station name, a combination of character data of station names, color scheme information of the station name signboard, and the like displayed on the identified station name signboard. In other words, the station name signboard database may store pattern data acquired by appropriately combining at least one of the character string arrangement information, the color scheme information, the symbol information, and the platform information extracted from the image data of the station name signboard in advance, from which at least one of a route, a station name, and a traveling direction of the current position and the operation type of means of transportation can be specified.

In addition, the roll sign database may store a variety of pieces of pattern data from which a route, a traveling direction, and the like corresponding to a current position can be specified for a photographed image of a boarding guide display item that is determined as a roll sign by the control unit 202 of the navigation server 200 in advance based on character data of a destination, a name of a direction, a name of a route, and the like and character data representing an operation type (for example, express, rapid-service, or a local), which are read from the roll sign, a combination of the character data, and the like. In other words, the roll sign database may store pattern data from which at least one of a route and a traveling direction of the current position and an operation type of means of transportation, which are acquired by appropriately combining at least one of character string arrangement information, color scheme information, and symbol information that are extracted from the image data of the roll sign in advance can be specified. In addition, in this embodiment, for example, the roll sign database may store not only a combination of character data representing a destination and the direction and character data of a route but also the arrangement of a character string that configures the roll sign and the combination thereof such as storing a combination of character data that represents the operation type such as "express" and "rapid-service" and a destination station. Furthermore, when such information is stored in the roll sign database, it may be configured such that indices are assigned to data representing each type or information, and a combination thereof is stored.

Furthermore, the route map database may store pattern data from which a route, a station, and the like corresponding to a current position can be specified for a photographed image of a boarding guide display item that is determined as a route map by the control unit 202 of the navigation server 200 in advance based on a combination of character data of station names included in an identified route map and the like. In other words, the route map database may store pattern data from which at least one of a route, a station name, and a traveling direction of the current position and an operation type of means of transportation, which are acquired by appropriately combining at least one of character string arrangement information, color scheme information, symbol information, and platform information that are extracted from the image data of the route map in advance can be specified.

Furthermore, the traffic information database 206f is a traffic information storage unit that stores traffic information of means of transportation. Here, the traffic information that is stored in the traffic information database 206f may include delay information relating to a route at which a delay occurs and operation suspension information relating to a route at which operation suspension occurs. Here, the traffic information is stored in the traffic information database 206f in advance, and the control unit 202 of the navigation server 200 may download latest data from an external system (an external traffic information providing server) or the like through the network 300 on a regular basis (for example, every five minutes) and update the traffic information that is stored in the traffic information database 206f.

The control unit 202 includes an internal memory that stores a control program such as an operating system (OS), a program specifying various processing procedures, and necessary data. The control unit 202 performs information processing for executing various pieces of processing by using these programs. The control unit 202 functionally and conceptually includes a route search condition receiving unit 202a, a guide route searching unit 202b, a display content receiving unit 202c, an image identifying unit 202d, a guide information generating unit 202e, and a guide information transmitting unit 202f.

The route search condition receiving unit 202a among them is a route search condition receiving unit that receives a route search condition, which is transmitted from the terminal apparatus 100, at least including a point of departure and a destination. Here, the point of departure may be the current position of a user using the terminal apparatus 100. In addition, the route search condition may further include a transit place and the like.

Furthermore, the guide route searching unit 202b is a guide route searching unit that searches for a guide route formed from a point of departure to a destination that satisfies a route search condition that at least includes the point of departure and the destination using traffic network data that is stored in the traffic network database 206a and generates guide route data. In addition, when a transit place is further included in the route search condition, the guide route searching unit 202b may search for a guide route that passes through a transit place.

Here, the display content receiving unit 202c is a display content receiving unit that receives the display content of the photographed image of the boarding guide display item of the means of transportation that is transmitted from the terminal apparatus 100.

Here, in this embodiment, the display content includes characters (for example, characters that represent a station name, a station code, a route name, a destination, and an operation type) displayed in a boarding guide display item (for example, a station name signboard, a roll sign, and a route map), the arrangement of a character string, a color scheme (for example, a color scheme that represents a route, an operation type, a traveling direction, and a current station), a symbol (for example, unique symbols that represent a traveling direction, a route, and a current station), and the like.

Here, the image identifying unit 202d is an image identifying unit that specifies the route, the station name, and a traveling direction of a current position based on the display content received by the display content receiving unit 202c and the traffic network data stored in the traffic network database 206a. Here, the image identifying unit 202d specifies the route, the station name, and the traveling direction of the current position based on the traffic network data that includes the station code information corresponding to the station code included in the display content. In addition, the image identifying unit 202d specifies at least one of the route, the station name, and the traveling direction of the current position by specifying at least one of the route, the station name, the traveling direction, and an operation type of the means of transportation based on at least one of characters, an arrangement of a character string, a color scheme, and symbols included in the display content. In addition, when the character string arrangement information database 206b is included, the image identifying unit 202d specifies at least one of the route, the station name, and the traveling direction of the current position by extracting the character string arrangement information corresponding to at least one of the characters and the arrangement of the character string included in the display content from the character string arrangement information database 206b and specifying at least one of the route, the station name, the traveling direction, and the operation type of the means of transportation based on the extracted character string arrangement information. In addition, when the color scheme information database 206c is included, the image identifying unit 202d specifies at least one of the route, the station name, and the traveling direction of the current position by extracting the color scheme information corresponding to the color scheme included in the display content from the color scheme information database 206c and specifying at least one of the route, the station name, the traveling direction, and the operation type of the means of transportation based on the extracted color scheme information. In addition, when the symbol information database 206d is included, the image identifying unit 202d specifies at least one of the route, the station name, and the traveling direction of the current position by extracting the symbol information corresponding to the symbol included in the display content from the symbol information database 206d and specifying at least one of the route, the station name, the traveling direction, and the operation type of the means of transportation based on the extracted symbol information. In addition, the image identifying unit 202d specifies at least one of the route, the station name, and the traveling direction of the current position by searching for the platform information of the position information corresponding to the current position information from the platform information database 206e based on the current position information that is transmitted from the terminal apparatus 100.

Here, the guide information generating unit 202e is a guide information generating unit that extracts the station names present in the traveling direction from the traffic network data based on the route, the station name, and the traveling direction of the current position that are specified by the image identifying unit 202d and generates guide information that includes at least a part of the extracted station names. In addition, the guide information generating unit 202e extracts the station names of stops present in the traveling direction from the traffic network data based on the route, the station name, and the traveling direction of the current position specified by the image identifying unit 202d and generates the guide information that includes at least a part of the extracted station names. In addition, the guide information generating unit 202e further generates the guide information that includes at least a part of the photographed image. In addition, the guide information generating unit 202e compares the stop information generated by the guide information generating unit 202e with the guide route data generated by the guide route searching unit 202b, extracts the station names up to the stop that corresponds to a transit station or a destination station from the stop information, and generates the guide information that includes the stop information including the extracted station name. In addition, the guide information generating unit 202e compares the stop information generated by the guide information generating unit 202e with the guide route data generated by the guide route searching unit 202b and, when the station name of the stop that corresponds to the transit station or the destination station is not present in the stop information, generates the guide information that includes improper information that represents that the photographed boarding guide display item does not coincide with the guide route. In addition, the guide information generating unit 202e compares the station name corresponding to the current position specified by the image identifying unit 202d and the stop information generated by the guide information generating unit 202e with the guide route data generated by the guide route searching unit 202b and, when the station name corresponds to the departure station and the station name of the stop that corresponds to the transit station or the destination station is present in the stop information, generates the guide information that includes proper information that represents that the photographed boarding guide display item coincides with the guide route. In addition, the guide information generating unit 202e extracts the traffic information that corresponds to the route specified by the image identifying unit 202d from the traffic information database 206f and generates the guide information that includes the extracted traffic information. In addition, the guide information generating unit 202e, when the image identifying unit 202d is incapable of identifying the photographed image, generates the guide information that includes unidentifiable information that represents that the image identifying unit 202d is incapable of identifying the photographed image.

Here, the guide information transmitting unit 202f is a guide information transmitting unit that transmits the guide information generated by the guide information generating unit 202e to the terminal apparatus 100.

Configuration of Terminal Apparatus 100

In FIG. 1, the terminal apparatus 100 has functions of acquiring a photographed image of a boarding guide display item of means of transportation by controlling the photographing unit 120, extracting a display content from the photographed image acquired, transmitting the display content extracted to the navigation server 200, receiving guide information transmitted from the navigation server 200, and outputting at least a part of the guide information received through the output unit. The terminal apparatus 100, for example, is an information processing apparatus such as a desktop-type or notebook-type personal computer that is generally available in the market, a mobile terminal apparatus such as a mobile phone, a PHS, or a PDA, and a navigation terminal that performs route guidance. Here, the terminal apparatus 100 may have an Internet browser or the like built therein and may have a route guidance application, a transfer guidance application, or the like built therein. In addition, in order to acquire the current position in real time, the terminal apparatus 100 includes the position acquiring unit 112 that has a GPS function, an IMES function, and the like. Furthermore, the terminal apparatus 100 includes an output unit that at least includes the display unit 114 and the voice output unit 118. In addition, the terminal apparatus 100 includes the photographing unit 120 such as a camera that can capture a still image and a moving image.

Here, the display unit 114 is display units (for example, a display or a monitor that is configured by a liquid crystal, an organic EL, or the like) that displays a display screen such as guide information. In addition, the voice output unit 118 is a voice output unit (for example, a speaker) that outputs voice data received from the navigation server 200 or the like as a voice. Furthermore, the terminal apparatus 100 includes the input unit 116 (for example, a key input unit, a touch panel, a keyboard, or a microphone) that operates the photographing unit 120, inputs a route searching condition, and the like. In addition, an input-output control interface unit 108 controls the position acquiring unit 112, the display unit 114, the input unit 116, the voice output unit 118, the photographing unit 120, and the like.

Here, the position acquiring unit 112, for example, may be position acquiring units for receiving a position information signal that is transmitted from a position transmitting device 500. Here, the position transmitting device 500 may be a GPS device that transmits a position information signal (GPS signal). In addition, the position transmitting device 500 may be an indoor message system (IMES) device that realizes the IMES technology that enables indoor positioning using a position information signal that has characteristics similar to those of the GPS signal. Furthermore, the IMES technology is a system that is proposed from a quasi-zenith satellite frame that is a positioning satellite system.

In addition, the position transmitting device 500 may be a GPS repeater that transmits a GPS signal, which has been received at an outdoor position, at an indoor position. In addition, the position transmitting device 500 may be a small-size transmission device that is arbitrarily disposed at each floor inside a building (for example, a multi-story parking lot) or each position in an underground structure (for example, a subway station, an underground shopping center, an underground passage way, and an underground parking lot). Furthermore, self-position information (a position ID or the like) that corresponds to the installation place is assigned to this small-size transmission device. Then, when the terminal apparatus 100 enters a communication range of the small-size transmission device, the terminal apparatus 100 receives the self-position information that is transmitted from the small-size transmission device as a position information signal. A communication system at this time may be, for example, any local-area radio system such as a radio frequency identification (RFID) tag system and Bluetooth (registered trademark), and an infrared ray communication system. In addition, the position transmitting device 500 may be an access point of a wireless LAN. In this embodiment, the position acquiring unit 112 may acquire identification information of an access point by receiving a wireless LAN signal or the like. Then, the control unit 102 may acquire position information by specifying the position of the access point based on the identification information, which is unique to the access point, acquired by the position acquiring unit 112. In addition, in this embodiment, the control unit 102 may calculate position information that includes the longitude, latitude, and height information based on the position information signal that is acquired by the position acquiring unit 112.

In addition, the position acquiring unit 112 may acquire position information that represents the current position of a user using the terminal apparatus 100, for example, based on azimuth information such as a traveling direction of the terminal apparatus 100 that is detected by an azimuth sensor, distance information that is detected by a distance sensor, and the map data. Here, as the azimuth sensor, a geomagnetic sensor that detects the absolute direction of travel of the terminal apparatus 100 and an optical gyro that detects a relative direction of travel of the terminal apparatus 100 may be used. In addition, the azimuth sensor may be an electronic compass that can acquire information relating to the azimuth and the inclination by combining the geomagnetic sensor and an acceleration sensor.

In addition, a communication control interface unit 104 is an interface that is connected to a communication device (not illustrated in the figure) such as an antenna, a router, or the like that is connected to a communication line or a telephone line, or the like and has a function of controlling communication between the terminal apparatus 100 and the network 300. In other words, the communication control interface unit 104 has a function of performing data communication with the navigation server 200 and the like through the communication line. In addition, the network 300 has a function of mutually connecting the terminal apparatus 100 and the navigation server 200 and an external apparatus or an external system and, for example, may be the Internet, a telephone line network (a mobile terminal circuit network, a general telephone circuit network, or the like), an intranet, or a power line communication (PLC).

In addition, the storage unit 106 is storage units that is any one of high-capacity storage units such as an HD or an SSD and a small-capacity high-speed memory (for example, a cache memory) that is configured by using a static random access memory (SRAM) or the like or both and may store various databases, files, and tables (a guide information file 106a and the like). Here, the storage unit 106 may temporarily store various files and the like.

The guide information file 106a is a guide information storage unit that stores guide information.

Here, the control unit 102 includes an internal memory that stores a control program such as OS, a program specifying various processing procedures, and necessary data. The control unit 102 performs information processing for executing various pieces of processing by using these programs. The control unit 102 functionally and conceptually includes a current position information acquiring unit 102a, a route search condition transmitting unit 102b, a photographed image acquiring unit 102c, a display content extracting unit 102d, a display content transmitting unit 102e, a guide information receiving unit 102f, and a guide information output unit 102g.

Here, the current position information acquiring unit 102a is a current position information acquiring unit that acquires the current position information of a user using the terminal apparatus 100, and transmits the current position information to the navigation server 200. Here, the current position information acquiring unit 102a may acquire the current position information of a user using the terminal apparatus 100 for every predetermined time (predetermined period) (for example, every one second or every three minutes). In addition, the current position information acquiring unit 102a may acquire position information that is calculated based on the position information signal received by the position acquiring unit 112 from the position transmitting device 500 as the current position information of the user using the terminal apparatus 100. Furthermore, the current position information acquiring unit 102a may further acquire azimuth information such as the direction of travel of the terminal apparatus 100 that is detected by the azimuth sensor of the position acquiring unit 112 or the like as the current position information of the user using the terminal apparatus 100.

In addition, the current position information acquiring unit 102a may acquire position information such as position coordinates of the current position that is input through the input unit 116 by a user as the current position information of the user using the terminal apparatus 100. Here, the current position that is based on the current position information that is input through the input unit 116 by the user may be a position at which the user is actually present or a virtual current position (for example, an arbitrary place such as a station or an airport located at Osaka that is selected by a user in Tokyo) that is arbitrarily selected by the user. For example, the current position information acquiring unit 102a may acquire coordinates designated (for example, through a designation operation performed on a touch panel-type display unit 114) by a user on the display screen of map data that is displayed on the display unit 114 through the input unit 116 as the current position information of the user using the terminal apparatus 100. In addition, the current position information acquiring unit 102a may further acquire azimuth information designated by a user on the display screen of the map data displayed on the display unit 114 through the input unit 116 as the current position information of the user using the terminal apparatus 100.

Furthermore, the route search condition transmitting unit 102b is a route search condition transmitting unit that transmits a route search condition that at least includes a point of departure and a destination to the navigation server 200. Here, the point of departure may be the current position of a user using the terminal apparatus 100 that is based on the current position information acquired by the current position information acquiring unit 102a. In addition, the route search condition may further include a transit place.

Here, the photographed image acquiring unit 102c is a photographed image acquiring unit that acquires a photographed image of a boarding guide display item by controlling the photographing unit 120. Here, the photographed image may include a still image and a moving image.

Here, the display content extracting unit 102*d* is a display content extracting unit that extracts a display content from the photographed image that is acquired by the photographed image acquiring unit 102*c*.

Here, the display content transmitting unit 102*e* is a display content transmitting unit that transmits the display content that is extracted by the display content extracting unit 102*d* to the navigation server 200.

Here, the guide information receiving unit 102*f* is a guide information receiving unit that receives the guide information transmitted from the navigation server 200. Here, the guide information receiving unit 102*f* may further store the received guide information in the guide information file 106*a*. Here, when existing guide information is stored in the guide information file 106*a*, the guide information receiving unit 102*f* may store guide information that is newly set by overwriting the existing guide information with the guide information.

Here, the guide information output unit 102*g* is a guide information output unit that outputs at least a part of the guide information received by the guide information receiving unit 102*f* through the output unit. In addition, the guide information output unit 102*g* outputs the station name of the transit station or the destination station included in the stop information that is included in the guide information being highlighted. In addition, the guide information output unit 102*g* outputs the guide information further including the guide route data. In addition, the guide information output unit 102*g*, when a scrolling operation is performed using the display unit 114 through the input unit 116, scrolls the guide information displayed on the display unit 114 in accordance with the scrolling operation.

As above, an example of the configuration of the navigation system according to the first embodiment has been explained.

Process of Navigation System

Figure 2:
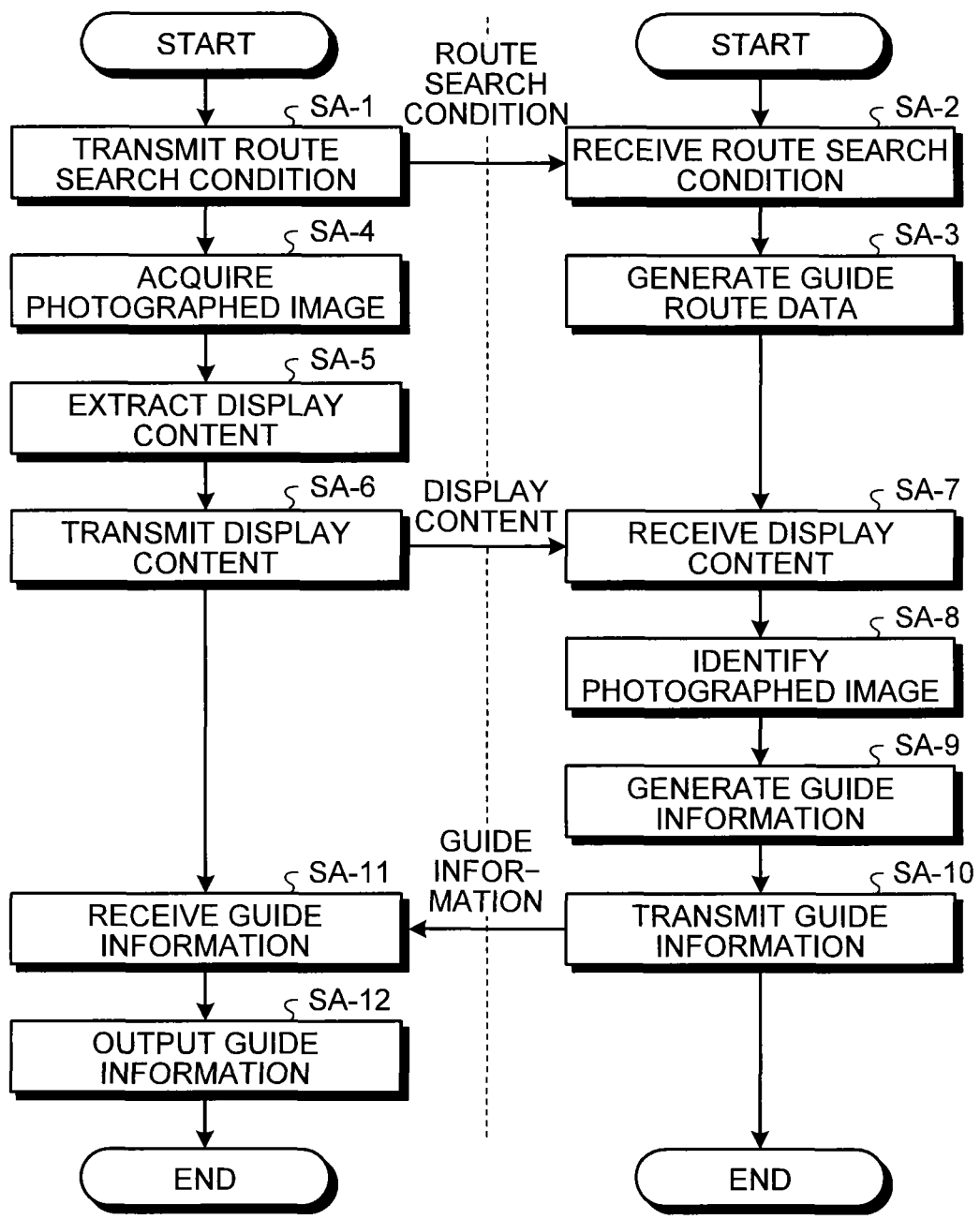
FIG. 2 is a flowchart for illustrating an example of the basic process of the navigation system according to the first embodiment.

Next, an example of the process of the navigation system according to the first embodiment configured as above will be described below in detail with reference to FIGS. 2 to 12. FIG. 2 is a flowchart that illustrates an example of the process of the navigation system according to the first embodiment.

As shown in FIG. 2, first, the route search condition transmitting unit 102*b* of the terminal apparatus 100 transmits a route search condition, which is input by a user through the input unit 116, at least including a point of departure and a destination to the navigation server 200 (Step SA-1). Here, the point of departure may be a current position of the user using the terminal apparatus 100 based on the current position information that is acquired by the current position information acquiring unit 102*a*. In addition, the route search condition may further include a transit place.

Then, the route search condition receiving unit 202*a* of the navigation server 200 receives the route search condition, which at least includes the point of departure and the destination, transmitted from the terminal apparatus 100 by the process of the route search condition transmitting unit 102*b* in Step SA-1 (Step SA-2).

Then, the guide route searching unit 202*b* of the navigation server 200 searches for a guide route formed from a point of departure to a destination, which has been received by the process of the route search condition receiving unit 202*a* in Step SA-2, that satisfies the route search condition using the traffic network data that is stored in the traffic network database 206*a* and generates guide route data (Step SA-3). Here, when a transit place is further included in the route search condition, the guide route searching unit 202*b* may search for a guide route that passes through the transit place.

Then, the photographed image acquiring unit 102*c* of the terminal apparatus 100 acquires a photographed image of a boarding guide display item by controlling the photographing unit 120 (Step SA-4). Here, the photographed image may include a still image and a moving image.

Then, the display content extracting unit 102*d* of the terminal apparatus 100 extracts a display content from the photographed image that is acquired by the process of the photographed image acquiring unit 102*c* in Step SA-4 (Step SA-5). In other words, the display content extracting unit 102*d* acquires characters from the photographed image and also determines the positional relation between character strings, symbols, colors, and the like, whereby extracting information of a combination pattern of the display content that includes at least one of characters, the arrangement of a character string, symbols, and a color scheme.

Then, the display content transmitting unit 102*e* of the terminal apparatus 100 transmits the display content that is extracted by the process of the display content extracting unit 102*d* in Step SA-5 to the navigation server 200 (Step SA-6). In other words, the display content transmitting unit 102*e* transmits information of a combination pattern of the display content that includes at least one of characters, the arrangement of a character string, symbols, and a color schemes to the navigation server 200. As above, according to the first embodiment, the terminal apparatus 100 transmits only collatable information (for example a combination pattern of a display content that includes at least one of characters, the arrangement of a character string, symbols, and a color scheme) that is extracted on the terminal apparatus 100 side without transmitting the photographed image itself to the navigation server 200.

Then, the display content receiving unit 202*c* of the navigation server 200 receives the display content of the photographed image of the boarding guide display item of the means of transportation that is transmitted from the terminal apparatus 100 by the process of the display content transmitting unit 102*e* in Step SA-6 (Step SA-7). In other words, the display content receiving unit 202*c* receives information of the combination pattern of the display content, which includes at least one of characters, the arrangement of a character string, symbols, and a color scheme, transmitted from the terminal apparatus 100.

Then, the image identifying unit 202*d* of the navigation server 200 identifies the photographed image of the boarding guide display item of the means of transportation based on the display content (in other words, information of a combination pattern of the display content that includes at least one of characters, the arrangement of a character string, symbols, and a color scheme), which has been received by the process of the display content receiving unit 202*c* in Step SA-7, and the like (Step SA-8).

Figure 3:
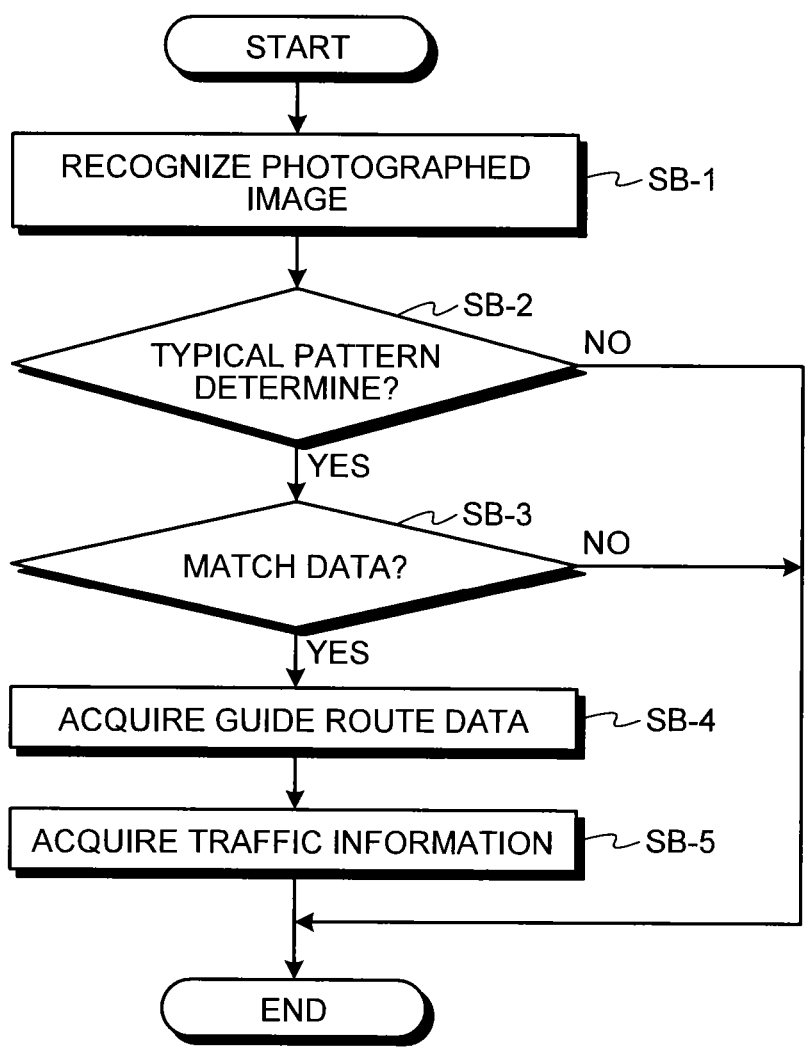
FIG. 3 is a flowchart that illustrates a detailed example of the image identifying process of the navigation system according to the first embodiment.

Here, a specific processing procedure of the image identifying process that is performed in Step SA-8 illustrated in FIG. 2 will be described with reference to FIG. 3. FIG. 3 is a flowchart that illustrates a detailed example of the image identifying process of the navigation system according to the first embodiment.

As shown in FIG. 3, first, the image identifying unit 202*d* recognizes a photographed image by identifying the type (for example, a station name signboard, a roll sign, or a route map) of the boarding guide display item included in the photographed image based on the information of the combination pattern of the display content that includes at least one of characters, the arrangement of a character string, symbols, and a color scheme of the photographed image of the boarding guide display item that has been received by the process of the display content receiving unit 202*c* in Step SA-7 (Step SB-1). For example, the image identifying unit 202*d* may identify a pattern of the arrangement, the color scheme, and the like of the display content of the photographed image and determine whether there is a pattern determined to be matched by referring to the pattern data that is stored in the boarding guide information databases (for example, the station name signboard database, the roll sign database, and the route map database) that are divided for each type of the boarding guide display item. Then, the image identifying unit 202*d* may identify whether the photographed image is a station name signboard, a roll sign, a route map, or the like out of boarding guide display items based on whether there is a determined pattern by referring to each database such as the station name signboard database, the roll sign database, the route map database, and the like. Then, the image identifying unit 202*d* determines whether a typical pattern, from which the type of a boarding guide display item that corresponds to the photographed image can be specified, can be determined by the photographed image recognizing process that is performed in Step SB-1 (Step SB-2).

Here, in Step SB-2, when it is determined that a typical pattern may not be determined by the image identifying unit 202*d* (No in Step SB-2), thereafter, the process ends. On the other hand, when it is determined that a typical pattern can be determined by the image identifying unit 202*d* in Step SB-2 (Yes in Step SB-2), the process proceeds to the process of the next step SB-3. In addition, in this embodiment, when predetermined identification modes (for example, a station name identifying mode, a roll sign identifying mode, and a route map identifying mode) are set in advance, the process of determining the type of a boarding guide display item that corresponds to Steps SB-1 and SB-2 described above, which is based on whether there is a typical pattern, may not be performed.

Then, the image identifying unit 202*d* compares character data such as a route or a station name, information of the arrangement of a character string, color scheme information, and the like of the photographed image of the boarding guide display item of which the type is identified in Steps SB-1 and SB-2 with pattern data that is stored in each boarding guide information database (for example, the station name signboard database, the roll sign database, and the route map database) and determines whether data is matched by identifying the matching route name, the matching station name, or the like (Step SB-3).

Here, an example of the pattern matching process that is performed in Step SB-3 will be described with reference to FIGS. 4 to 8.

Figure 4:
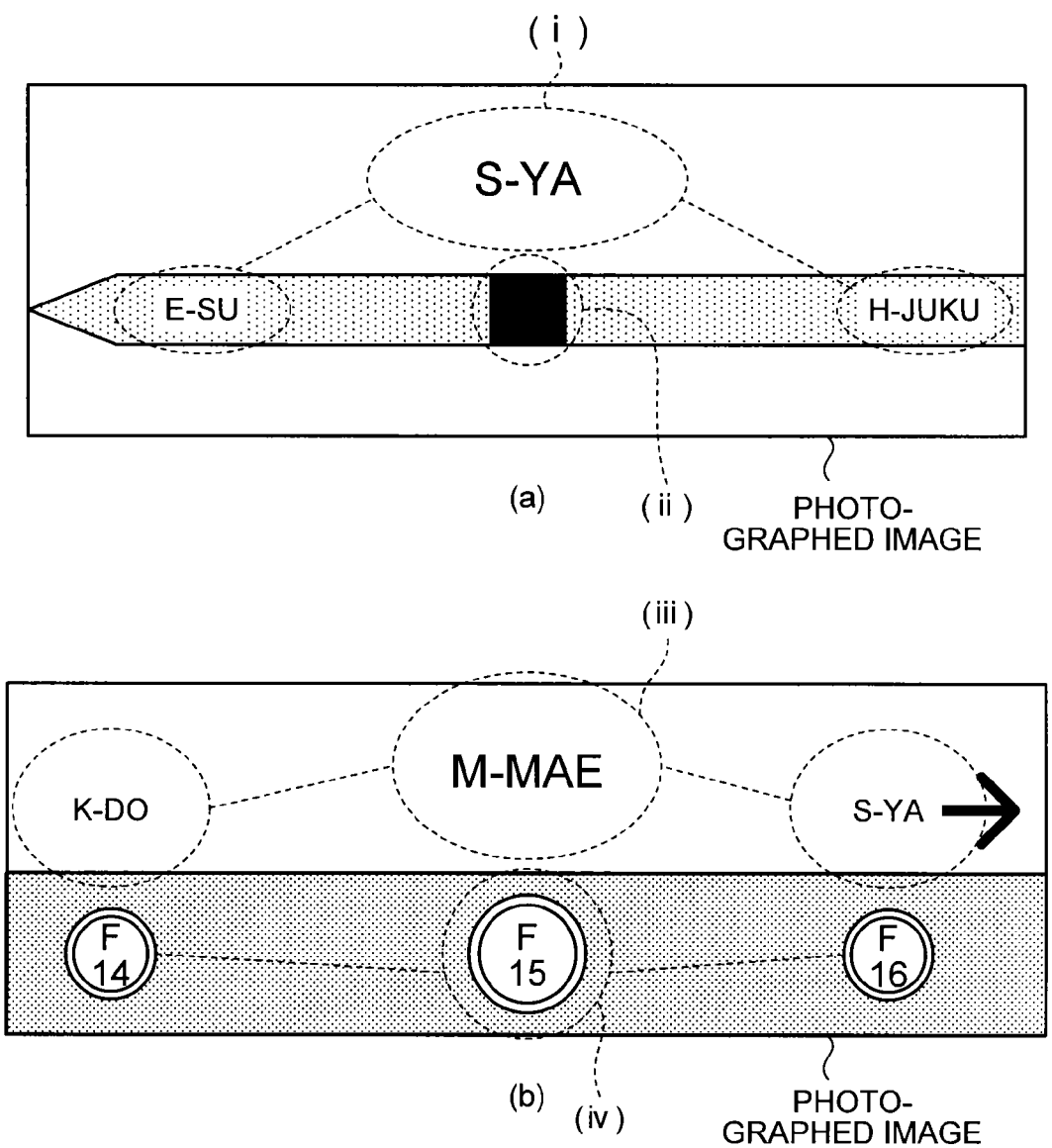
FIG. 4 is a diagram that illustrates an example of a photographed image when the boarding guide display item of this embodiment is a station name signboard.

First, FIG. 4 is a diagram that illustrates an example of a photographed image when the boarding guide display item of this embodiment is a station name signboard. For example, when the boarding guide display item that is a photographing target is a station name signboard as shown in FIG. 4(*a*), the image identifying unit 202*d* may determine "line Y" that is a route of the current position and "S-YA" that is a station of the current position based on display contents such as three station names "E-SU, S-YA, and H-JUKU" that are enclosed by broken lines (i) and "yellow green", which has a square shape, located in the center portion of a band that is enclosed by a broken line (ii). In addition, when the boarding guide display item that is a photographing target is a station name signboard as shown in FIG. 4(*b*), in a case where there are not only three station names "K-DO, M-MAE, and S-YA", which are enclosed by broken lines (iii), but also station codes such as "F14, F15, and F16", which are enclosed by broken lines (iv), uniquely assigned to stations, "line F" that is a route of the current position and "M-MAE" that is a station of the current position may be determined by the image identifying unit 202*d* based on the display contents such as the station codes "F14, F15, and F16".

In other words, as shown in FIG. 4(*a*), the image identifying unit 202*d* may specify a route ("line Y" illustrated in FIG. 4(*a*)), a station name ("S-YA" illustrated in FIG. 4(*a*)), and a traveling direction (the direction toward E-SU illustrated in FIG. 4(*a*)) of the current position based on the display content (station names of "E-SU, S-YA, and H-JUKU" and the front end of the E-SU side illustrated in FIG. 4(*a*)) of the photographed image of the boarding guide display item of the means of transportation, which is transmitted from the terminal apparatus 100, and traffic network data that is stored in the traffic network database 206*a*. In addition, as shown in FIG. 4(*b*), the image identifying unit 202*d* may specify a route ("line F" illustrated in FIG. 4(*b*)), a station name ("M-MAE" illustrated in FIG. 4(*b*)) and a traveling direction (the direction toward S-YA illustrated in FIG. 4(*b*)) of the current position based on the display content (station codes of "F14, F15, and F16" and an arrow symbol located on the S-YA side illustrated in FIG. 4(*b*)) of the photographed image of the boarding guide display item of the means of transportation that are transmitted from the terminal apparatus 100 and the traffic network data that is stored in the traffic network database 206*a*.

Figure 5:
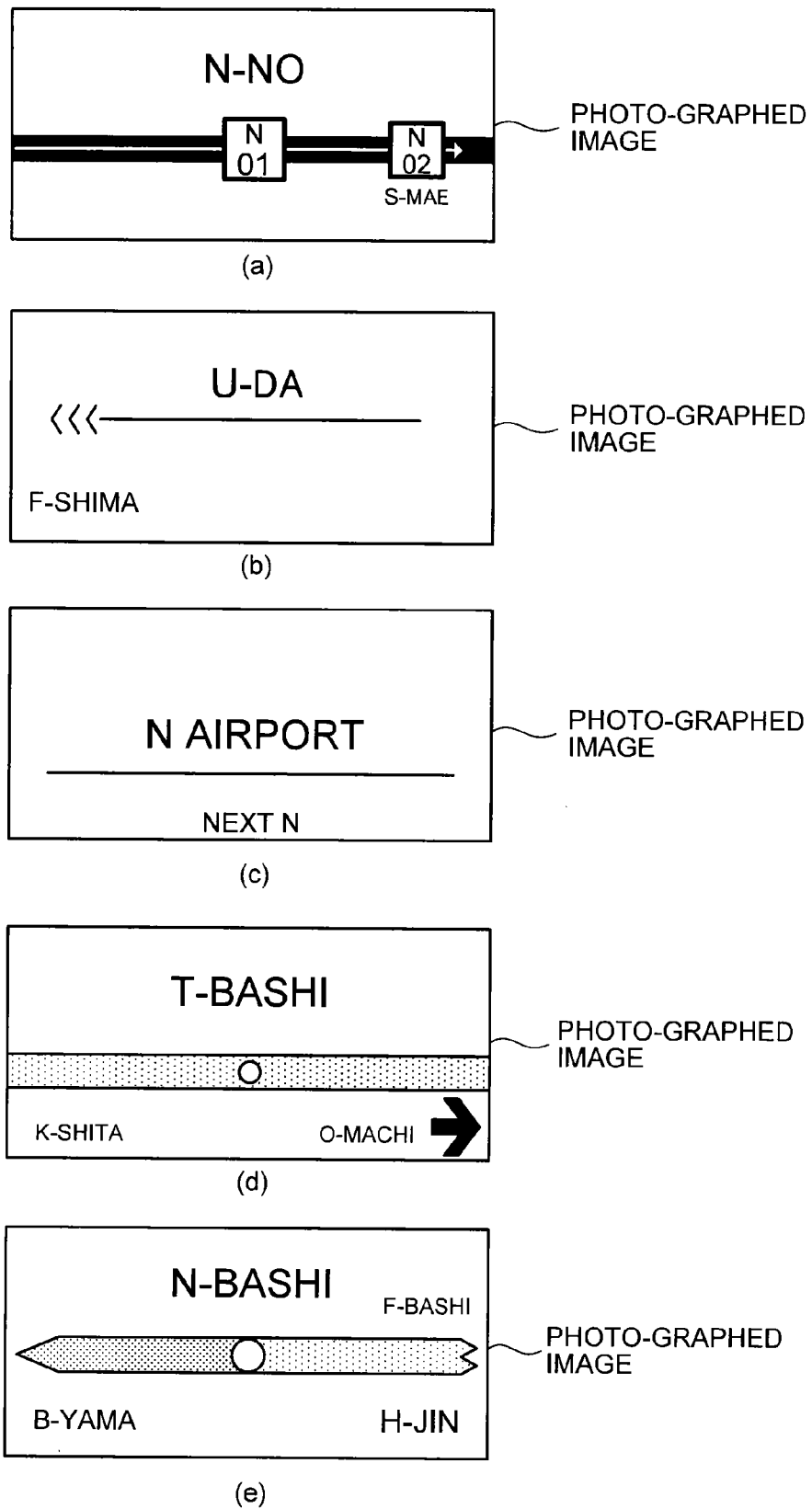
FIG. 5 is a diagram that illustrates an example of a pattern in an image determining method according to this embodiment when the boarding guide display item is a station name signboard.

Subsequently, FIG. 5 is a diagram that illustrates an example of a pattern in an image determining method according to this embodiment when the boarding guide display item is a station name signboard. For example, when the boarding guide display item that is a photographing target is a station name signboard as shown in FIG. 5(*a*), the image identifying unit 202*d* may specify a route "line N-NO of an N-NO electric railway", a station name "N-NO", and a traveling direction "direction toward S-MAE" of the current position based on display contents such as a red color of a band, a station name "N-NO", and a station code "N01" that are displayed in the station name signboard. In addition, when the boarding guide display item that is a photographing target is a station name signboard as shown in FIG. 5(*b*), a route "line H", a station name "U-DA" and a traveling direction "direction toward F-SHIMA" of the current position may be specified based on display contents such as a station name "U-DA" and a symbol "<<<" that are displayed in the station name signboard. Furthermore, in the case of a station name signboard as shown in FIG. 5(*c*), a route "line N", a station name "N airport", and a traveling direction "direction toward N" of the current position may be specified based on display contents such as a station name "N airport" and a character "next" that represents the direction that are displayed in the station name signboard. In addition, in the case of a station name signboard as shown in FIG. 5(*d*), a route "line TS", a station name "T-BASHI" and a traveling direction "direction toward O-MACHI" of the current position may be specified based on display contents such as a station name "T-BASHI" and a tint of character color "a character color of O-MACHI is a thick color, and "a character color of K-SHITA" is a thin color" that are displayed in the station name signboard.

Furthermore, in the case of a station name signboard as shown in FIG. 5(e), a route "line TS", a station name "N-BASHI", and a traveling direction "direction toward B-YAMA" of the current position may be specified based on display contents such as a station name "N-BASHI" and a tint of a band color "a band color of the B-YAMA side is a thick color, and band colors of the sides of F-BASHI and H-JIN are a thin color" that are displayed in the station name signboard.

In other words, as shown in FIG. 5(a), the image identifying unit 202d may extract character arrangement information that corresponds to at least one of the character ("N-NO" illustrated in FIG. 5(a)) and the arrangement of the character string ("N-NO (N01)" located at the center position and "S-MAE (N02)" located at a right-side position in FIG. 5(a)) that are included in the display content from the character string arrangement information database 206b and specify at least one of the route, the station name, the traveling direction, and the operation type of the means of transportation based on the extracted character string arrangement information, thereby specifying at least one of the route ("line N-NO of the N-NO electric railway" illustrated in FIG. 5(a)), the station name ("N-NO" illustrated in FIG. 5(a)), and the traveling direction ("direction toward S-MAE" illustrated in FIG. 5(a)) of the current position. In addition, as shown in FIG. 5(b), the image identifying unit 202d may extract symbol information that corresponds to a symbol ("<<<" illustrated in FIG. 5(b)) that is included in the display content from the symbol information database 206d and specify at least one of the route, the station name, the traveling direction, and the operation type of the means of transportation based on the extracted symbol information, thereby specifying at least one of the route ("line H" illustrated in FIG. 5(b)), the station name ("U-DA" illustrated in FIG. 5(b)), and the traveling direction ("direction toward F-SHIMA" illustrated in FIG. 5(b)) of the current position. Furthermore, as shown in FIG. 5(d), the image identifying unit 202d may extract color scheme information that corresponds to the color scheme (the character color of O-MACHI is a deep color, and the character color of K-SHITA is a light color illustrated in FIG. 5(d)) included in the display content from the color scheme information database 206c and specify at least one of the route, the station name, the travelling direction, and the operation type of the means of transportation based on the extracted color scheme information, thereby specifying at least one of the route ("line TS" illustrated in FIG. 5(d)), the station name ("T-BASHI" illustrated in FIG. 5(d)) and the traveling direction ("direction toward O-MACHI" illustrated in FIG. 5(d)) of the current position.

FIG. 6 is a diagram that illustrates another example of an image determining method according to this embodiment when the boarding guide display item is a station name signboard. For example, when the boarding guide display item that is a photographing target is a station name signboard as shown in FIG. 6(a) on which stations name "K Nakano and K Okubo," arrows "left arrow and right arrow," and the like are displayed on both sides, the image identifying unit 202d may specify at least one of the route, the station name, and the traveling direction of the current position by searching for platform information of the position information that corresponds to the current position information from the platform information database 206e that includes the position information of the boarding guide display items that are disposed at the platforms of stations of the means of transportation based on the current position information that is transmitted from the terminal apparatus 100 by the process of the current position information acquiring unit 102a.

For example, as shown in FIG. 6(b), in the case of a station in which an up platform and a down platform are separately disposed, the traveling direction at the current position may be specified by specifying whether a platform at which a user is currently located is an up platform or a down platform based on the user's current position at the time of photographing the station name signboard disposed at the platform of the station. In other words, as shown in FIG. 6(b), when a user performs photographing while confronting a station name signboard at a platform of a station in which an up platform and a down platform are separately disposed, the traveling direction is the rightward direction of the station name signboard all the time, whereby the image identifying unit 202d may specify the traveling direction. In addition, as shown in FIG. 6(c), when an up platform and a down platform are the same platform, it is specified whether a user photographed the station name signboard at a position that is located on the upward side or at a position located on the downward side based on the user's current position at the time of photographing the station name signboard that is disposed at the platform of the station, whereby the traveling direction of the current position may be specified. In other words, as shown in FIG. 6(c), when a user performs photographing at a platform that is common to the up direction and the down direction with confronting the station name signboard, the traveling direction is the leftward direction of the station name signboard all the time, whereby the image identifying unit 202d may specify the traveling direction.

Figure 7:
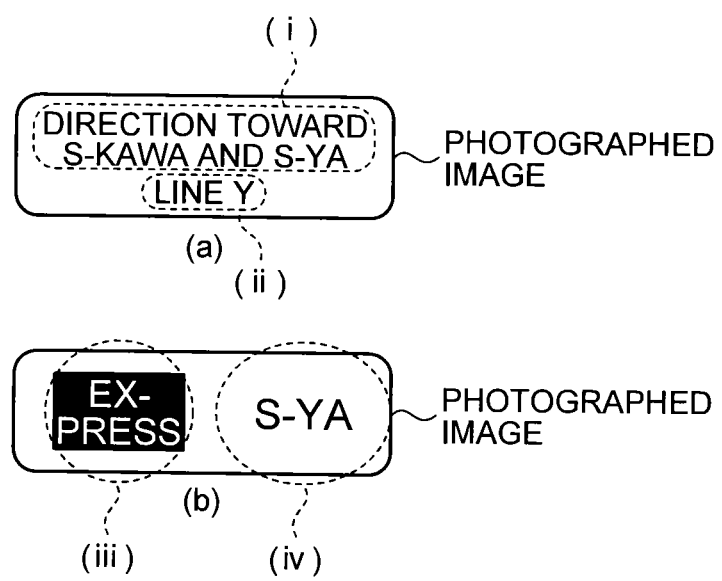
FIG. 7 is a diagram that illustrates an example of a photographed image when the boarding guide display item according to this embodiment is a roll sign.

FIG. 7 is a diagram that illustrates an example of a photographed image when the boarding guide display item according to this embodiment is a roll sign. For example, when the boarding guide display item that is a photographing target is a roll sign (for example, a sign that represents a destination or an operation type that is disposed on the front face or the side face of an electric train) as shown in FIG. 7(a), the image identifying unit 202d may identify display contents such as a direction of the photographed electric train that is "direction toward S-GAWA and S-YA" enclosed by a broken line (i) and a route that is "line Y" enclosed by a broken line (ii). In addition, in the case of a roll sign that is illustrated in FIG. 7(b), the image identifying unit 202d may narrow down routes "line F, line I, line T, and the like" based on display contents such as an electric train operation type of "Express" that is enclosed by a broken line (iii) and a destination direction of "S-YA" that is enclosed by a broken line (iv).

Figure 8:
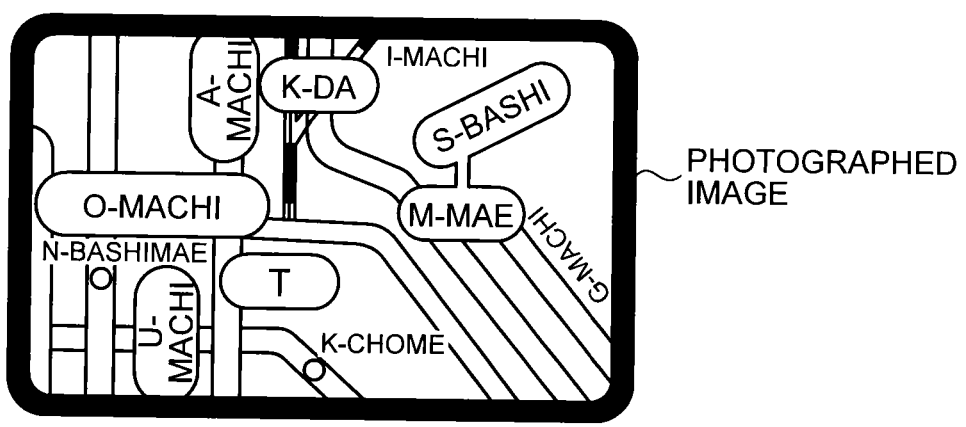
FIG. 8 is a diagram that illustrates an example of a photographed image when the boarding guide display item according to this embodiment is a route map.

FIG. 8 is a diagram that illustrates an example of a photographed image when the boarding guide display item according to this embodiment is a route map. For example, when the boarding guide display item that is a photographing target is a route map (for example, a route map of a subway) as shown in FIG. 8, the image identifying unit 202d may specify a route and a station that correspond to the current position based on a display content such as a combination of character data of station names included in the identified route map.

Referring back to FIG. 3, when data is determined not to be matched by the image identifying unit 202d in Step SB-3 (No in Step SB-3), thereafter, the process ends. On the other hand, in Step SB-4, when the data is determined to be matched by the image identifying unit 202d (Yes in Step SB-3), the process proceeds to the process of the next step SB-4.

Here, when a route search is performed by the process of the guide route searching unit 202b in Step SA-3 illustrated in FIG. 2, the control unit 202 acquires guide route data that corresponds to the route, the station name, and the traveling direction of the current position (Step SB-4). In addition, the control unit 202 acquires traffic information such as current operation information that corresponds to the route of the current position (Step SB-5). Furthermore, the guide route data and the traffic information that are acquired in Steps SB-4 and SB-5 are used in a guide information generating process to be described below.

Referring back to FIG. 2, the guide information generating unit 202e of the navigation server 200 generates guide information based on the route, the station name, and the traveling direction of the current position that are specified by the process of the image identifying unit 202d in Step SA-8 (Step SA-9).

Here, an example of the guide information that is generated in Step SA-9 will be described with reference to FIGS. 9 to 12.

Figure 9:
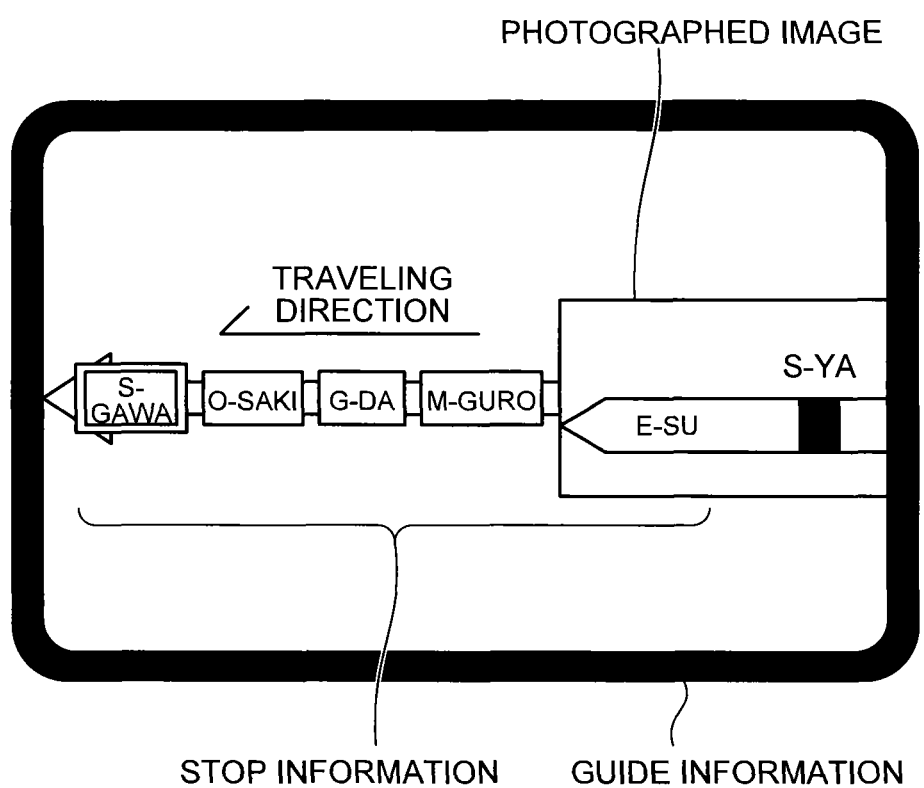
FIG. 9 is a diagram that illustrates an example of the guide information when the boarding guide display item according to this embodiment is a station name signboard.

First, FIG. 9 is a diagram that illustrates an example of the guide information when the boarding guide display item according to this embodiment is a station name signboard. For example, the guide information generating unit 202e may compare route "line Y", station name "S-YA", and traveling direction "direction toward E-SU" of the current position, which are identified from the photographed image of the station name signboard illustrated in FIG. 4(a) with guide route data (for example, a guide route for a destination of station S-GAWA) that is searched in advance and generate guide information as shown in FIG. 9.

In other words, as shown in FIG. 9, the guide information generating unit 202e may extract station names present in the traveling direction from the traffic network data based on the route, the station name, and the traveling direction of the current position, which are specified by the process of the image identifying unit 202d in Step SA-8 and generate guide information that includes at least a part (in FIG. 9, "E-SU, M-GURO, G-DA, O-SAKI, and S-GAWA") of the extracted station names. Here, the guide information generating unit 202e may extract station names of stops that are present in the traveling direction from the traffic network data based on the route, the station name, and the traveling direction of the current position, which are specified by the image identifying unit 202d, and generate guide information that includes stop information (in FIG. 9, stop information that includes "E-SU, M-GURO, G-DA, O-SAKI, and S-GAWA") that includes at least a part of the extracted station names. In addition, the guide information generating unit 202e may generate guide information that further includes at least a part (in FIG. 9, the photographed image of the station name signboard illustrated in FIG. 4(a)) of the photographed image. Furthermore, the guide information generating unit 202e may compare the stop information that is generated by the guide information generating unit 202e with the guide route data that is generated by the guide route searching unit 202b, extract station names up to a stop that corresponds to a transit station or a destination station ("station S-GAWA" in FIG. 9) from the stop information, and generate guide information that includes stop information (in FIG. 9, stop information that includes "E-SU, M-GURO, G-DA, O-SAKI, and S-GAWA") including the extracted station names. The guide information displayed as above may be displayed in a scrollable manner. For example, when the guide information is displayed on a touch-panel type display apparatus, if an operation input such as an input for page transmission is performed, the display may be scrolled, so that each station name can be checked. Furthermore, it may be configured such that detailed information (for example, a station indoor diagram, a time table, or station-periphery information) relating to a station is displayed by designating a station name, and detailed information (for example, operation information including a delay and the like) relating to a route is displayed by designating the route.

Figure 10:
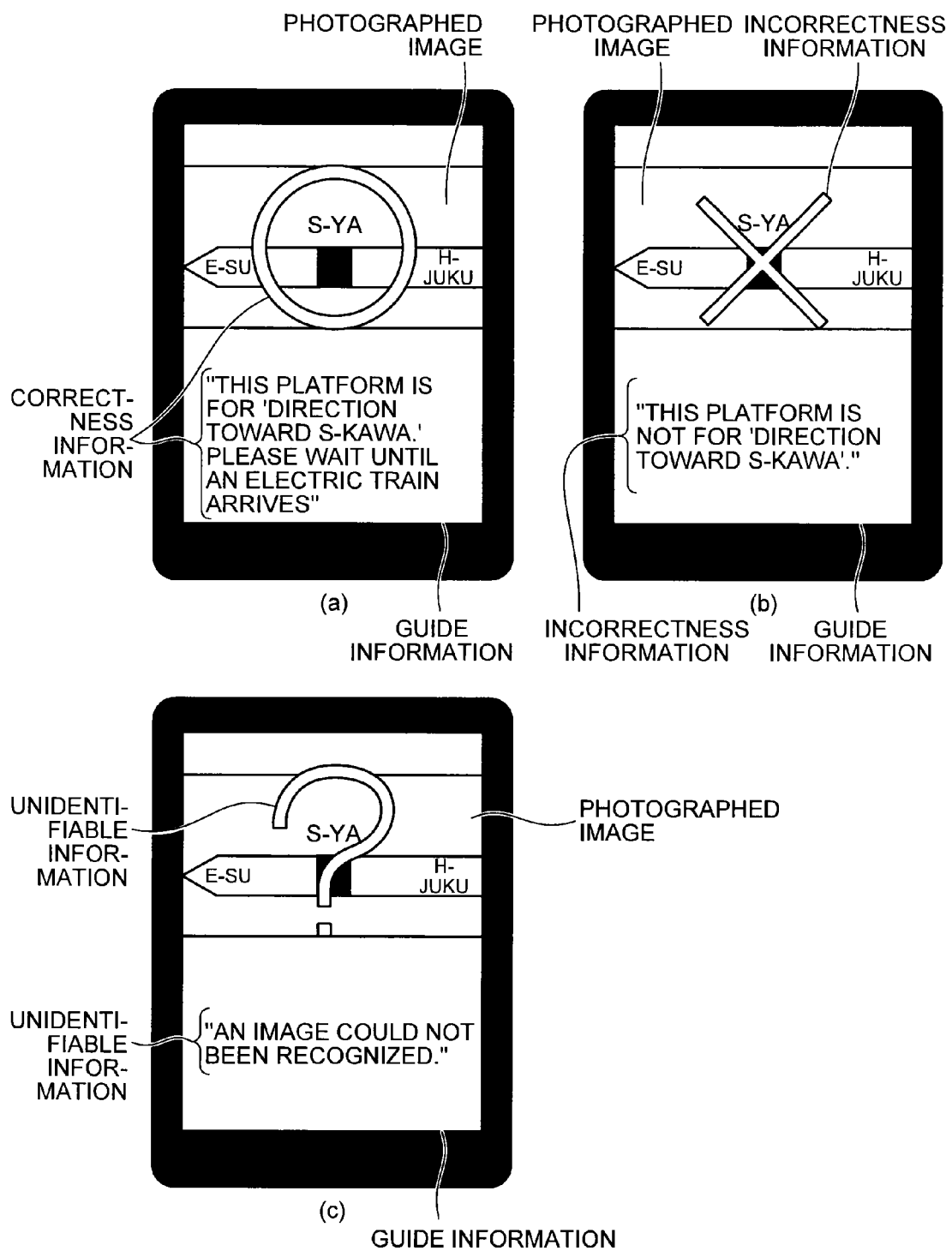
FIG. 10 is a diagram that illustrates another example of the guide information when the boarding guide display item according to this embodiment is a station name signboard.

FIG. 10 is a diagram that illustrates another example of the guide information when the boarding guide display item according to this embodiment is a station name signboard. For example, as shown in FIG. 10(a), the guide information generating unit 202e may compare a photographed station name signboard with a route search result and may generate guide information that includes at least a part of the photographed image of the station name signboard illustrated in FIG. 4(a), and correctness information including symbol "circle mark" that represents correctness and text "This platform is for 'direction toward S-GAWA.' Please wait until an electric train arrives" when the platform at which the user is present is determined to be correct. In addition, as shown in FIG. 10(b), the guide information generating unit 202e may compare the photographed station name signboard with the route search result and may generate guide information that includes at least a part of the photographed image of the station name signboard illustrated in FIG. 4(a), and incorrectness information including symbol "X mark" that represents an error, and text "This platform is not for 'direction toward S-GAWA'." when a platform at which the user is present is incorrect. Furthermore, as shown in FIG. 10(c), when an image could not be identified (for example, when a photographing target is inappropriate, when the quality is bad, or when there is no data), the guide information generating unit 202e may generate guide information that includes at least a part of the photographed image of the station name signboard illustrated in FIG. 4(a), and unidentifiable information including symbol "question mark" representing that the image could not be correctly recognized and text "An image could not been recognized." In addition, although not illustrated in the figure, when there is no route search result, the guide information generating unit 202e may generate guide information that includes a list of stops. Furthermore, the guide information generating unit 202e, for example, may refer to the traffic information that is stored in the traffic information database 206f of the navigation server 200 and, when there is a delay or the like in the route to be taken, may generate guide information that includes traffic information that represents an indication thereof. In addition, in this embodiment, the guide information generating unit 202e may be configured to be able to perform a more accurate determination by combining a positioning result (for example, GPS positioning, indoor positioning using an IMES, or a wireless LAN, or positioning using a base station) that is acquired by the process of the current position information acquiring unit 102a.

Figure 11:
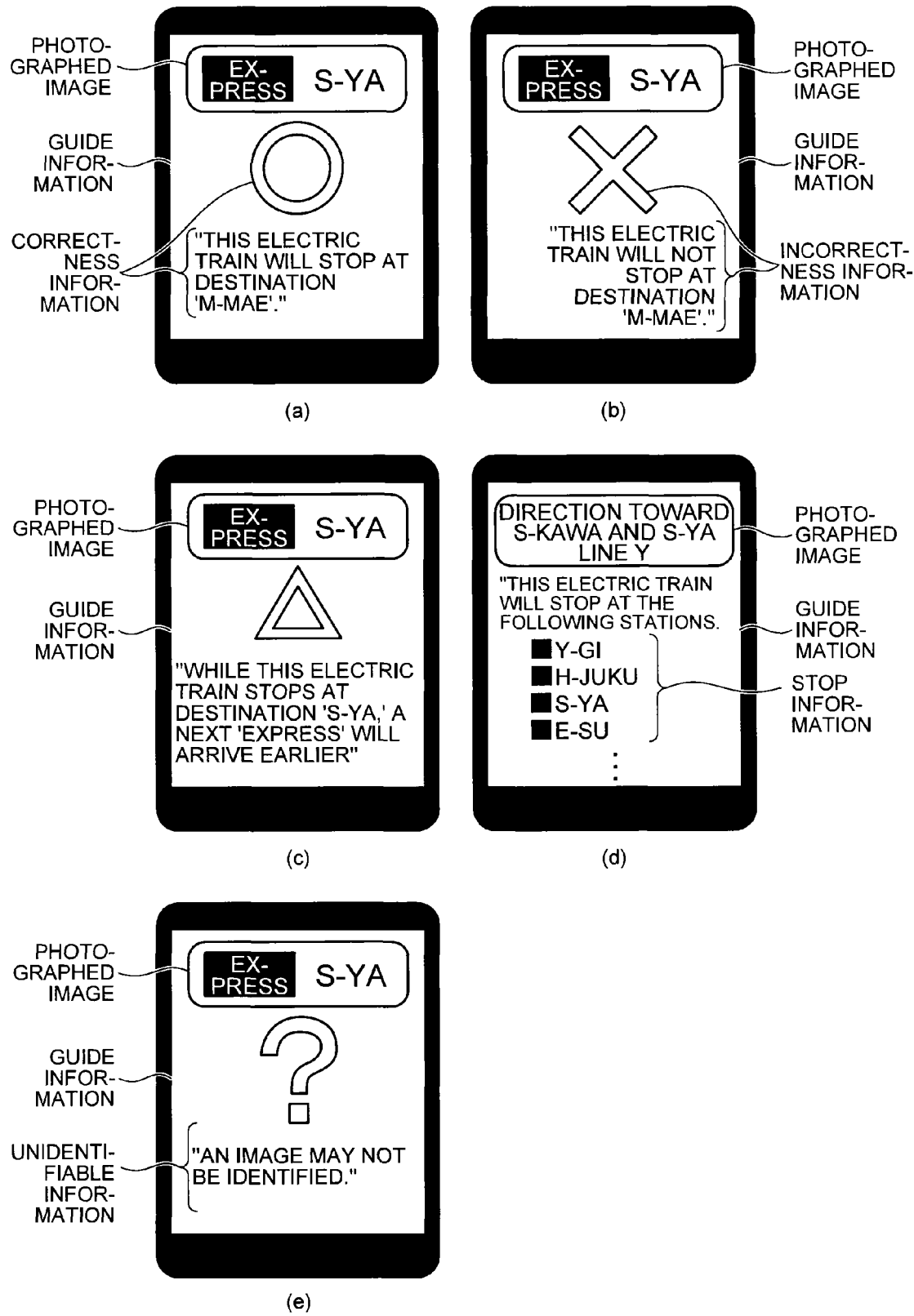
FIG. 11 is a diagram that illustrates an example of the guide information when the boarding guide display item according to this embodiment is a roll sign.

FIG. 11 is a diagram that illustrates an example of the guide information when the boarding guide display item according to this embodiment is a roll sign. For example, as shown in FIG. 11(a), the guide information generating unit 202e may compare a photographed roll sign with a route search result and generate guide information that includes the photographed image of the roll sign illustrated in FIG. 7(b) and proper information including symbol "circle mark" that represents correctness and text "This electric train will stop at destination 'M-MAE'." In addition, as shown in FIG. 11(b), the guide information generating unit 202e may compare a photographed roll sign with a route search result and generate guide information that includes the photographed image of the roll sign illustrated in FIG. 7(b) and improper information including symbol "X mark" that represents a mistake and text "This electric train will not stop at destination 'M-MAE'." Furthermore, as shown in FIG. 11(c), the guide information generating unit 202e may compare a photographed roll sign with a route search result and, when an electric train entering the current platform stops at a destination station, and a following electric train is determined to arrive at the destination earlier than the entering electric train, generate guide information that includes the photographed image of the roll sign illustrated in FIG. 7(b) and guide information including information (for example, symbol "A mark" that represents that there is any other operation type that arrives earlier at the destination and text "While this electric train stops at destination 'S-YA,' a next 'express' will arrive earlier") guiding the following electric train. In addition, as shown in FIG. 11(d), when there is no route search result, the guide information generating unit 202e may generate guide information that includes the photographed image of the roll sign illustrated in FIG. 7(a) and stop information "This electric train will stop at the following stations. Y-GI, H-JUKU, S-YA, E-SU, . . . " that represents a list of stops of the determined route. Furthermore, as shown in FIG. 11(e), when an image may not be identified (for example, when a photographing target is inappropriate, when the quality is bad, or when there is no data), the guide information generating unit 202e may generate guide information that includes the photographed image of the roll sign illustrated in FIG. 7(b) and unidentifiable information including symbol "question mark" representing unidentifiability and text "an image may not be identified." Furthermore, although not illustrated in the diagram, the guide information generating unit 202e may refer to traffic information that is stored, for example, in the traffic information database 206f of the navigation server 200 and, when there is a delay or the like in a route to be taken, may generate guide information that includes the traffic information that represents an indication thereof.

FIG. 12 is a diagram for explaining an example of the guide information when the boarding guide display item according to this embodiment is a route map. For example, as shown in FIG. 12(a), the guide information generating unit 202e may determine a route, a station, and the like from the photographed image acquired by photographing a route map, compare the route, the station, and the like with a route search result, and generate guide information that includes the photographed image of the route map illustrated in FIG. 8 and proper information including symbol "white circle" representing correctness and text "This route is a correct route". In addition, as shown in FIG. 12(b), when an image could not be identified (for example, when a photographing target is inappropriate, when the quality is bad, or when there is no data), the guide information generating unit 202e may generate guide information that includes the photographed image of the route map illustrated in FIG. 8 and unidentifiable information including symbol "question mark" representing that the image may not be correctly identified and text "The image may not be identified". Furthermore, as shown in FIG. 12(c), the guide information generating unit 202e may generate guide information that includes the photographed image of the route map illustrated in FIG. 8 and improper information including symbol "X mark" representing an error and text "This route is different from the route as the route result". In addition, as shown in FIG. 12(d), the guide information generating unit 202e, for example, may refer to the traffic information stored in the traffic information database 206f of the navigation server 200 and, when there is a delay or the like on the route to be taken, may generate guide information that includes traffic information (for example, a route on which the delay occurs) representing an indication thereof and the photographed image of the route map illustrated in FIG. 8.

In other words, as shown in FIGS. 10 to 12, the guide information generating unit 202e may compare the stop information generated by the guide information generating unit 202e with the guide route data generated by the guide route searching unit 202b and, when there is no station name of a stop which corresponds to a transit station or a destination station in the stop information, may generate guide information that includes improper information representing that the photographed boarding guide display item does not coincide with the guide route (for example, see FIGS. 10(b), 11(b), and 12(c)). In addition, the guide information generating unit 202e may compare a station name corresponding to the current position specified by the image identifying unit 202d and the stop information generated by the guide information generating unit 202e and the guide route data generated by the guide route searching unit 202b, and, when the station name corresponds to a departure station, and there is a station name of the stop that corresponds to a transit station or a destination station in the stop information, may generate guide information that includes proper information representing that the photographed boarding guide display item coincides with the guide route (for example, see FIGS. 10(a), 11(a), and 12(a)). Furthermore, the guide information generating unit 202e may extract traffic information that corresponds to a route specified by the image identifying unit 202d from the traffic information database 206f and generate guide information that includes the extracted traffic information (for example, see FIG. 12(d)). In addition, when the photographed image may not be identified by the image identifying unit 202d, the guide information generating unit 202e may generate guide information that includes unidentifiable information representing that the photographed image may not be identified (for example, see FIGS. 10(c), 11(e), and 12(b)).

Referring back to FIG. 2, the guide information transmitting unit 202f of the navigation server 200 transmits the guide information generated by the process of the guide information generating unit 202e in Step SA-9 to the terminal apparatus 100 (Step SA-10).

Then, the guide information receiving unit 102f of the terminal apparatus 100 receives the guide information transmitted from the navigation server 200 by the process of the guide information transmitting unit 202f in Step SA-10 (Step SA-11). Here, the guide information receiving unit 102f may additionally store the received guide information in the guide information file 106a. Here, when existing guide information is stored in the guide information file 106a, the guide information receiving unit 102f may overwrite the existing guide information with the newly set guide information.

Then, the guide information output unit 102g of the terminal apparatus 100 outputs at least a part of the guide information received by the process of the guide information receiving unit 102f in Step SA-11 through the output unit (Step SA-12).

Here, the guide information output unit 102g, as shown in FIG. 9 described above, may output a station name of a transit station or a destination station included in the stop information included in the guide information being highlighted. For example, as shown in FIG. 9 described above, when the current station is station "S-YA" and the destination station (or the final station of the public means of transportation used for the destination) is station "S-GAWA", it may be configured such that stop information up to that is displayed, and the traveling direction and a station for getting-off are highlighted. In addition, the guide information output unit 102g may output guide information that further includes the guide route data. When a scrolling operation is performed by using the display unit 114 through the input unit 116, the guide information output unit 102g may scroll the guide information displayed on the display unit 114 in accordance with the scrolling operation. In addition, in this embodiment, when the stop information illustrated in FIG. 9, as a clickable display, is clicked, the guide information output unit 102g may display a time table, stop time, detailed station information (for example, a map, or peripheral information), or the like. Furthermore, when there is no route search result, the guide information output unit 102g may display the stop information without highlighting. In addition, when sound data is included in the guide information, the guide information output unit 102g may output sound data that corresponds to the proper information, the improper information, or the unidentifiable information as a sound through the output unit.

As above, an example of the process of the navigation system according to the first embodiment has been explained.

Second Embodiment

Figure 13:
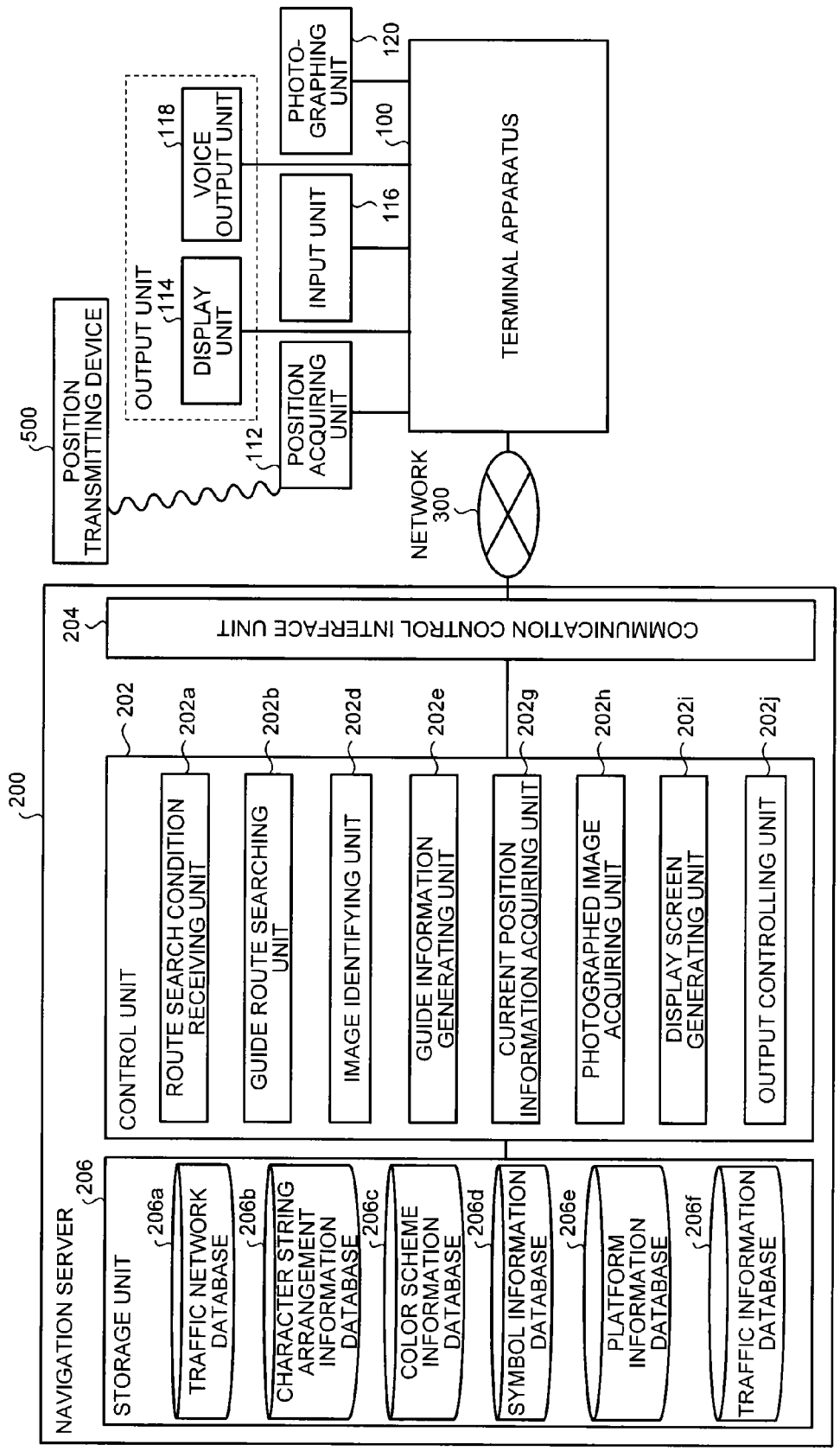
FIG. 13 is a block diagram of an example of a configuration of a navigation server according to second embodiment.
Figure 14:
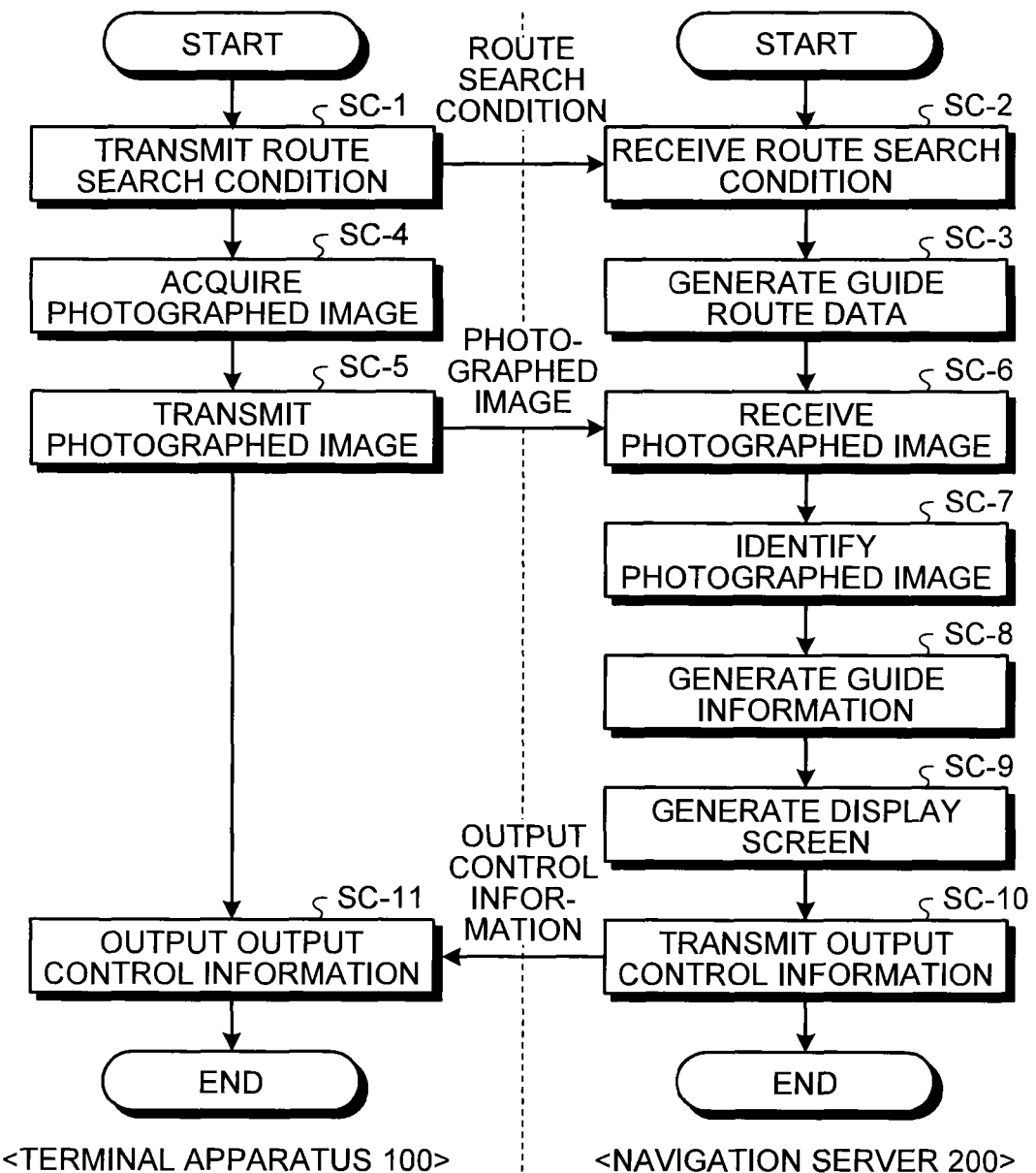
FIG. 14 is a flowchart for illustrating an example of the process of the navigation server according to the second embodiment.

Subsequently, the second embodiment (navigation server 200 (server-leading type)) of the present invention will be explained with reference to FIGS. 13 and 14. Here, FIG. 13 is a block diagram for illustrating an example of the configuration of the navigation server 200 according to the second embodiment and conceptually illustrates only a part of the configuration that relates to the present invention. In addition, FIG. 14 is a flowchart for illustrating an example of the process of the navigation server 200 according to the second embodiment.

In the second embodiment, the navigation server 200 generates data to be displayed on the display unit 114 of the terminal apparatus 100 and transmits the data to the terminal apparatus 100, thereby causing the display unit 114 of the terminal apparatus 100 to perform a function. As above, the second embodiment is different from the other embodiments in that the process is performed in a server-leading manner by the navigation server 200.

Configuration of Navigation Server 200 (Server-Leading Type)

First, an example of the configuration of the navigation server 200 (server-leading type) according to the second embodiment will be explained below with reference to FIG. 13.

As illustrated in FIG. 13, the navigation server 200 according to the second embodiment of the present invention at least includes the control unit 202 and the storage unit 206 that are communicably connected to a terminal apparatus 100 that at least includes a position acquiring unit 112, an output unit (the display unit 114 and the voice output unit 118), the input unit 116, the photographing unit 120, and the control unit 102. For example, an example of the communication includes a remote communication and the like such as wired and wireless communications performed through the network 300. The units of the navigation server 200 and the terminal apparatus 100 are connected to each other through arbitrary communication lines in a communicable manner.

In FIG. 13, the navigation server 200 has functions of identifying a display content from a photographed image of a boarding guide display item of the means of transportation that is transmitted from the terminal apparatus 100 and specifying a route, a station name, and a traveling direction of a current position based on the identified display content and the traffic network data stored in the traffic network database 206a, extracting the station names present in the traveling direction from the traffic network data based on the route, the station name, and the traveling direction of the current position that are specified and generating guide information that includes at least a part of the extracted station names, generating a display screen that is based on the guide information generated, and transmitting output control information that includes a display screen generated to the terminal apparatus 100 and outputting the output control information through the output unit of the terminal apparatus 100. As above, according to the second embodiment, the navigation server 200 is configured as a server-leading type, and the display content is not identified from the photographed image and transmitted using the terminal apparatus 100 as the first embodiment, but a photographed image that is transmitted from the terminal apparatus 100 is identified on the navigation server 200 side, and a display screen is generated, which is different from the first embodiment.

Here, the functions of the communication control interface unit 204 and the storage unit 206 (the traffic network database 206a, the character string arrangement information database 206b, the color scheme information database 206c, the symbol information database 206d, the platform information database 206e, the traffic information database 206f, and the like) of the navigation server 200 and the functions of the position acquiring unit 112, the display unit 114, the input unit 116, the voice output unit 118, and the photographing unit 120 of the terminal apparatus 100 are the same as those of the first embodiment, and thus explanation thereof will not be presented.

In FIG. 13, the control unit 202 includes an internal memory that stores a control program such as OS, a program specifying various processing procedures, and necessary data. The control unit 202 performs information processing for executing various pieces of processing by using these programs. The control unit 202 functionally and conceptually includes the route search condition receiving unit 202a, the guide route searching unit 202b, the image identifying unit 202d, the guide information generating unit 202e, a current position information acquiring unit 202g, a photographed image acquiring unit 202h, a display screen generating unit 202i, and an output controlling unit 202j. Functions of the route search condition receiving unit 202a, the guide route searching unit 202b, and the guide information generating unit 202e are same as the first embodiment, and thus these explanations are omitted.

Among them, the image identifying unit 202d is an image identifying unit that identifies a display content from a photographed image of a boarding guide display item of the means of transportation that is transmitted from the terminal apparatus 100 and specifies a route, a station name, and a traveling direction of a current position based on the identified display content and the traffic network data stored in the traffic network database 206a. Here, the image identifying unit 202d specifies the route, the station name, and the traveling direction of the current position based on the traffic network data that includes the station code information corresponding to the station code included in the display content. In addition, the image identifying unit 202d specifies at least one of the route, the station name, and the traveling direction of the current position by specifying at least one of the route, the station name, the traveling direction, and an operation type of the means of transportation based on at least one of characters, an arrangement of a character string, a color scheme, and symbols included in the display content. In addition, when the character string arrangement information database 206b is included, the image identifying unit 202d specifies at least one of the route, the station name, and the traveling direction of the current position by extracting the character string arrangement information corresponding to at least one of the characters and the arrangement of the character string included in the display content from the character string arrangement information database 206b and specifying at least one of the route, the station name, the traveling direction, and the operation type of the means of transportation based on the extracted character string arrangement information. In addition, when the color scheme information database 206c is included, the image identifying unit 202d specifies at least one of the route, the station name, and the traveling direction of the current position by extracting the color scheme information corresponding to the color scheme included in the display content from the color scheme information database 206c and specifying at least one of the route, the station name, the traveling direction, and the operation type of the means of transportation based on the extracted color scheme information. In addition, when the symbol information database 206d is included, the image identifying unit 202d specifies at least one of the route, the station name, and the traveling direction of the current position by extracting the symbol information corresponding to the symbol included in the display content from the symbol information database 206d and specifying at least one of the route, the station name, the traveling direction, and the operation type of the means of transportation based on the extracted symbol information. In addition, the image identifying unit 202d specifies at least one of the route, the station name, and the traveling direction of the current position by searching for the platform information of the position information corresponding to the current position information from the platform information database 206e based on the current position information that is transmitted from the terminal apparatus 100.

The current position information acquiring unit 202g is a current position information acquiring unit that acquires the current position information of a user using the terminal apparatus 100. Here, the current position information acquiring unit 202g may receive a position information signal that is received from the position transmitting device 500 by the position acquiring unit 112 of the terminal apparatus 100 from the terminal apparatus 100 and acquire position information that is calculated based on the position information signal as the current position information of the user using the terminal apparatus 100. In addition, the current position information acquiring unit 202g may receive position information such as position coordinates of the current position that is input through the input unit 116 of the terminal apparatus 100 by the user and acquire the position information as the current position information of the user using the terminal apparatus 100.

The photographed image acquiring unit 202h is a photographed image acquiring unit that acquires a photographed image by receiving image data of the photographed image of a boarding guide display item that is photographed by the photographing unit 120 of the terminal apparatus 100 from the terminal apparatus 100. Here, the photographed image may include a still image or a moving image.

The display screen generating unit 202i is a display screen generating unit that generates a display screen that is based on the guide information generated by the guide information generating unit 202e. Here, the display screen generating unit 202i may generate a display screen that is further based on the current position information of a user using the terminal apparatus 100, which is acquired by the current position information acquiring unit 202g. In addition, the display screen generating unit 202i, for example, may generate a display screen of display guide data such as TBT corresponding to the traveling direction or the like in the guide route included in the guide information. Furthermore, the display screen generating unit 202i, for example, may generate a display screen acquired by superimposing the guide route data included in the guide information and/or the current position information of the user using the terminal apparatus 100, which is included in the guide information, on the map data included in the guide information.

The output controlling unit 202j is an output controlling unit that outputs output control information through the output unit of the terminal apparatus 100 by transmitting the output control information that includes the display screen generated by the display screen generating unit 202i to the terminal apparatus 100. Here, the output controlling unit 202j may display the display screen on the display unit 114 of the terminal apparatus 100 by transmitting the output control information including the display screen to the terminal apparatus 100. In addition, by transmitting output control information that includes voice guide data corresponding to a guide route stored in the storage unit 206 to the terminal apparatus 100, the output controlling unit 202j may output a sound through the voice output unit 118 of the terminal apparatus 100 so as to perform voice guide. When a scrolling operation is performed using the display unit 114 through the input unit 116, the control unit 102 of the terminal apparatus 100 may scroll the guide information displayed on the display unit 114 in accordance with the scrolling operation.

As above, an example of the configuration of the navigation server 200 according to the second embodiment has been explained.

Process of Navigation Server 200 (Server-Leading Type)

Next, an example of the process of the navigation server 200 according to a second embodiment configured as described above will be described below in detail with reference to FIG. 14.

As shown in FIG. 14, first, the control unit 102 of the terminal apparatus 100 transmits a route search condition that at least includes a point of departure and a destination, which are input through the input unit 116 by a user, to the navigation server 200 (Step SC-1). Here, the point of departure may be the current position of the user using the terminal apparatus 100 which is based on a position information signal received from the position transmitting device 500 by the position acquiring unit 112. For example, the control unit 102 may acquire position information calculated based on the position information signal received from the position transmitting device 500 by the position acquiring unit 112 as the current position information of the user using the terminal apparatus 100 and set the current position of the user using the terminal apparatus 100 which is based on the current position information as the point of departure. In addition, the control unit 102 may transmit the position information signal received from the position transmitting device 500 by the position acquiring unit 112 to the navigation server 200. The route search condition may further include a transit place.

Then, the route search condition receiving unit 202a of the navigation server 200 receives the route search condition that at least includes the point of departure and the destination transmitted from the terminal apparatus 100 by the process of the control unit 202 in Step SC-1 (Step SC-2). Here, when the position information signal is received by the route search condition receiving unit 202a from the terminal apparatus 100, the current position information acquiring unit 202g may acquire position information calculated based on the position information signal as current position information of the user using the terminal apparatus 100 and set the current position of the user using the terminal apparatus 100 which is based on the current position information as a point of departure in the route search condition.

Then, the guide route searching unit 202b of the navigation server 200 searches for a guide route formed from the point of departure to the destination, which satisfies the route search condition received by the process of the route search condition receiving unit 202a in Step SC-2 using the traffic network data stored in the traffic network database 206a, thereby generating guide route data (Step SC-3). Here, when the transit place is further included in the route search condition, the guide route searching unit 202b may search for a guide route that passes through the transit place.

Then, the control unit 102 of the terminal apparatus 100 acquires a photographed image of the boarding guide display item by controlling the photographing unit 120 (Step SC-4). Here, the photographed image may include a still image and a moving image.

Then, the control unit 102 of the terminal apparatus 100 transmits the photographed image acquired in Step SC-4 to the navigation server 200 (Step SC-5).

Then, the photographed image acquiring unit 202h of the navigation server 200 receives image data of the photographed image transmitted by the process of the control unit 102 of the terminal apparatus 100 in Step SC-5 from the terminal apparatus 100 (Step SC-6).

Then, the image identifying unit 202d of the navigation server 200 identifies a display content from the photographed image received by the process of the photographed image acquiring unit 202h in Step SC-6 and specifies a route, a station name, and a traveling direction of the current position based on the identified display content and the traffic network data stored in the traffic network database 206a (Step SC-7). Here, the image identifying unit 202d may specify a route, a station name, and a traveling direction of the current position based on the traffic network data that includes station code information corresponding to the station code included in the display content. In addition, the image identifying unit 202d may specify at least one of a route, a station name, and a traveling direction of the current position by specifying at least one of a route, a station name, a traveling direction, and an operation type of the means of transportation based on at least one of characters, the arrangement of a character string, a color scheme, and symbols that are included in the display content. When the character string arrangement information database 206b is included, the image identifying unit 202d may specify at least one of a route, a station name, and a traveling direction of the current position by extracting character string arrangement information that corresponds to at least one of characters and the arrangement of a character string that are included in the display content from the character string arrangement information database 206b and specifying at least one of a route, a station name, a traveling direction, and an operation type of the means of transportation based on the extracted character string arrangement information. In addition, when the color scheme information database 206c is included, the image identifying unit 202d may specify at least one of a route, a station name, and a traveling direction of the current position by extracting color scheme information that corresponds to the color scheme included in the display content from the color scheme information database 206c and specifying at least one of a route, a station name, a traveling direction, and an operation type of the means of transportation based on the extracted color scheme information. Furthermore, when the symbol information database 206d is included, the image identifying unit 202d may specify at least one of a route, a station name, and a traveling direction of the current position by extracting symbol information that corresponds to the symbol included in the display content from the symbol information database 206d and specifying at least one of a route, a station name, a traveling direction, and an operation type of the means of transportation based on the extracted symbol information. In addition, the image identifying unit 202d may specify at least one of a route, a station name, and a traveling direction of the current position by searching for platform information of the position information that corresponds to current position information from the platform information database 206e based on the current position information transmitted from the terminal apparatus 100.

The guide information generating unit 202e of the navigation server 200 extracts station names that are present in the traveling direction from the traffic network data based on the route, the station name, and the traveling direction of the current position specified by the image identifying unit 202d and generates guide information that includes at least a part of the extracted station names (Step SC-8). Here, the guide information generating unit 202e may extract station names of stops that are present in the traveling direction from the traffic network data based on the route, the station name, and the traveling direction of the current position specified by the image identifying unit 202d and generate guide information that includes stop information including at least a part of the extracted station names. In addition, the guide information generating unit 202e may generate guide information that includes at least a part of the photographed image. Furthermore, the guide information generating unit 202e may compare the stop information generated by the guide information generating unit 202e and the guide route data generated by the guide route searching unit 202b, extract station names up to a stop corresponding to the transit station or the destination station from the stop information, and generate guide information that includes stop information including the extracted station names. In addition, the guide information generating unit 202e may compare the stop information generated by the guide information generating unit 202e with the guide route data generated by the guide route searching unit 202b and, when there is no station name of the stop that corresponds to the transit station or the destination station in the stop information, may generate guide information that includes improper information representing that the photographed boarding guide display item does not coincide with the guide route. Furthermore, the guide information generating unit 202e may compare the station name corresponding to the current position specified by the image identifying unit 202d and the stop information generated by the guide information generating unit 202e and the guide route data generated by the guide route searching unit 202b and, when the station name corresponds to the departure station, and there is a station name of the stop corresponding to the transit station or the destination station in the stop information, may generate guide information that includes the proper information representing that the photographed boarding guide display item coincides with the guide route. In addition, the guide information generating unit 202e may extract traffic information that corresponds to the route specified by the image identifying unit 202d from the traffic information database 206f and generate guide information that includes the extracted traffic information. Furthermore, when the photographed image may not be identified by the image identifying unit 202d, the guide information generating unit 202e may generate guide information that includes the unidentifiable information that represents that the photographed image may not be identified.

Then, the display screen generating unit 202i of the navigation server 200 generates a display screen based on the guide information generated by the guide information generating unit 202e in Step SC-8 (Step SC-9). Here, additionally, the display screen generating unit 202i may generate a display screen based on the current position information of the user using the terminal apparatus 100 acquired by the current position information acquiring unit 202g. In addition, the display screen generating unit 202i, for example, may generate a display screen of display guide data such as TBT that corresponds to the traveling direction of the guide route and the like included in the guide information. Furthermore, the display screen generating unit 202i, for example, may generate a display screen acquired by superimposing the guide route data included in the guide information and/or the current position information of the user using the terminal apparatus 100 included in the guide information on the map data included in the guide information.

Then, the output controlling unit 202j of the navigation server 200 transmits the output control information including the display screen generated by the process of the display screen generating unit 202i in Step SC-9 to the terminal apparatus 100 (Step SC-10), thereby displaying the display screen on the display unit 114 of the terminal apparatus 100 (Step SC-11). Here, for example, when a route guide starting request input through the input unit 116 of the terminal apparatus 100 by a user or the like is received, the output controlling unit 202j may transmit the output control information that includes the display screen generated by the display screen generating unit 202i to the terminal apparatus 100, thereby displaying the display screen on the display unit 114 of the terminal apparatus 100. In addition, for example, when a voice navigation starting request input through the input unit 116 by the user or the like is received, the output controlling unit 202j may transmit the output control information that includes voice guide data corresponding to the traveling direction or the like at a guide position such as a branching point on the guide route stored in the storage unit 206 to the terminal apparatus 100, thereby outputting the output control information through the voice output unit 118 of the terminal apparatus 100. Furthermore, when a scrolling operation is performed by using the display unit 114 through the input unit 116, the control unit 102 of the terminal apparatus 100 may scroll the guide information displayed on the display unit 114 according to the scrolling operation. In addition, the process of performing display control of the route guide or voice output control using the output controlling unit 202j may be performed continuously and/or repeatedly until the terminal apparatus 100 arrives at the destination, the transit place, a guidance point, or the like after the start of the route guide or the voice navigation.

As above, an example of the process of the navigation server 200 according to the second embodiment has been explained.

Third Embodiment

Figure 15:
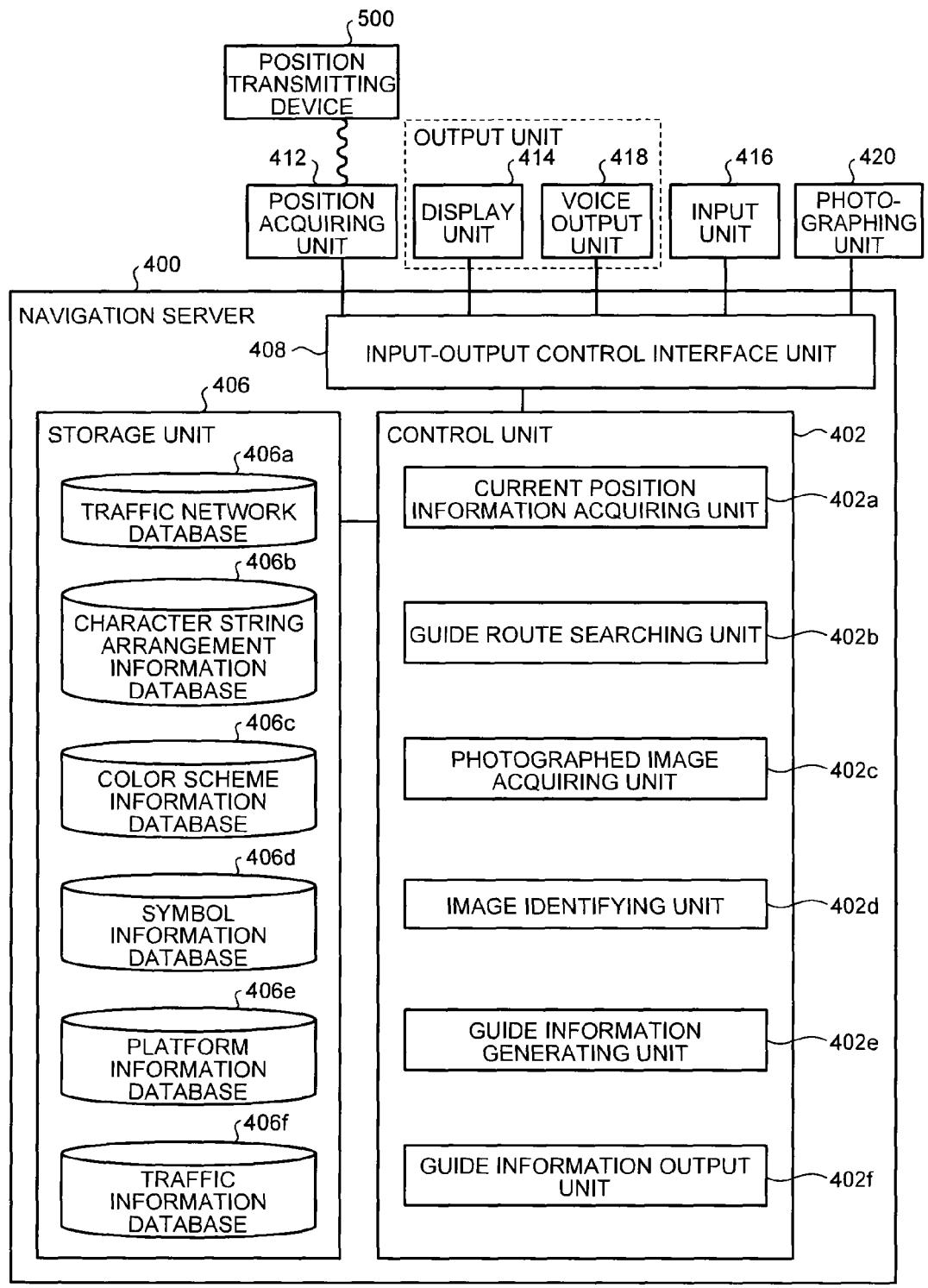
FIG. 15 is a block diagram of an example of a configuration of a navigation apparatus according to third embodiment.

Subsequently, the third embodiment (navigation apparatus 400 (standalone type)) of the present invention will be explained below with reference to FIGS. 15 and 16. Here, FIG. 15 is a block diagram for illustrating an example of the configuration of the navigation apparatus 400 according to the third embodiment and conceptually illustrates only a part of the configuration that relates to the present invention. In addition, FIG. 16 is a flowchart for illustrating an example of the process of the navigation apparatus 400 according to the third embodiment.

In addition, according to the third embodiment, all the functions are integrated in the navigation apparatus 400, and the navigation apparatus 400 has functions of acquiring a photographed image of a boarding guide display item by controlling a photographing unit 420, identifying a display content from the photographed image of the boarding guide display item of the means of transportation acquired and specifying a route, a station name, and a traveling direction of a current position based on the identified display content and the traffic network data stored in the traffic network database 406a, extracting the station names present in the traveling direction from the traffic network data based on the route, the station name, and the traveling direction of the current position that are specified and generating guide information that includes at least a part of the extracted station names, and outputting at least a part of the guide information generated through the output unit, without being connected to the navigation server 200. As above, the third embodiment is different from the other embodiments in that the navigation apparatus 400 is configured as a standalone type and independently performs the process.

Configuration of Navigation Apparatus 400 (Standalone Type)

First, an example of the configuration of the navigation apparatus 400 (standalone type) according to the third embodiment will be explained below with reference to FIG. 15.

As illustrated in FIG. 15, the navigation apparatus 400 according to the third embodiment of the present invention at least includes a position acquiring unit 412, an output unit (a display unit 414 and a voice output unit 418), an input unit 416, the photographing unit 420, a control unit 402, and a storage unit 406. These units of the navigation apparatus 400 may be connected to each other in a communicable manner through arbitrary communication lines. The navigation apparatus 400, for example, may be any type of a navigation terminal such as a portable navigation device (PND), any type of an information processing apparatus such as a notebook-type personal computer, a mobile terminal apparatus such as a cellular phone, a PHS, or a PDA.

In FIG. 15, the functions of an input-output control interface unit 408, the position acquiring unit 412, the display unit 414, the input unit 416, the voice output unit 418, and the photographing unit 420 are the same as those of the first embodiment, and thus explanation thereof will not be presented here. In addition, the functions of units (a traffic network database 406a, a character string arrangement information database 406b, a color scheme information database 406c, a symbol information database 406d, a platform information database 406e, a traffic information database 406f, and the like) of the storage unit 406 are the same as those of the first embodiment except that the units are included not in the navigation server 200 but in the navigation apparatus 400, and thus explanation thereof will not be presented here.

In addition, the functions of units (a current position information acquiring unit 402a to a guide information output unit 402f and the like) of the control unit 402 are basically the same as those of the first embodiment except that the control unit 402 does not include transmitting and receiving units due to the standalone type of the navigation apparatus 400 according to this embodiment.

In FIG. 15, the control unit 402 includes an internal memory that stores a control program such as OS, a program specifying various processing procedures, and necessary data. The control unit 402 performs information processing for executing various pieces of processing by using these programs. The control unit 402 functionally and conceptually includes the current position information acquiring unit 402a, a guide route searching unit 402b, a photographed image acquiring unit 402c, an image identifying unit 402d, a guide information generating unit 402e, and the guide information output unit 402f.

Among them, Here, the current position information acquiring unit 402a is a current position information acquiring unit that acquires the current position information of a user using the navigation apparatus 400. Here, the current position information acquiring unit 402a may acquire the current position information of a user using the navigation apparatus 400 for every predetermined time (predetermined period) (for example, every one second or every three minutes). In addition, the current position information acquiring unit 402a may acquire position information that is calculated based on the position information signal received by the position acquiring unit 412 from the position transmitting device 500 as the current position information of the user using the navigation apparatus 400. Furthermore, the current position information acquiring unit 402a may further acquire azimuth information such as the direction of travel of the navigation apparatus 400 that is detected by the azimuth sensor of the position acquiring unit 412 or the like as the current position information of the user using the navigation apparatus 400.

In addition, the current position information acquiring unit 402a may acquire position information such as position coordinates of the current position that is input through the input unit 416 by a user as the current position information of the user using the navigation apparatus 400. Here, the current position that is based on the current position information that is input through the input unit 416 by the user may be a position at which the user is actually present or a virtual current position (for example, an arbitrary place such as a station or an airport located at Osaka that is selected by a user in Tokyo) that is arbitrarily selected by the user. For example, the current position information acquiring unit 402a may acquire coordinates designated (for example, through a designation operation performed on a touch panel-type display unit 414) by a user on the display screen of map data that is displayed on the display unit 414 through the input unit 416 as the current position information of the user using the navigation apparatus 400. In addition, the current position information acquiring unit 402a may further acquire azimuth information designated by a user on the display screen of the map data displayed on the display unit 414 through the input unit 416 as the current position information of the user using the navigation apparatus 400.

Here, the guide route searching unit 402b is a guide route searching unit that searches for a guide route formed from a point of departure to a destination that satisfies a route search condition that at least includes the point of departure and the destination using traffic network data that is stored in the traffic network database 406a and generates guide route data. In addition, when a transit place is further included in the route search condition, the guide route searching unit 402b may search for a guide route that passes through a transit place.

Here, the photographed image acquiring unit 402c is a photographed image acquiring unit that acquires a photographed image of a boarding guide display item by controlling the photographing unit 420. Here, the photographed image may include a still image and a moving image.

Here, the image identifying unit 402d is an image identifying unit that identifies a display content from the photographed image of the boarding guide display item of the means of transportation acquired by the photographed image acquiring unit 402c and specifies a route, a station name, and a traveling direction of a current position based on the identified display content and the traffic network data stored in the traffic network database 406a. Here, the image identifying unit 402d specifies the route, the station name, and the traveling direction of the current position based on the traffic network data that includes the station code information corresponding to the station code included in the display content. In addition, the image identifying unit 402d specifies at least one of the route, the station name, and the traveling direction of the current position by specifying at least one of the route, the station name, the traveling direction, and an operation type of the means of transportation based on at least one of characters, an arrangement of a character string, a color scheme, and symbols included in the display content. In addition, when the character string arrangement information database 406b is included, the image identifying unit 402d specifies at least one of the route, the station name, and the traveling direction of the current position by extracting the character string arrangement information corresponding to at least one of the characters and the arrangement of the character string included in the display content from the character string arrangement information database 406b and specifying at least one of the route, the station name, the traveling direction, and the operation type of the means of transportation based on the extracted character string arrangement information. In addition, when the color scheme information database 406c is included, the image identifying unit 402d specifies at least one of the route, the station name, and the traveling direction of the current position by extracting the color scheme information corresponding to the color scheme included in the display content from the color scheme information database 406c and specifying at least one of the route, the station name, the traveling direction, and the operation type of the means of transportation based on the extracted color scheme information. In addition, when the symbol information database 406d is included, the image identifying unit 402d specifies at least one of the route, the station name, and the traveling direction of the current position by extracting the symbol information corresponding to the symbol included in the display content from the symbol information database 406d and specifying at least one of the route, the station name, the traveling direction, and the operation type of the means of transportation based on the extracted symbol information. In addition, the image identifying unit 402d specifies at least one of the route, the station name, and the traveling direction of the current position by searching for the platform information of the position information corresponding to the current position information from the platform information database 406e based on the current position information that is transmitted from the navigation apparatus 400.

Here, the guide information generating unit 402e is a guide information generating unit that extracts the station names present in the traveling direction from the traffic network data based on the route, the station name, and the traveling direction of the current position that are specified by the image identifying unit 402d and generates guide information that includes at least a part of the extracted station names. In addition, the guide information generating unit 402e extracts the station names of stops present in the traveling direction from the traffic network data based on the route, the station name, and the traveling direction of the current position specified by the image identifying unit 402d and generates the guide information that includes at least a part of the extracted station names. In addition, the guide information generating unit 402e further generates the guide information that includes at least a part of the photographed image. In addition, the guide information generating unit 402e compares the stop information generated by the guide information generating unit 402e with the guide route data generated by the guide route searching unit 402b, extracts the station names up to the stop that corresponds to a transit station or a destination station from the stop information, and generates the guide information that includes the stop information including the extracted station name. In addition, the guide information generating unit 402e compares the stop information generated by the guide information generating unit 402e with the guide route data generated by the guide route searching unit 402b and, when the station name of the stop that corresponds to the transit station or the destination station is not present in the stop information, generates the guide information that includes improper information that represents that the photographed boarding guide display item does not coincide with the guide route. In addition, the guide information generating unit 402e compares the station name corresponding to the current position specified by the image identifying unit 402d and the stop information generated by the guide information generating unit 402e with the guide route data generated by the guide route searching unit 402b and, when the station name corresponds to the departure station and the station name of the stop that corresponds to the transit station or the destination station is present in the stop information, generates the guide information that includes proper information that represents that the photographed boarding guide display item coincides with the guide route. In addition, the guide information generating unit 402e extracts the traffic information that corresponds to the route specified by the image identifying unit 402d from the traffic information database 406f and generates the guide information that includes the extracted traffic information. In addition, the guide information generating unit 402e, when the image identifying unit 402d is incapable of identifying the photographed image, generates the guide information that includes unidentifiable information that represents that the image identifying unit 402d is incapable of identifying the photographed image.

Here, the guide information output unit 402f is a guide information output unit that outputs at least a part of the guide information generated by the guide information generating unit 402e through the output unit. In addition, the guide information output unit 402f outputs the station name of the transit station or the destination station included in the stop information that is included in the guide information being highlighted. In addition, the guide information output unit 402f outputs the guide information further including the guide route data. In addition, the guide information output unit 402f, when a scrolling operation is performed using the display unit 414 through the input unit 416, scrolls the guide information displayed on the display unit 414 in accordance with the scrolling operation.

As above, the example of the configuration of the navigation apparatus 400 according to the third embodiment has been explained.

Process of Navigation Apparatus 400 (Standalone Type)

Next, an example of the process of the navigation apparatus 400 according to the third embodiment configured in this way will be explained below in detail with reference to FIG. 16.

As shown in FIG. 16, first, the guide route searching unit 402b searches for a guide route formed from the point of departure to the destination, which satisfies the route search condition that includes at least the point of departure and the destination input by the user through the input unit 416 using the traffic network data stored in the traffic network database 406a, thereby generating guide route data (Step SD-1). Here, the point of departure may be the current position of the user using the navigation apparatus 400 based on the current position information acquired by the current position information acquiring unit 402a. In addition, when a transit place is further included in the route search condition, the guide route searching unit 402b may search for a guide route that passes through the transit place.

Then, the photographed image acquiring unit 402c acquires a photographed image of the boarding guide display item by controlling the photographing unit 420 (Step SD-2). Here, the photographed image may include a still screen and a moving image.

Then, the image identifying unit 402d identifies a display content from the photographed image of the boarding guide display item of the means of transportation acquired by the process of the photographed image acquiring unit 402c in Step SD-2 and specifies a route, a station name, and a traveling direction of the current position based on the identified display content and the traffic network data stored in the traffic network database 406a (Step SD-3). Here, the image identifying unit 402d may specify a route, a station name, and a traveling direction of the current position based on the traffic network data that includes station code information corresponding to the station code included in the display content. In addition, the image identifying unit 402d may specify at least one of a route, a station name, and a traveling direction of the current position by specifying at least one of a route, a station name, a traveling direction, and an operation type of the means of transportation based on at least one of characters, the arrangement of a character string, a color scheme, and symbols included in the display content. In addition, when the character string arrangement information database 406b is included, the image identifying unit 402d may specify at least one of a route, a station name, and a traveling direction of the current position by extracting character string arrangement information that corresponds to at least one of characters and the arrangement of a character string included in the display content from the character string arrangement information database 406b and specifying at least one of a route, a station name, a traveling direction, and an operation type of the means of transportation based on the extracted character string arrangement information. In addition, when the color scheme information database 406c is included, the image identifying unit 402d may specify at least one of a route, a station name, and a traveling direction of the current position by extracting color scheme information that corresponds to the color scheme included in the display content from the color scheme information database 406c and specifying at least one of a route, a station name, a traveling direction, and an operation type of the means of transportation based on the extracted color scheme information. Furthermore, when the symbol information database 406d is included, the image identifying unit 402d may specify at least one of a route, a station name, and a traveling direction of the current position by extracting symbol information that corresponds to the symbol included in the display content from the symbol information database 406d and specifying at least one of a route, a station name, a traveling direction, and an operation type of the means of transportation based on the extracted symbol information. In addition, the image identifying unit 402d may specify at least one of a route, a station name, and a traveling direction of the current position by searching for platform information of the position information that corresponds to current position information from the platform information database 406e based on the current position information acquired by the current position information acquiring unit 402a.

Then, the guide information generating unit 402e extracts station names that are present in the traveling direction from the traffic network data based on the route, the station name, and the traveling direction of the current position specified by the process of the image identifying unit 402d in Step SD-3 and generates guide information that includes at least a part of the extracted station names (Step SD-4). Here, the guide information generating unit 402e may extract station names of stops that are present in the traveling direction from the traffic network data based on the route, the station name, and the traveling direction of the current position specified by the image identifying unit 402d and generate guide information that includes stop information including at least a part of the extracted station names. In addition, the guide information generating unit 402e may generate guide information that includes at least a part of the photographed image. Furthermore, the guide information generating unit 402e may compare the stop information generated by the guide information generating unit 402e and the guide route data generated by the guide route searching unit 402b, extract station names up to a stop corresponding to the transit station or the destination station from the stop information, and generate guide information that includes stop information including the extracted station names. In addition, the guide information generating unit 402e may compare the stop information generated by the guide information generating unit 402e with the guide route data generated by the guide route searching unit 402b and, when there is no station name of the stop that corresponds to the transit station or the destination station in the stop information, may generate guide information that includes improper information representing that the photographed boarding guide display item does not coincide with the guide route. Furthermore, the guide information generating unit 402e may compare the station name corresponding to the current position specified by the image identifying unit 402d and the stop information generated by the guide information generating unit 402e and the guide route data generated by the guide route searching unit 402b and, when the station name corresponds to the departure station, and there is a station name of the stop corresponding to the transit station or the destination station in the stop information, may generate guide information that includes the proper information representing that the photographed boarding guide display item coincides with the guide route. In addition, the guide information generating unit 402e may extract traffic information that corresponds to the route specified by the image identifying unit 402d from the traffic information database 406f and generate guide information that includes the extracted traffic information. Furthermore, when the photographed image may not be identified by the image identifying unit 402d, the guide information generating unit 402e may generate guide information that includes the unidentifiable information that represents that the photographed image may not be identified.

Then, the guide information output unit 402f outputs at least a part of the guide information generated by the process of the guide information generating unit 402e in Step SD-5 through the output unit (Step SD-5). Here, the guide information output unit 402f may output a station name of a transit station or a destination station included in the stop information included in the guide information being highlighted. In addition, the guide information output unit 402f may output guide information that further includes the guide route data. Furthermore, when a scrolling operation is performed by using the display unit 414 through the input unit 416, the guide information output unit 402f may scroll the guide information displayed on the display unit 414 according to the scrolling operation.

As above, the example of the process of the navigation apparatus 400 according to the third embodiment has been explained.

Other Embodiments

The embodiment of the present invention is explained above. However, the present invention may be implemented in various different embodiments other than the embodiment described above within a technical scope described in claims.

For example, in the embodiments, although when boarding guide display items such as a station name signboard, a roll sign, and a route map are photographed mainly in an electric train or a subway is described, such an application may be similarly made also in a case in which boarding guide display items of public means of transportation such as a surface bus, an express bus, and a ferry are photographed. In addition, the accuracy may be improved by using base station information or positioning information acquired in advance. Furthermore, when operating information is acquired, for example, in a case in which there is a delay or the stop of the operation, an indication thereof may be simultaneously displayed on the guide screen. Particularly, when the photographed image is a road surface diagram, if traffic information is present on the route map included in the display image, the route may be highlighted.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the terminal apparatus 100, the navigation server 200, and the navigation apparatus 400 are merely conceptual and may not necessarily physically resemble the structures shown in the drawings.

For example, the process functions performed by each device of the terminal apparatus 100, the navigation server 200, and the navigation apparatus 400, especially the each process function performed by the control unit 102, the control unit 202, and the control unit 402 can be entirely or partially realized by CPU and a computer program executed by the CPU or by a hardware using wired logic. The computer program, recorded on a recording medium to be described later, can be mechanically read by the terminal apparatus 100, the navigation server 200, and the navigation apparatus 400 as the situation demands. In other words, the storage unit 106, the storage unit 206, and the storage unit 406 such as read-only memory (ROM) or HDD stores the computer program that can work in coordination with OS to issue commands to the CPU and cause the CPU to perform various processes. The computer program is first loaded to RAM, and forms a control unit in collaboration with the CPU.

Alternatively, the computer program can be stored in any application program server connected to the terminal apparatus 100, the navigation server 200, and the navigation apparatus 400 via the network 300, and can be fully or partially loaded as the situation demands.

The computer program may be stored in a computer-readable recording medium, or may be structured as a program product. Here, the "recording medium" includes any "portable physical medium" such as a flexible disk, an optical disk, a ROM, an EPROM (Erasable Programmable Read Only Memory), an EEPROM (Electronically Erasable and Programmable Read Only Memory), a CD-ROM (Compact Disk Read Only Memory), an MO (Magneto-Optical disk), a DVD (Digital Versatile Disk), and Blu-ray Disc or can be a "communication medium" such as a communication line or a carrier wave that holds the programs for a short period of time at the time of transmission via the network 300 such as a LAN, a WAN, or the Internet.

In addition, a "program" is a data processing method that is described in an arbitrary language or a description method and may have an arbitrary form such as a source code, a binary code, or the like. Furthermore, the "program" is not necessarily limited to a configuration of a single form and includes a configuration in which the program is configured by a plurality of modules or a plurality of program libraries in a distributed manner and includes a program that achieves the function thereof in cooperation with a separate program that is represented by an OS. In addition, as a specific configuration for reading data from a recording medium in each apparatus illustrated in the embodiments, a reading procedure, an installation procedure after the reading, and the like, a known configuration and a known procedure may be used.

Various databases (the guide information file 106a, the traffic network database 206a, the character string arrangement information database 206b, the color scheme information database 206c, the symbol information database 206d, the platform information database 206e, the traffic information database 206f, the traffic network database 406a, the character string arrangement information database 406b, the color scheme information database 406c, the symbol information database 406d, the platform information database 406e, and the traffic information database 406f) stored in the storage unit 106, the storage unit 206, and the storage unit 406 is a storage unit such as a memory device such as a RAM or a ROM, a fixed disk device such as a HDD, a flexible disk, and an optical disk, and stores therein various programs, tables, databases, and web page files used for providing various processing or web sites.

The navigation server 200 may be structured as an information processing apparatus such as known personal computers or workstations, or may be structured by connecting any peripheral devices to the information processing apparatus. Furthermore, the navigation server 200 may be realized by mounting software (including programs, data, or the like) for causing the information processing apparatus to implement the method according of the invention.

The distribution and integration of the device are not limited to those illustrated in the figures. The device as a whole or in parts can be functionally or physically distributed or integrated in an arbitrary unit according to various attachments or how the device is to be used. That is, any embodiments described above can be combined when implemented, or the embodiments can selectively be implemented.

INDUSTRIAL APPLICABILITY

As described above in detail, according to the present invention, it is possible to provide a navigation system, a terminal apparatus, a navigation server, a navigation apparatus, a navigation method, and a computer program product capable of presenting guide information that is effective for a user based on a photographed image of a boarding guide display item (for example, a station name signboard, a roll sign, or a route map) that can be photographed in a station yard, and is highly useful in various fields such as the field of information instrument and information processing supporting navigation.

EXPLANATIONS OF LETTERS OR NUMERALS 100 terminal apparatus
102 control unit
102a current position information acquiring unit
102b route search condition transmitting unit
102c photographed image acquiring unit
102d display content extracting unit
102e display content transmitting unit
102f guide information receiving unit
102g guide information output unit
104 communication control interface unit
106 storage unit
106a guide information file
108 input-output control interface unit
112 position acquiring unit
114 display unit
116 input unit
118 voice output unit
120 photographing unit
200 navigation server
202 control unit
202a route search condition receiving unit
202b guide route searching unit
202c display content receiving unit
202d image identifying unit
202e guide information generating unit
202f guide information transmitting unit
202g current position information acquiring unit
202h photographed image acquiring unit
202i display screen generating unit
202j output controlling unit
204 communication control interface unit
206 storage unit
206a traffic network database
206b character string arrangement information database 206c color scheme information database
206d symbol information database
206e platform information database
206f traffic information database
300 network
400 navigation apparatus
402 control unit
402a current position information acquiring unit
402b guide route searching unit
402c photographed image acquiring unit
402d image identifying unit
402e guide information generating unit
402f guide information output unit
406 storage unit
406a traffic network database
406b character string arrangement information database
406c color scheme information database
406d symbol information database
406e platform information database
406f traffic information database
408 input-output control interface unit
412 position acquiring unit
414 display unit
416 input unit
418 voice output unit
420 photographing unit
500 position transmitting device

The invention claimed is:

1. A navigation system comprising:
a navigation server and a terminal apparatus that are connected to each other in a communicable manner, wherein:
the navigation server includes:
  control circuitry; and
  a memory,
the terminal apparatus includes:
  a photographing device;
  an output device; and
  control circuitry,
the memory of the navigation server stores traffic network data including station name information that represent station names of each route of a mode of public transportation, the mode of public transportation including at least one of a train, a bus, a plane and a ship,
the control circuitry of the navigation server is configured to:
  receive a display content of a photographed image of a boarding guide display item of the mode of public transportation that is transmitted from the terminal apparatus;
  specify a route in the mode of public transportation, a station name in the mode of public transportation, and a traveling direction on the route in the mode of public transportation of a current position based on at least one of a character string, an arrangement of character strings, a color scheme, and symbols included in the display content of the photographed image;
  generate guide information including correctness information that indicates whether or not a user using the terminal apparatus can arrive at a destination station, an image representing the correctness information being superimposed on the photographed image; and
  transmit the generated guide information to the terminal apparatus, the control circuitry of the terminal apparatus is configured to:
  control the photographing device to acquire the photographed image of the boarding guide display item;
  extract the display content from the acquired photographed image;
  transmit the extracted display content to the navigation server;
  receive the guide information transmitted from the navigation server; and
  output at least a part of the received guide information through the output device,
and
the control circuitry of the navigation server is further configured to generate information indicating that the photographed image cannot be identified when there is no traffic network data corresponding to the photographed image, and transmit the generated information to the terminal apparatus.

2. The navigation system according to claim 1, wherein
the memory of the navigation server further stores station code information that represents station codes unique to the station names of each route of the mode of public transportation in association with the station name information, and
the control circuitry of the navigation server is configured to specify the route, the station name, and the traveling direction based on the station code included in the display content.

3. The navigation system according to claim 1, wherein
the memory of the navigation server stores character string arrangement information relating to an arrangement of a character string that includes character information of characters of the boarding guide display item and at least one of the route, the station name, and the traveling direction in association with each other, and
the control circuitry of the navigation server is configured to extract corresponding character string arrangement information corresponding to at least one of the characters and the arrangement of the character string included in the display content from the memory of the navigation server and to specify the route, the station name, and the traveling direction based on the extracted character string arrangement information.

4. The navigation system according to claim 1, wherein
the memory of the navigation server stores color scheme information relating to a color scheme that includes a combination of colors of the boarding guide display item or arrangement positions of the colors and at least one of the route, the station name, and the traveling direction in association with each other, and
the control circuitry of the navigation server is configured to extract corresponding color scheme information corresponding to the color scheme included in the display content from the memory of the navigation server and specify the route, the station name, and the traveling direction based on the extracted color scheme information.

5. The navigation system according to claim 1, wherein
the memory of the navigation server stores symbol information relating to symbols used in the boarding guide display item and at least one of the route, the station name, and the traveling direction in association with each other, and
the control circuitry of the navigation server is configured to extract corresponding symbol information corresponding to the symbol included in the display content from the memory of the navigation server and specifying the route, the station name, and the traveling direction based on the extracted symbol information.

6. The navigation system according to claim 1, wherein the memory of the navigation server stores platform information including position information of the boarding guide display item at a platform of the station of the mode of public transportation and at least one of the route, the station name, and the traveling direction in association with each other, the control circuitry of the terminal apparatus is further configured to acquire current position information of the user using the terminal apparatus and transmit the current position information to the navigation server, and the control circuitry of the navigation server is configured to search for corresponding platform information of the position information corresponding to the current position information from the memory of the navigation server based on the current position information that is transmitted from the terminal apparatus by the control circuitry of the terminal apparatus and specify the route, the station name, and the traveling direction based on the extracted platform information.

7. The navigation system according to claim 1, wherein the control circuitry of the navigation server is configured to extract station names of stops present in the traveling direction from the traffic network data based on the route, the station name, and the traveling direction specified by the control circuitry of the navigation server and generate the guide information that includes at least a part of the extracted station names of stops present in the traveling direction.

8. The navigation system according to claim 7, wherein the control circuitry of the navigation server is configured to generate the guide information that includes at least a part of the photographed image.

9. The navigation system according to claim 7, wherein the control circuitry of the navigation server is configured to:
search for a guide route formed from a point of departure to a destination that satisfies a route search condition, which is transmitted from the terminal apparatus, at least including the point of departure and the destination using the traffic network data stored in the memory of the navigation server and generate guide route data, and
compare the generated guide information including the at least a part of the extracted station names of stops with the generated guide route data, extract the station names up to the stop that corresponds to a transit station or a destination station from the guide information, and generate the guide information that includes stop information including the extracted station name.

10. The navigation system according to claim 9, wherein the control circuitry of the terminal apparatus is configured to output the station name of the transit station or the destination station included in the stop information that is included in the guide information as being highlighted.

11. The navigation system according to claim 9, wherein the control circuitry of the navigation server is configured to:
compare the generated guide information including the at least a part of the extracted station names of stops with the generated guide route data, and
when the station name of the stop that corresponds to the transit station or the destination station is not present in the stop information, generate the guide information that indicate that the photographed boarding guide display item does not coincide with the guide route.

12. The navigation system according to claim 9, wherein the control circuitry of the navigation server is configured to:
compare the station name corresponding to a current position and the generated guide information with the generated guide route data, and
when the station name corresponds to the departure station and the station name of the stop that corresponds to the transit station or the destination station is present in the stop information, generate the guide information that includes information that represents that the photographed boarding guide display item coincides with the guide route.

13. The navigation system according to claim 1, wherein the memory of the navigation server stores traffic information of the mode of public transportation, and
the control circuitry of the navigation server is configured to extract the traffic information that corresponds to the specified route from the memory of the navigation server and generate the guide information that includes the extracted traffic information.

14. The navigation system according to claim 1, wherein the control circuitry of the navigation server is configured to generate the guide information that includes unidentifiable information that represents that the photographed image is incapable of being identified.

15. The navigation system according to claim 1, wherein the output device includes a display; and
the control circuitry of the terminal apparatus, when a scrolling operation is performed using the display through an input device, is configured to scroll the guide information displayed on the display in accordance with the scrolling operation.

16. The navigation system according to claim 1, wherein the terminal apparatus has an input device which includes a touch panel.

17. The navigation system according to claim 1, wherein the photographed image at least includes a still image and a moving image.

18. A navigation server comprising:
control circuitry; and
a memory that stores traffic network data including station name information that represents station names of each route of a mode of public transportation, the mode of public transportation including at least one of a train, a bus, a plane and a ship, wherein:
the control circuitry is configured to:
receive a display content of a photographed image of a boarding guide display item of the mode of public transportation that is transmitted from a terminal apparatus, if the terminal apparatus is connected to a network and sends the display content;
specify a route in the mode of public transportation, a station name in the mode of public transportation, and a traveling direction on the route in the mode of public transportation of a current position based on at least one of a character string, an arrangement of character strings, a color scheme, and symbols included in the display content of the photographed image;

generate guide information including correctness information that indicates whether or not a user using the terminal apparatus can arrive at a destination station, an image representing the correctness information being superimposed on the photographed image; and transmit the generated guide information to the terminal apparatus via the network, and the control circuitry of the navigation server is further configured to generate information indicating that the photographed image cannot be identified when there is no traffic network data corresponding to the photographed image, and transmit the generated information to the terminal apparatus.

19. A navigation server comprising:

control circuitry; and a memory that stores traffic network data including station name information that represents station names of each route of a mode of public transportation, the mode of public transportation including at least one of a train, a bus, a plane and a ship, wherein:

the control circuitry is configured to:

identify a display content from a photographed image of a boarding guide display item of the mode of public transportation that is transmitted from a terminal apparatus, if the terminal apparatus is connected to a network and sends the photographed image;

specify a route in the mode of public transportation, a station name in the mode of public transportation, and a traveling direction on the route in the mode of public transportation of a current position based on at least one of a character string, an arrangement of character strings, a color scheme, and symbols included in the display content of the photographed image;

generate guide information including correctness information that indicates whether or not a user using the terminal apparatus can arrive at a destination station, an image representing the correctness information being superimposed on the photographed image;

generate a display screen that is based on the generated guide information; and transmit output control information that includes the generated display screen to the terminal apparatus via the network, and the control circuitry of the navigation server is further configured to generate information indicating that the photographed image cannot be identified when there is no traffic network data corresponding to the photographed image, and transmit the generated information to the terminal apparatus.

20. A navigation apparatus comprising:

a photographing device;

an output device;

control circuitry; and a memory that stores traffic network data including station name information that represents station names of each route of a mode of public transportation, the mode of public transportation including at least one of a train, a bus, a plane and a ship, wherein:

the control circuitry is configured to:

identify a display content from a photographed image of a boarding guide display item of the mode of public transportation acquired by the photographing device;

specify a route in the mode of public transportation, a station name in the mode of public transportation, and a traveling direction on the route in the mode of public transportation of a current position based on at least one of a character string, an arrangement of character strings, a color scheme, and symbols included in the display content of the photographed image;

generate guide information including correctness information that indicates whether or not a user using the terminal apparatus can arrive at a destination station, an image representing the correctness information being superimposed on the photographed image; and output at least a part of the generated guide information through the output device, and the control circuitry of the navigation server is further configured to generate information indicating that the photographed image cannot be identified when there is no traffic network data corresponding to the photographed image, and transmit the generated information to the terminal apparatus.

21. A navigation method performed by a navigation system including a navigation server and a terminal apparatus, the navigation server including first control circuitry and a memory that stores traffic network data including station name information that represents station names of each route of a mode of public transportation, the mode of public transportation including at least one of a train, a bus, a plane and a ship, and the terminal apparatus including a photographing device, an output device, and second control circuitry, the method comprising:

extracting, by the second control circuitry, a display content from a photographed image of a boarding guide display item of the mode of public transportation acquired by the photographing device;

transmitting, by the second control circuitry, the extracted display content to the navigation server;

receiving, by the first control circuitry, the transmitted display content of the photographed image that is transmitted from the terminal apparatus;

specifying, by the first control circuitry, a route in the mode of public transportation, a station name in the mode of public transportation, and a traveling direction on the route in the mode of public transportation of a current position based on at least one of a character string, an arrangement of character strings, a color scheme, and symbols included in the display content of the photographed image;

generating, by the first control circuitry, guide information including correctness information that indicates whether or not a user using the terminal apparatus can arrive at a destination station, an image representing the correctness information being superimposed on the photographed image;

transmitting, by the first control circuitry, the generated guide information to the terminal apparatus;

receiving, by the second control circuitry, the transmitted guide information from the navigation server; and outputting, by the second control circuitry, at least a part of the received guide information through the output device, wherein the method further comprises:

generating, by the first control circuitry, information indicating that the photographed image cannot be identified when there is no traffic network data corresponding to the photographed image; and transmitting, by the first control circuitry, the generated information to the terminal apparatus.

22. A navigation method executed by a navigation server, the navigation server including control circuitry and a memory that stores traffic network data including station name information that represents station names of each route of a mode of public transportation, the mode of public transportation including at least one of a train, a bus, a plane and a ship, the method comprising:
receiving, by the control circuitry, a display content of a photographed image of a boarding guide display item of mode of public transportation that is transmitted from a terminal apparatus if the terminal apparatus is connected to a network and sends the display content;
specifying, by the control circuitry, a route in the mode of public transportation, a station name in the mode of public transportation, and a traveling direction on the route in the mode of public transportation of a current position based on at least one of a character string, an arrangement of character strings, a color scheme, and symbols included in the display content of the photographed image;
generating, by the control circuitry, guide information including correctness information that indicates whether or not a user using the terminal apparatus can arrive at a destination station, an image representing the correctness information being superimposed on the photographed image; and
transmitting, by the control circuitry, the generated guide information to the terminal apparatus via the network, wherein the method further comprises:
generating, by the control circuitry, information indicating that the photographed image cannot be identified when there is no traffic network data corresponding to the photographed image; and
transmitting, by the control circuitry, the generated information to the terminal apparatus.

23. A navigation method executed by a navigation server that is connected to a network, the navigation server including control circuitry and a memory that stores traffic network data including station name information that represents station names of each route of a mode of public transportation, the mode of public transportation including at least one of a train, a bus, a plane and a ship, the method comprising:
identifying, by the control circuitry, a display content from a photographed image of a boarding guide display item of the mode of public transportation that is transmitted from a terminal apparatus if the terminal apparatus is connected to the network and sends the display content;
specifying a route in the mode of public transportation, a station name in the mode of public transportation, and a traveling direction on the route in the mode of public transportation of a current position based on at least one of a character string, an arrangement of character strings, a color scheme, and symbols included in the display content of the photographed image;
generating, by the control circuitry, guide information including correctness information that indicates whether or not a user using the terminal apparatus can arrive at a destination station, an image representing the correctness information being superimposed on the photographed image;
generating, by the control circuitry, a display screen that is based on the generated guide information; and
transmitting, by the control circuitry, output control information that includes the generated display screen to the terminal apparatus, wherein the method further comprises:
generating, by the control circuitry, information indicating that the photographed image cannot be identified when there is no traffic network data corresponding to the photographed image; and
transmitting, by the control circuitry, the generated information to the terminal apparatus.

24. A navigation method executed by a navigation apparatus including a photographing device, an output device, control circuitry, and a memory that stores traffic network data including station name information that represents station names of each route of a mode of public transportation, the mode of public transportation including at least one of a train, a bus, a plane and a ship, the method comprising:
identifying, by the control circuitry, a display content from a photographed image of a boarding guide display item of the mode of public transportation acquired by the photographing device;
specifying a route in the mode of public transportation, a station name in the mode of public transportation, and a traveling direction on the route in the mode of public transportation of a current position based on at least one of a character string, an arrangement of character strings, a color scheme, and symbols included in the display content of the photographed image;
generating, by the control circuitry, guide information including correctness information that that indicates whether or not a user using the terminal apparatus can arrive at a destination station, an image representing the correctness information being superimposed on the photographed image; and
outputting, by the control circuitry, at least a part of the generated guide information through the output device, wherein the method further comprises:
generating, by the control circuitry, information indicating that the photographed image cannot be identified when there is no traffic network data corresponding to the photographed image; and
outputting, by the control circuitry, the generated information through the output device.

25. A non-transitory computer readable medium including computer readable instructions that, when executed by a navigation server that is connected to a network and that includes control circuitry and a memory that stores traffic network data including station name information that represents station names of each route of a mode of public transportation, cause the control circuitry to:
receive a display content of a photographed image of a boarding guide display item of the mode of public transportation that is transmitted from a terminal apparatus if the terminal apparatus is connected to the network and sends the display content;
specify a route in the mode of public transportation, a station name in the mode of public transportation, and a traveling direction on the route in the mode of public transportation of a current position at least one of a character string, an arrangement of character strings, a color scheme, and symbols included in the display content of the photographed image;

generate guide information including correctness information that indicates whether or not a user using the terminal apparatus can arrive at a destination station, an image representing the correctness information being superimposed on the photographed image; and transmit the generated guide information to the terminal apparatus via the network, wherein:

the mode of public transportation includes at least one of a train, a bus, a plane and a ship, and the computer readable instructions, when executed by the navigation server, further cause the control circuitry to:

generate information indicating that the photographed image cannot be identified when there is no traffic network data corresponding to the photographed image; and transmit the generated information to the terminal apparatus.

26. A non-transitory computer readable medium including computer readable instructions that, when executed by a navigation server that is connected to a network and that includes control circuitry and a memory that stores traffic network data including station name information that represents station names of each route of a mode of public transportation, cause the control circuitry to:

identify a display content from a photographed image of a boarding guide display item of the mode of public transportation that is transmitted from a terminal apparatus if the terminal apparatus is connected to the network and sends the photographed image;

specify a route in the mode of public transportation, a station name in the mode of public transportation, and a traveling direction on the route in the mode of public transportation of a current position based on at least one of a character string, an arrangement of character strings, a color scheme, and symbols included in the display content of the photographed image;

generate guide information including correctness information that that indicates whether or not a user using the terminal apparatus can arrive at a destination station, an image representing the correctness information being superimposed on the photographed image; and generate a display screen that is based on the generated guide information; and transmit output control information that includes the generated display screen to the terminal apparatus, wherein:

the mode of public transportation includes at least one of a train, a bus, a plane and a ship, and the computer readable instructions, when executed by the navigation server, further cause the control circuitry to:

generate information indicating that the photographed image cannot be identified when there is no traffic network data corresponding to the photographed image; and transmit the generated information to the terminal apparatus.

27. A non-transitory computer readable medium including computer readable instructions that, when executed by a navigation apparatus that includes a photographing device, an output device, control circuitry, and a memory that stores traffic network data including station name information that represents station names of each route of a mode of public transportation, cause the control circuitry to:

identify a display content from a photographed image of a boarding guide display item of the mode of public transportation acquired by the photographing device;

specify a route in the mode of public transportation, a station name in the mode of public transportation, and a traveling direction on the route in the mode of public transportation of a current position based on at least one of a character string, an arrangement of character strings, a color scheme, and symbols included in the display content of the photographed image;

generate guide information including correctness information that that indicates whether or not a user using the terminal apparatus can arrive at a destination station, an image representing the correctness information being superimposed on the photographed image; and output at least a part of the generated guide information through the output device, wherein:

the mode of public transportation includes at least one of a train, a bus, a plane and a ship, and the computer readable instructions, when executed by the navigation apparatus, further cause the control circuitry to:

generate information indicating that the photographed image cannot be identified when there is no traffic network data corresponding to the photographed image; and output the generated information through the output device.

* * * * *